US012664699B1

(12) United States Patent
Galvin

(10) Patent No.: US 12,664,699 B1
(45) Date of Patent: Jun. 23, 2026

(54) SYSTEM AND METHOD FOR EXECUTING SELF-EVOLVING PROPERTY GRAPHS ON GPU HARDWARE

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/541,374

(22) Filed: Feb. 16, 2026

Related U.S. Application Data

(63) Continuation-in-part of application No. 19/443,002, filed on Jan. 7, 2026.

(60) Provisional application No. 63/875,311, filed on Sep. 3, 2025.

(51) Int. Cl.
*G06T 11/26* (2026.01)
*G06T 1/20* (2006.01)

(52) U.S. Cl.
CPC ............... *G06T 11/26* (2026.01); *G06T 1/20* (2013.01)

(58) Field of Classification Search
None
See application file for complete search history.

(56) References Cited

U.S. PATENT DOCUMENTS

2026/0030521 A1* 1/2026 Zolnai-Lucas .......... G06N 5/02

OTHER PUBLICATIONS

Wang et al. (Gunrock: A High-Performance Graph processing Library on the GPU, ACM SIGPLAN Notices, 2016) (Year: 2016).*
Zou et al. (An Efficient Data Structure for Dynamic Graph on GPUs, IEEE, 2023) (Year: 2023).*

* cited by examiner

*Primary Examiner* — Kyle Zhai
(74) *Attorney, Agent, or Firm* — GALVIN PATENT LAW LLC; Brian R. Galvin

(57) ABSTRACT

A system and method for self-executing graphs wherein execution semantics are encoded within graph elements themselves rather than imposed by external schedulers. The system comprises a dynamic property graph with vertices and edges that encode execution semantics specifying computational operations and graph-internal triggering conditions. An execution engine evaluates these triggering conditions by monitoring graph state, detects satisfaction through graph-internal evaluation, and initiates bound computational operations. Triggering conditions are expressed in terms of vertex or edge traversal, property changes, geometric properties such as curvature, or topological connectivity patterns. The graph autonomously determines when and which operations execute based on graph-resident execution semantics. In distributed embodiments, multiple local coordinators evaluate triggers within assigned graph regions and coordinate through peer-to-peer messaging without centralized scheduling. Applications include autonomous cognitive systems, adaptive control systems, and scalable distributed computation requiring self-regulating execution without centralized bottlenecks.

20 Claims, 16 Drawing Sheets

| Operator | Mathematical Definition | GPU Kernel Implementation | Complexity |
|---|---|---|---|
| Diffusion Operator 202 | $D_f = e^{-tL}f$ | - SpMV + Krylov approximation<br>- diffuse_spmv (L,f,t,k,s) | O(k*nnz(L))<br>Memory: O(k(m+n)) |
| Geodesic Operator 204 | $G(u, v) = \min_{\gamma: u \to v} L(\gamma)$ | - Delta-stepping SSSP algorithm<br>- ssspdelta_(A,w,S,s)<br>- Bucketed frontiers with light/heavy edges | O(\|E\|+\|V\|logW)<br>W=weight spread |
| Spectral Operator 206 | $S_k f = \sum_{i=1}^{K} \langle f, \phi_i \rangle \phi_i$ | - Lanczos with selective reorthogonalization<br>- lanczos_topk(L,k,e,s)<br>-Mixed precision: TF32/FP32, FP64 | O(km+k²n) with reorth. |
| Curvature Operator 208 | Forman: $k_F(e)$<br>Olivier-Ricci:<br>$k(u,v) = 1 - \frac{W_1(\mu_u, \mu_v)}{d_M(u,v)}$ | - Forman: Edge-parallel reductions<br>- Ollivier: Batched entropic OT (Sinkhorn)<br>- sinkhorn_batch(C_b,e,T,s) | Forman: O(m)<br>Sinkhorn: O(Bd² I) |
| Projection Operator 210 | $P(x) = arg\min_{v \in V}\|\phi(v) - x\|^2$<br>$+ \lambda R(v)$ | Two-stage: ANN+least squares<br>- Stage 1: GPU ANN<br>- Stage 2: Batched projected CG/L-BFGS | O(n^a), a<1+ O(\|C\|³) |
| Recombination Operator 212 | R(y₁,y₂)=geodesic interpolation(y₁,y₂)+stochastic E | - Batched interpolation on embeddings<br>- z_a=exp(a*log(z₂/z₁))+E<br>- Backproject via local SSSP | O(B\|y\|) |
| Routing Operator 214 | $T(q) = arg\min_{\gamma \in G} \sigma(\gamma, q)$ | - Three-stage: ANN to geodesic to scoring<br>- ANN prefilter for candidates<br>- k-radius geodesic expansion | O(n^a + k\|E'\|)<br>E' = local edges |

SYSTEM AND METHOD FOR EXECUTING SELF-EVOLVING PROPERTY GRAPHS ON GPU HARDWARE

CROSS-REFERENCE TO RELATED APPLICATIONS

Priority is claimed in the application data sheet to the following patents or patent applications, each of which is expressly incorporated herein by reference in its entirety:
Ser. No. 19/443,002
63/875,311

BACKGROUND OF THE INVENTION

Field of the Art

The present invention is in the field of computer-implemented cognitive architectures for processing experiential data streams, and more particularly to GPU-accelerated graph-based systems that achieve logarithmic memory scaling through geometric transformations of dynamic property graphs for real-time decision support and pattern recognition applications.

Discussion of the State of the Art

Modern artificial intelligence and cognitive computing systems face fundamental scaling limitations when processing continuous streams of experiential data. Neural network architectures, including large language models (LLMs) and deep learning systems, require extensive training phases followed by static inference, with memory requirements growing linearly or super-linearly with model capacity. These systems cannot continuously incorporate new experiences without periodic retraining, and their monolithic weight matrices provide no mechanism for selective memory management or structural adaptation during operation.

Multi-agent systems (MAS) represent an alternative approach where distributed agents coordinate through message passing to achieve collective intelligence. However, MAS architectures suffer from quadratic scaling of communication overhead as the number of agents increases. Each agent must potentially communicate with every other agent, resulting in $O(N^2)$ message complexity that renders these systems computationally intractable beyond modest scales. Furthermore, the lack of shared representation across agents leads to redundant processing and inconsistent world models that diverge over time.

Graph neural networks (GNNs) have emerged as a method for processing structured data by propagating information through graph topologies. While GNNs can handle dynamic graphs to some extent, they remain fundamentally tied to the training-inference paradigm of neural networks. The learned parameters are static between training sessions, and the architectures lack mechanisms for continuous structural evolution. Memory usage in GNNs typically scales linearly with the number of nodes and edges, providing no compression benefits as experiential data accumulates.

Symbolic AI systems maintain explicit knowledge representations using logic-based formalisms, production rules, or semantic networks. These systems can reason about their knowledge and update their rule bases, but suffer from brittleness when confronted with continuous, noisy, real-world data streams. The manual engineering of rules and ontologies cannot keep pace with the complexity and variability of experiential input, and the discrete nature of symbolic representations prevents smooth adaptation and generalization.

Existing GPU-accelerated graph processing frameworks focus on static graph analytics or batch updates rather than continuous evolution. Systems like NVIDIA's cuGraph and GraphBLAS provide efficient primitives for graph algorithms but lack the self-executing characteristics needed for autonomous cognitive processing. These frameworks require external orchestration and cannot adapt their execution patterns based on data characteristics or system load.

Current approaches to memory management in continuous learning systems rely on either forgetting mechanisms that discard old information or replay buffers that store raw experiences. Forgetting leads to catastrophic loss of previously learned patterns, while replay buffers exhibit linear memory growth that becomes unsustainable for long-running systems. No existing architecture provides principled compression that preserves essential structure while bounding memory growth.

What is needed is a cognitive architecture that combines the parallel processing capabilities of GPUs with a graph-based representation that can evolve continuously without external orchestration, support logarithmic rather than linear memory scaling through principled compression mechanisms, transform communication overhead from a burden into a driver of system coherence, and maintain consistent performance across scales from hundreds to millions of experiential inputs while preserving the ability to extract meaningful patterns and generate adaptive responses in real-time.

SUMMARY OF THE INVENTION

Accordingly, the inventor has conceived and reduced to practice, a system and method for self-executing graphs wherein execution semantics are encoded within graph elements themselves rather than imposed by external schedulers. The system comprises a dynamic property graph with vertices and edges that encode execution semantics specifying computational operations and graph-internal triggering conditions. An execution engine evaluates these triggering conditions by monitoring graph state, detects satisfaction through graph-internal evaluation, and initiates bound computational operations. Triggering conditions are expressed in terms of vertex or edge traversal, property changes, geometric properties such as curvature, or topological connectivity patterns. The graph autonomously determines when and which operations execute based on graph-resident execution semantics. In distributed embodiments, multiple local coordinators evaluate triggers within assigned graph regions and coordinate through peer-to-peer messaging without centralized scheduling. Applications include autonomous cognitive systems, adaptive control systems, and scalable distributed computation requiring self-regulating execution without centralized bottlenecks.

According to a preferred embodiment, a computer-implemented system for executing self-executing graphs is disclosed, comprising: a memory and one or more processors; a dynamic property graph comprising vertices and edges, at least a subset of the vertices or edges encoding execution semantics that specify: one or more computational operations to be performed on the dynamic property graph; and one or more graph-internal triggering conditions expressed in terms of at least one of: traversal of vertices or edges, changes in vertex or edge properties, geometric properties of graph regions, or topological properties of graph structure;

an execution engine configured to: evaluate the graph-internal triggering conditions encoded in the execution semantics by monitoring graph state; detect satisfaction of said triggering conditions through graph-internal evaluation; initiate the computational operations bound to satisfied triggering conditions; and execute said computational operations to modify the dynamic property graph; wherein the dynamic property graph determines when and which computational operations execute based on the graph-internal triggering conditions encoded in the execution semantics.

According to another preferred embodiment, a computer-implemented method for executing self-executing graphs is disclosed, comprising the steps of: providing a dynamic property graph comprising vertices and edges, at least a subset of the vertices or edges encoding execution semantics that specify: one or more computational operations to be performed on the dynamic property graph; and one or more graph-internal triggering conditions expressed in terms of at least one of: traversal of vertices or edges, changes in vertex or edge properties, geometric properties of graph regions, or topological properties of graph structure; evaluating, by an execution engine, the graph-internal triggering conditions encoded in the execution semantics by monitoring graph state; detecting satisfaction of said triggering conditions through graph-internal evaluation; initiating the computational operations bound to satisfied triggering conditions; and executing said computational operations to modify the dynamic property graph; wherein the dynamic property graph determines when and which computational operations execute based on the graph-internal triggering conditions encoded in the execution semantics.

According to an aspect of an embodiment, evaluating the graph-internal triggering conditions and executing the computational operations are performed using one or more graphics processing units, and wherein the computational operations comprise operator kernels executable on the graphics processing units.

According to an aspect of an embodiment, the operator kernels comprise geometric operators including at least one of: diffusion operators, geodesic operators, curvature operators, spectral operators, or recombination operators.

According to an aspect of an embodiment, the execution semantics further encode execution constraints comprising at least one of: rate limits on operation invocation frequency, resource limits on computational resource consumption, or priority specifications for operation scheduling, and wherein the method further comprises enforcing said execution constraints prior to initiating the computational operations.

According to an aspect of an embodiment, the method includes evaluating, by a trigger coordinator, the graph-internal triggering conditions; and gating, by a regulation enforcer, initiation of the computational operations based on execution constraints encoded in the execution semantics.

According to an aspect of an embodiment, the vertices comprise event vertices representing experiential inputs and communication vertices representing information exchanges.

According to an aspect of an embodiment, the graph-internal triggering conditions comprise at least one of: traversal-based triggers that initiate computational operations based on vertex or edge visitation frequency, state-change triggers that initiate computational operations upon property modifications, geometric triggers that initiate computational operations based on curvature values or flow properties, or topological triggers that initiate computational operations based on connectivity patterns.

According to an aspect of an embodiment, the dynamic property graph is partitioned into a plurality of graph regions, and wherein the method further comprises: evaluating, by a plurality of local coordinators, graph-internal triggering conditions within respective assigned graph regions; and communicating between the local coordinators via peer-to-peer messaging to coordinate execution affecting multiple graph regions.

According to an aspect of an embodiment, evaluating the graph-internal triggering conditions occurs continuously as the dynamic property graph evolves through execution of the computational operations.

According to an aspect of an embodiment, executing the computational operations comprises modifying the dynamic property graph by at least one of: creating vertices or edges, deleting vertices or edges, modifying properties of vertices or edges, or modifying the execution semantics encoded in vertices or edges.

BRIEF DESCRIPTION OF THE DRAWING FIGURES

FIG. 2 illustrates an exemplary operator-to-kernel mapping table showing the correspondence between theoretical geometric operators and their GPU kernel implementations, according to an embodiment.

DETAILED DESCRIPTION OF THE INVENTION

Figure 1:
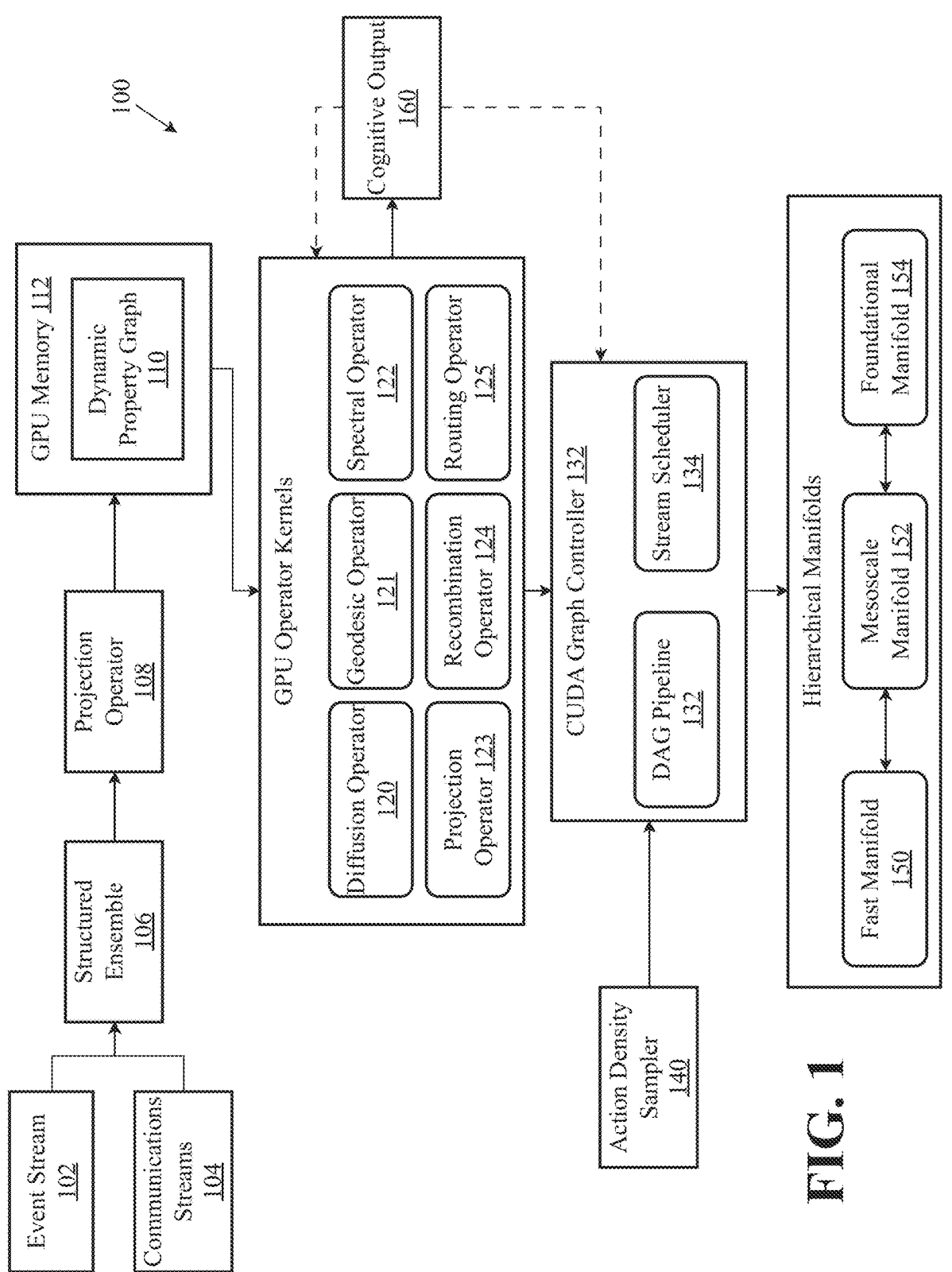
FIG. 1 is a block diagram illustrating an exemplary system architecture of a manifold engine for executing a self-evolving property graph on GPU, according to an embodiment.

The inventor has conceived, and reduced to practice, a system and method for self-executing graphs wherein execution semantics are encoded within graph elements themselves rather than imposed by external schedulers. The system comprises a dynamic property graph with vertices and edges that encode execution semantics specifying computational operations and graph-internal triggering conditions. An execution engine evaluates these triggering conditions by monitoring graph state, detects satisfaction through graph-internal evaluation, and initiates bound computational operations. Triggering conditions are expressed in terms of vertex or edge traversal, property changes, geometric properties such as curvature, or topological connectivity patterns. The graph autonomously determines when and which operations execute based on graph-resident execution semantics. In distributed embodiments, multiple local coordinators evaluate triggers within assigned graph regions and coordinate through peer-to-peer messaging without centralized scheduling. Applications include autonomous cognitive systems, adaptive control systems, and scalable distributed computation requiring self-regulating execution without centralized bottlenecks.

The present invention provides a computational system, referred to herein as the Manifold Engine, that realizes cognitive processes through continuous execution of operators on a structured graph representation of experiential flows. Unlike conventional neural network architectures that alternate between training and inference phases or symbolic manipulation systems that operate on discrete rules, the Manifold Engine treats cognition as the continuous evolution of a weighted property graph whose geometric properties encode experiential structure. In this framework, a cognitive manifold is represented discretely as a property graph comprising nodes that encode events and communications, with operators that approximate the continuous geometry of cognitive processes.

In one exemplary embodiment, a self-executing graph is implemented as a persistent cognitive substrate configured to maintain and operate over a graph-resident representation of cognitive entities and reasoning activity. In this embodiment, nodes represent cognitive entities including concepts, experiences, and abstracted thoughts, and edges represent relationships including semantic coupling and temporal adjacency between such entities. The self-executing graph further stores, within one or more graph elements, execution semantics that specify reasoning operations, consolidation operations, recombination operations, and retrieval operations, such that the execution semantics are invoked in response to one or more graph-internal conditions rather than by an external scheduler.

In the same embodiment, traversal of the self-executing graph corresponds to an attention flow or reasoning flow over the cognitive substrate. For example, a node representing a conceptual cluster stores an execution rule that, when a measured traversal frequency associated with that node exceeds a threshold, causes invocation of a recombination operator that generates a generalized abstraction from one or more related nodes and edges. The recombination is performed as an intrinsic graph execution event, without a separate process explicitly scheduling a consolidation phase. As a result, the self-executing graph supports continuous reasoning, background consolidation, and adaptive memory shaping as properties of the graph's endogenous execution.

In another exemplary embodiment, a self-executing graph is implemented as an autonomous decision or control system configured to generate, update, and apply control decisions based on graph-internal execution semantics. In this embodiment, nodes represent at least one of system states, sensor observations, inferred conditions, candidate control actions, or action outcomes, and edges represent feasible transitions, causal relationships, or constraint dependencies between such nodes. The self-executing graph further stores execution semantics within one or more graph elements, the execution semantics specifying at least one of a control law, an evaluation criterion, a constraint propagation rule, or a policy update operation, such that the specified operation is invoked in response to one or more changes in graph state, observed inputs, or system dynamics.

In the same embodiment, execution is triggered by detected state changes or updated observation data. For example, a node corresponding to a detected condition stores a trigger rule that initiates execution of a control operator when a confidence measure associated with the detected condition satisfies a threshold. The resulting execution updates one or more downstream nodes corresponding to recommended actions, applies one or more constraints to restrict incompatible actions, and propagates inhibitory signals or constraint flags along one or more edges to suppress responses that violate current operating conditions. As a result, the self-executing graph provides continuous, graph-driven adaptation of decisions and control outputs without requiring discrete planning cycles or externally scheduled inference phases.

In another exemplary embodiment, a self-executing graph is implemented as a self-regulating knowledge graph configured to maintain coherence of a knowledge base by executing graph-resident validation and maintenance operations in response to knowledge changes. In this embodiment, nodes encode knowledge elements, assertions, and/or evidence items, and edges encode relationships between the knowledge elements, including at least one of provenance links, support links, contradiction links, or inference pathways. The self-executing graph further stores, within one or more graph elements, execution semantics that specify validation rules, contradiction-detection rules, consolidation rules, and/or conflict-resolution rules, such that the specified rules are invoked as a consequence of graph state rather than by an external maintenance process.

In the same embodiment, execution is triggered by addition, modification, deletion, and/or detected conflict of one or more knowledge elements. For example, when a first knowledge node and a second knowledge node become sufficiently similar based on a similarity score computed from their attributes, neighborhood structure, or linked evidence, the execution semantics invoke a consolidation or generalization operator that merges redundant content, generates a higher-level abstraction, and updates associated provenance edges to preserve traceability. As another example, when a contradiction condition is detected between two assertions, the execution semantics invoke a conflict-resolution operator that annotates the conflicting nodes with contradiction metadata, propagates a conflict indicator along one or more inference pathways, and selectively suppresses downstream inferences that depend on the conflicted assertions until the conflict is resolved.

As a result, the knowledge graph maintains internal consistency and scalable organization over time by continuously applying coherence-preserving operations as endogenous graph execution events, without requiring a separately scheduled reconciliation job or external curator process.

In another exemplary embodiment, a self-executing graph is implemented as an adaptive scheduling and resource-management substrate configured to allocate computational resources and regulate task execution based on graph-internal execution semantics. In this embodiment, nodes represent at least one of computational tasks, execution queues, or resource pools, and edges represent at least one of dependency relationships, contention relationships, or priority relationships between such nodes. One or more graph elements further store execution semantics specifying scheduling rules, throttling rules, and/or prioritization rules that govern when a given task node is permitted to execute, deferred, or suppressed.

In the same embodiment, execution is triggered by changes in one or more measured system conditions, including load, utilization, latency, contention, or resource-availability metrics represented within the graph state. For example, when utilization of a resource pool satisfies a threshold condition, execution semantics associated with a compute-intensive task node cause suppression or deferral of one or more lower-priority task nodes, and optionally adjust an execution rate, concurrency limit, or admission control for tasks contending for the resource pool. In this manner, scheduling decisions are produced as endogenous graph execution events responsive to system state, without requiring a centralized scheduler to determine task ordering or execution gating.

In another exemplary embodiment, a computing system implements a hybrid execution architecture in which a self-executing graph operates concurrently with one or more externally scheduled components. In this embodiment, one or more first functional portions of the system are realized using self-executing graph elements that encode execution semantics and trigger conditions, such that core reasoning functions and/or control functions are initiated as endogenous graph execution events responsive to graph state. One or more second functional portions of the system remain implemented as externally scheduled processes, including batch analytics functions, reporting functions, archival functions, and/or other background workloads executed according to a scheduler, timer, job queue, or orchestration framework external to the self-executing graph.

In the same embodiment, execution authority is selectively delegated to one or more regions of the graph. For example, a first region is configured to self-execute one or more graph-resident operators while a second region is configured to operate in a read-only or externally gated mode, such that externally scheduled components control whether and when execution semantics associated with the second region are permitted to run. The system further supports one or more fallback modes in which execution control is reverted from the self-executing graph to an external controller upon satisfaction of one or more specified conditions, including detected faults, resource-threshold violations, policy constraints, safety-rule violations, or degraded performance conditions. As a result, the hybrid execution architecture enables partial adoption of self-executing graph behavior while maintaining externally scheduled execution for selected workloads and providing controlled transitions between internal graph-driven execution and external scheduling.

According to various embodiments, the Manifold Engine employs a dynamic property graph $G=(V, E, A)$ as its fundamental data structure. The vertex set $V$ can be partitioned into two disjoint subsets: event vertices $V_e$ representing (but not limited to) sensor observations, user actions, or environmental occurrences, and communication vertices $V_c$ representing (but not limited to) dialog, rationale, or coordination signals. The edge set $E \subseteq V \times V$ comprises directed edges that encode relations, temporal ordering, or causal couplings between vertices. A property assignment function $A: V \cup E \rightarrow R^k$ maps both vertices and edges to k-dimensional property vectors, which may include, but are not limited to, embeddings, timestamps, weights, and domain-specific metadata. Each cognitive manifold M is realized as a geometric proxy of the graph G, wherein a distance function $d_M$ is derived from weighted path lengths through the graph, and local curvature is derived from flow divergence or optimal transport computations over vertex neighborhoods. This dual nature of G as both a storage structure and an executable object enables its topology to evolve with experiential input while operators instantiate manifold dynamics thereon.

An experiential trajectory within the Manifold Engine can be defined as a sequence of vertices $\gamma=(v_0, v_1, \ldots, v_T)$, where each $v_t \in V$, such that consecutive vertices are connected by edges $(v_t, V_{t+1}) \in E$ and their associated timestamps satisfy the temporal ordering constraint $\tau(v_t) < \tau (v_{t+1})$. Each such trajectory induces a corresponding path in the cognitive manifold through a projection mapping $\pi: \gamma \rightarrow \pi(\gamma) \subset M$, with the path length defined as:

$$L(\gamma) = \sum_{t=0}^{T-1} d_M(v_t, v_{t+1})$$

where $d_M$ represents the manifold distance metric. The persistence, reuse, and recombination of these trajectories serve as discrete computational correlates of geodesic motion and manifold condensation processes in the continuous geometric formulation.

In various embodiments, the Manifold Engine implements cognitive processes through an operator algebra O acting on functions $f: V \rightarrow R^d$ defined over the graph vertices. The system employs a plurality of fundamental operators that realize the canonical geometric functionals. The diffusion operator $D_t$, $f=e^{-tL}f$, where $L=D-A$ is the graph Laplacian with D being the degree matrix and A the adjacency matrix, propagates information along graph edges and approximates the heat kernel $e^{-t\Delta}$ on the continuous manifold. The geodesic operator:

$$G(u, v) = \min_{\gamma:u \rightarrow v} L(\gamma)$$

computes minimal path lengths between vertices u and v, implemented on GPUs through multi-source shortest path kernels to approximate geodesic distances in M. The spectral operator:

$$S_k f = \sum_{i=1}^{k} \langle f, \phi_i \rangle \phi_i$$

projects function f onto the first k eigenmodes of the Laplacian, where $$\langle (\lambda_i, \phi_i) \rangle_{i=1}^{k}$$

are the eigenpairs, revealing global structure and supporting manifold condensation. The curvature operator computes Ollivier-Ricci curvature:

$$k(u, v) = 1 - \frac{W_1(\mu_u, \mu_v)}{d_M(u, v)}$$

for edge e=(u,v), where $W_1$ is the 1-Wasserstein distance between local probability measures $\mu_u$ and $\mu_v$, quantifying compression pressure and driving pruning or reinforcement decisions. The projection operator:

$$P(x) = \operatorname*{argmin}_{v \in V} \|\phi(v) - x\|^2 + \lambda R(v)$$

maps external embeddings $x \in R^m$ into the manifold, where $\phi(v)$ is the vertex embedding and R(v) encodes structural regularization. The recombination operator $R(\gamma_1, \gamma_2)$ generates new trajectory candidates through geodesic interpolation of existing trajectories $\gamma_1$ and $\gamma_2$, with coherence evaluated by a fitness functional $F[\gamma]$. This operator implements dreaming and abstraction by the manifold engine. The routing operator:

$$T(q) = \operatorname*{argmin}_{\gamma \sqsubseteq G} \sigma(\gamma, q)$$

identifies optimal trajectories (e.g., trajectory candidate) for a given query q, where $\sigma$ is a relevance score combining one or more of proximity, novelty, recency, and trust metrics. Other metrics may be used in various embodiments of the system and methods described herein.

The Manifold Engine enables autonomous operation through self-executing graphs, wherein operator pipelines can be captured as directed acyclic graphs (DAGs) of GPU kernels: $\Pi = (O_1 \rightarrow O_2 \rightarrow \ldots \rightarrow O_n)$. These pipelines are executed repeatedly over the evolving graph G without external scheduling intervention. Each pipeline corresponds to a canonical cognitive loop, such as, for example, the sequence projection→diffusion→curvature→recombination, implementing specific aspects of manifold evolution. Once captured, these pipelines can be replayed continuously through hardware-accelerated execution mechanisms, defining self-executing graphs as data structures whose dynamics are intrinsic rather than externally scheduled. This architecture enables the system to maintain continuous cognitive processes without the discrete phase transitions characteristic of traditional machine learning systems.

The Manifold Engine architecture translates abstract geometric functionals into executable computational algebra through the integration of a property graph schema, trajectory formalism, and operator calculus. In operation, events and communications enter the system as streams, undergo projection into the graph structure G, and evolve under the continuous application of operators O. This creates a living computational substrate wherein the cognitive manifold's structure and dynamics are sustained by self-executing pipelines, providing a concrete realization of geometric cognition on parallel computing hardware.

The system and methods disclosed herein provide specific computational implementations of geometric functionals through a systematic mapping of canonical cognitive principles to executable GPU operators. Each operator in the Manifold Engine corresponds to a fundamental geometric operation that enables cognition to emerge from the continuous evolution of the property graph structure. The following paragraphs describe how abstract mathematical functionals can be realized as concrete computational kernels executing on parallel hardware architectures.

In various embodiments, the Manifold Engine implements the principle of attention as geodesic motion through multi-source shortest path computations on the property graph. In accordance with the canonical formulation wherein attention minimizes a cognitive action functional, the system computes:

$$G(u, v) = \min_{\gamma: u \rightarrow v} L(\gamma)$$

where $\gamma$ represents an experiential trajectory connecting vertices u and v, and $L(\gamma)$ denotes the trajectory length under the induced metric. This computation can realized through parallel single-source shortest path (SSSP) kernels executing on GPU hardware, enabling real-time evaluation of candidate trajectories formed by sequences of events and communications. The geodesic operator thereby provides a computationally efficient mechanism for determining optimal paths through the experiential manifold, with the minimal path length serving as a measure of cognitive distance between states.

The system implements compression pressure, which quantifies redundancy and drives manifold condensation, through curvature operators acting on the graph structure. The Manifold Engine can be configured to employ two complementary curvature computations: Forman curvature and Ollivier-Ricci curvature. The Forman curvature provides computationally efficient local estimates according to the formula:

$$\kappa_F(e) = 1 - \frac{1}{2}\left(\frac{w(u)}{w(e)} + \frac{w(v)}{w(e)}\right) + \sum_{f \supset e} \frac{w(e)}{\sqrt{w(e)w(f)}}$$

where e=(u,v) is an edge, w denotes weights, and the summation extends over edges f sharing a vertex with e. The Ollivier-Ricci curvature refines alignment measurements through optimal transport computations where the 1-Wasserstein distance between probability measures $\mu_u$ and $\mu_v$ supported on vertex neighborhoods. These curvature fields generate compression pressure $P(z) = \|\nabla \cdot \vec{v}(z)\|$, which the engine utilizes to make pruning decisions, merge redundant structures, and reinforce significant experiential trajectories.

The Manifold Engine realizes spectral geometry operations through eigen-decomposition of the graph Laplacian, providing mechanisms for dimensional reduction and structure stabilization. The spectral operator projects functions f onto the subspace spanned by the first k eigenvectors $\{\varphi_i\}$ of the Laplacian operator, where the eigenvectors correspond to the k smallest eigenvalues. These spectral projections yield low-dimensional coordinate representations for events and communications, enabling efficient condensation of trajectories into macro-structures while preserving essential geometric relationships. The spectral decomposition further supports cross-manifold alignment in hierarchical architectures by providing a common basis for comparing structures across different temporal scales.

The system implements metabolic dynamics through recombination operators that generate novel experiential trajectories by interpolating between existing paths. Given two trajectories $\gamma_1$ and $\gamma_2$, the recombination operator computes interpolants according to:

$$R(\gamma_1, \gamma_2) = \exp_{\gamma_1(0)}(\alpha \log_{\gamma_1(0)}(\gamma_2(0)) + \varepsilon)$$

where $\alpha \in [0,1]$ controls the interpolation parameter, exp and log denote exponential and logarithm maps in the manifold, and $\varepsilon$ represents stochastic perturbation sampled from a controlled distribution. In some aspects, the system may evaluate candidate interpolants using a coherence functional $F[\gamma]$ that measures trajectory fitness based on local consistency, global alignment, and information content. Trajectories satisfying $F[\gamma] > F_{threshold}$ are retained in the graph structure, while others are discarded, thereby implementing a generative process that explores the space of possible experiences while maintaining structural coherence.

The Manifold Engine implements the principle that communications constitute geometric actions by transforming communication signals into modifications of the manifold's connection structure. When a communication $c_{ij}(t)$ between processes i and j is received, the system updates connection coefficients according to $\Gamma^k_{ij} = \Gamma^k_{ij} + f(c_{ij}(t))$, where $\Gamma^k_{ij}$ are the connection coefficients defining parallel transport on the manifold, and f is a mapping function that translates communication content into geometric perturbations. This mechanism enables communications to braid trajectories across different roles or processes, creating coupling between otherwise independent experiential flows. The communication density:

$$\rho_g = \frac{1}{T} \int_0^T \lambda_e |E_{events}(t)| + \lambda_c |E_{comm}(t)| dt$$

where $\lambda_e$ and $\lambda_c$ are weighting parameters, governs operator scheduling with condensation time satisfying $\tau_c \sim 1/\log(1 + \rho_g)$, thereby establishing communications as drivers rather than overhead in the cognitive process.

The system implements hierarchical cognitive structures through explicit submersion and immersion operators that couple manifolds operating at different temporal scales. The Manifold Engine enables upward abstraction through Riemannian submersion mappings $\varphi_{12}: M_1 \to M_2$ and $\varphi_{23}: M_2 \to M_3$, which preserve geodesic structure while reducing dimensionality, enabling event sequences to be abstracted into decision trajectories and ultimately into identity structures. Downward constraint injection can be implemented through Riemannian immersion mappings $\psi_{32}: M_3 \to M_2$ and $\psi_{21}: M_2 \to M_1$, which restrict the configuration spaces of lower manifolds based on higher-level policies and values. The system quantifies consistency between abstraction and constraint paths through residual functionals $C(p) = d_{M3}(u(p), d(p))$, where $u(p) = (\varphi_{23} \circ \varphi_{12})(p)$ represents the upward abstraction path and $d(p) = (\psi_{32}^{-1} \circ \psi_{21}^{-1})(p)$ represents the downward constraint path. Gradient descent on the foundational manifold according to $dr/dt = -\nabla_{M3} C(r)$ implements metacognitive correction, adjusting high-level constraints to minimize divergence.

The Manifold Engine supports distributed cognitive systems through federation mechanisms that enable multiple engine instances to maintain coherence while preserving local autonomy. The system can be configured to quantify alignment between federated instances using three divergence measures: metric divergence $$D_{metric}(M_2^A, M_2^B) = \inf_{f \in Diff(M_2)} \int_{M_2} \|g_2^A - f * g_2^B\|^2 d\mu$$

which measures differences in manifold geometry; spectral divergence $$D_{spectral}(M_2^A, M_2^B) = \sum_{k=1}^{\infty} \alpha_k |\lambda_k^A - \lambda_k^B|$$

which compares eigenvalue spectra with exponentially decaying weights $\alpha_k$; and foundational divergence $$D_{found}(M_3^A, M_3^B) = d_{M_3}(r^A, r^B)$$

which measures distances between identity structures. Each engine can be configured to maintain autonomy envelopes $\varepsilon_i = (\varepsilon_{i,1}, \varepsilon_{i,2}, \varepsilon_{i,3})$ specifying maximum tolerable divergences at each hierarchical level. Exceeding thresholds may trigger corrective actions including, but not limited to, resynchronization, rollback, or human arbitration. The system implements federated residual minimization to maintain global coherence while respecting local autonomy constraints, enabling scalable deployment across distributed cognitive grids.

Through the systematic mapping of canonical geometric functionals to executable GPU operators, the Manifold Engine provides a complete computational realization of geometric cognition. Each functional-geodesic motion for attention, compression pressure through curvature, spectral condensation for structure extraction, recombination for generative exploration, communication-induced geometry for coordination, hierarchical coupling for multi-scale reasoning, and federation for distributed deployment-corresponds to specific operator implementations on property graphs. This comprehensive operator suite enables the transformation of abstract geometric theory into practical, scalable computation on modern parallel hardware architectures.

The system and methods described herein enable fundamental scaling advantages through mathematical properties that emerge naturally from the execution of geometric operators rather than being imposed through external design constraints. Unlike conventional architectures where scaling represents a peripheral engineering concern, the Manifold Engine exhibits scaling laws as inherent consequences of its operator algebra, ensuring that cognitive capabilities improve rather than degrade with increasing experiential volume. These emergent scaling properties distinguish the present system from both large language models (LLMs) that require exponential cost increases and multi-agent systems that suffer quadratic coordination overhead.

The Manifold Engine achieves logarithmic memory growth through the natural redundancy compression inherent in its geometric operators. As the system processes n cumulative experiential inputs comprising events and communications projected into the engine, each input perturbs the cognitive manifold while redundant trajectories undergo collapse under compression pressure. The probability that a new input represents genuinely novel information decreases according to Pr(novel at step n)~1/n, reflecting the increasing likelihood that new experiences resemble previously encountered patterns. Consequently, the marginal contribution to manifold size satisfies the differential relationship dM/dn~1/n, where M represents the effective memory size. Integration of this relationship yields the logarithmic scaling law M(n)~log n, where effective memory may be measured through various metrics including manifold dimension, topological complexity, or information-theoretic entropy. This logarithmic bound on memory growth persists even as experiential volume increases without limit, providing a fundamental solution to the memory scaling problem that plagues conventional cognitive architectures.

The system exhibits an intrinsic stabilization time constant that accelerates rather than degrades with increasing experiential density. When inputs arrive at an external action density $\rho_a^{ext}$, the effective manifold size at that density follows $M(\rho_a^{ext})\sim\log(1+\rho_a^{ext})$. The characteristic stabilization time of the manifold, representing the time required for the system to achieve coherent structure after perturbation, is given by $\tau_c\sim 1/M(\rho_a^{ext})\sim 1/\log(1+\rho_a^{ext})$. This inverse logarithmic relationship establishes $\tau_c$ as a cognitive relaxation constant with the remarkable property that higher experiential density produces faster stabilization rather than slower convergence. This behavior inverts the typical scaling relationship observed in multi-agent systems, where increased communication density induces computational collapse, instead achieving enhanced coherence through increased experiential flow.

The Manifold Engine maintains cognitive vitality through a metabolic law governing internal dynamics that prevents stagnation and enables continuous learning. While external input provides new experiential data, cognition requires continual internal motion to maintain adaptability and generate novel insights. The system maintains an internal action density Paint representing the rate of endogenous activities including trajectory replay, recombination operations, and stochastic perturbations. Cognitive persistence demands satisfaction of a metabolic floor constraint: $\rho_a^{int}\geq\rho_a^{min}$, where $\rho_a^{min}$ represents the minimum action density required to sustain cognitive processes. When $\rho_a^{int}<\rho a^{min}$, the velocity field $\vec{v}$ on the manifold vanishes, causing compression pressure $P(z)=\|\nabla\cdot\vec{v}(z)\|$ to decay to zero and resulting in manifold collapse into static configurations. Sustained internal dynamics above the metabolic floor maintain positive compression pressure, ensuring continuous pruning of redundant structures, reinforcement of useful patterns, and exploration of novel recombinations. This metabolic requirement establishes cognition not merely as a passive response to external stimuli but as an active process requiring continual endogenous action.

The operator calculus of the Manifold Engine predicts and exhibits distinct phase transitions at critical densities of events and communications, marking qualitative shifts in cognitive behavior. The system undergoes phase transitions at the following critical density thresholds:

$$\rho_{fast}^{crit}$$

marks the transition from noise to coherent flows on fast manifolds, where random events coalesce into meaningful trajectories;

$$\rho_{meso,1}^{crit}$$

indicates the transition from static configurations to tactical coherence on mesoscale manifolds, enabling coordinated decision-making;

$$\rho_{meso,2}^{crit}$$

represents the transition from mere coherence to generative imagination, where the system begins producing novel trajectories through recombination; and $$\rho_{slow}^{crit}$$

marks the transition from episodic memory to doctrinal attractors on slow manifolds, establishing stable identity structures. The hierarchical coupling through fiber connections between manifolds reduces these critical thresholds, producing cascading stabilization effects across scales. For example, dense event flows on the fast manifold lower the threshold for mesoscale coherence, which in turn accelerates schema consolidation on the slow manifold, creating a synergistic acceleration of cognitive development.

The execution properties of the Manifold Engine yield a constructive, operationally verifiable definition of cognition based on measurable system behaviors rather than abstract philosophical criteria. According to this definition, a system exhibits cognition if it sustains, reuses, and recombines experiential trajectories across episodes while maintaining logarithmic memory growth, possessing an intrinsic stabilization constant, sustaining continual metabolic action, and undergoing phase transitions into coherent regimes. Formally, let $\Gamma(t)$ denote the set of active trajectories at time t, and $F[\gamma]$ represent a fitness functional measuring trajectory coherence and reuse potential. The system's cognitive capacity is quantified by the functional:

$$C(t) = \int_{\Gamma(C)} F[\gamma]d\mu(\gamma)$$

15 where $\mu$ is an appropriate measure over trajectory space. A system is deemed cognitive if it satisfies the persistence criterion:

$$\lim_{T\to\infty} \inf \frac{1}{T} \int_0^T C(t)dt > 0$$

indicating sustained positive cognitive capacity over infinite time horizons. The Manifold Engine satisfies this condition structurally through its operators, which enforce logarithmic memory scaling, maintain nonzero compression pressure through metabolic dynamics, and enable continual trajectory recombination, making cognition an inevitable outcome of system execution rather than an emergent accident.

The scaling laws exhibited by the Manifold Engine represent fundamental mathematical properties of the operator algebra rather than engineering optimizations or heuristic design choices. Through the natural dynamics of geometric operators, the system ensures logarithmic memory growth independent of experiential volume, acceleration of stabilization with increased input density, sustained cognitive vitality through metabolic action requirements, and structured phase transitions marking cognitive development milestones. These properties collectively establish that cognition in the Manifold Engine is not a fragile computational artifact requiring careful tuning but rather the mathematically inevitable outcome of executing the specified operator algebra, providing a robust foundation for scalable cognitive systems.

The system and methods disclosed herein provide a comprehensive GPU implementation architecture that realizes the Manifold Engine's theoretical operators as high-performance computational kernels executing on modern (and future) graphics processing hardware. An implementation specifies data structures optimized for parallel access patterns, kernel interfaces with defined complexity bounds, orchestration mechanisms utilizing CUDA Graphs and Streams, multi-GPU scaling through sharding and collective operations, persistent storage with crash consistency guarantees, and numerical stability policies ensuring reproducible execution. The following detailed specification enables the geometric operators described herein to execute with predictable performance characteristics on commercially available GPU platforms.

The GPU implementation employs specialized data structures optimized for coalesced memory access and minimal storage overhead. The dynamic property graph G=(V, E, A) can be maintained in GPU memory using a hybrid storage scheme comprising three primary components. First, adjacency information utilizes Compressed Sparse Row (CSR) format for the working graph, with $row_{ptr} \in N^{|V|+1}$, $col_{ind} \in N^{|E|}$, and weights $w \in R^{|E|}$, alongside Coordinate (COO) format for incremental updates stored in journals. Second, vertex and edge properties employ Structure-of-Arrays (SoA) layout to maximize memory coalescing: $\Phi_V=\{\phi^{(1)}, \ldots, \phi^{(d)}\} \in R^{d\times|V|}$ for vertex properties and $\Phi E=\{\psi^{(1)}, \ldots, \psi^{(r)}\} \in R^{r\times|E|}$ for edge properties. Third, the system can be configured to maintain append-only journals as GPU-resident ring buffers storing edge and vertex deltas in the format (u, v, w, meta), with periodic compaction operations rebuilding the CSR representation from accumulated COO entries to amortize dynamic update costs. Memory allocation may utilize pooled allocators to prevent fragmentation, with pinned host buffers facilitating ingress/egress operations. The system explicitly avoids Unified Virtual Memory on performance-critical paths to ensure data locality and predictable latency. A hot/cold tiling scheme partitions vertices into frequently accessed hot tiles pinned to device memory and cold tiles accessed via GPUDirect Storage when necessary.

The system implements each theoretical operator as one or more GPU kernels with well-defined interfaces and complexity characteristics. The operator-to-kernel mapping provides the following implementations: Diffusion/Heat Kernel, Geodesic (Multi-Source SSSP), Spectral (Top-k Eigenpairs), Curvature (Compression Pressure), Projection (External→Manifold), Recombination (Dreaming), and Routing (Query→Trajectory).

The diffusion operator $D_{tf}=e^{-tL}f$, where L=D−A represents the graph Laplacian, is implemented through iterative sparse matrix-vector (SpMV) operations combined with Krylov subspace approximation. The kernel interface diffuse$_{spmv}$(L, f, t, k, s) constructs the Krylov subspace Kk(f)=span{f, Lf, ..., $L^{k-1}$f}, solves the reduced system, and updates f←$e^{-tL}$f through projection, where s denotes the CUDA stream handle.

The geodesic operator $$G(S) = \min_{\gamma:u\in S\to v} L(\gamma)$$

employs a $\Delta$-stepping algorithm with bucketed frontiers for parallel execution. The kernel sssp$_{delta}$(A, w, S, s) initializes distances d[v]=∞ for all vertices except source vertices where d[u]=0 for u∈ S, then iteratively relaxes edges using light/heavy edge classification within buckets implemented as device-side queues. Relaxation operations utilize warp-aggregated atomic operations to reduce memory contention. The algorithm exhibits O(|E|+|V| log W) expected complexity, where W represents the weight spread, with latency hiding achieved through concurrent bucket processing on independent streams.

The spectral operator computing L$\phi_i=\lambda i*\phi_i$ for i=1 ... k employs a Lanczos algorithm with selective reorthogonalization and mixed-precision arithmetic. The kernel lanczos$_{topk}$(L, k, $\epsilon$, s) implements block-Lanczos iteration on the CSR-formatted Laplacian L, performs selective Gram-Schmidt orthogonalization, and extracts eigenpairs through Rayleigh-Ritz procedures with error-controlled restarts. The implementation utilizes TF32/FP32 for accumulation operations and FP64 for critical correction steps, maintaining residual bounds $\|L\phi_i-\lambda_i*\phi_i\|_2 \leq \epsilon$. Warm-start capabilities reuse previous Ritz pairs after incremental graph updates, with low-rank update formulas avoiding full recomputation.

The system implements two curvature measures with different computational trade-offs. Forman curvature executes as an edge-parallel kernel performing reductions over two-hop stencils with coalesced reads via CSR row slicing. Ollivier-Ricci curvature employs batched entropic optimal transport solved through Sinkhorn iteration. The kernel sinkhorn$_{batch}$({C$_b$}, $\epsilon$, $\tau$, I, s) processes batches b of cost matrices C$_b$ representing pairwise distances on neighborhoods N$_K$(u), N$_K$(v), iterating K=exp(−C$_b$/$\epsilon$), u←a/(Kv), v←b/(K$^T$ u) for I iterations or until residual $\|r\|<\tau$. The entropic approximation W$_1^\epsilon$ introduces bias O($\epsilon$) but enables efficient parallel computation.

The projection operator:

$$P(x) = \arg\min_{v\in V}\|\phi(v) - x^2\| + \lambda R(v)$$

employs a two-stage approach for efficiency. Stage one utilizes GPU-accelerated approximate nearest neighbor (ANN) search, implementing either IVF-PQ or graph-based ANN to identify a candidate set C. Stage two solves a small batched least-squares problem:

$$\min_{\alpha \geq 0, 1^T \alpha = 1} \|X_C \alpha - x\|_2^2 + \lambda \alpha^T \Omega \alpha$$

over the candidate set using batched projected conjugate gradient or L-BFGS optimization.

The recombination operator generates geodesic interpolants $z_\alpha = \exp_{z1}(\alpha \log_{z1}(z_2)) + \xi$, where $\alpha \in [0,1]$ and $\xi \sim N(0,\Sigma)$ represents stochastic perturbation. The kernel performs batched interpolation on embedded coordinates followed by backprojection to feasible paths via local SSSP computation. Fitness evaluation $F[\gamma]$ employs parallel reductions, with high-fitness survivors appended to the graph journals for integration.

The routing operator $$T(q) = \arg \max_{\gamma}(\gamma, q)$$

combines multiple stages: ANN prefiltering identifies initial candidates, k-radius geodesic expansion explores local neighborhoods, and top-K selection applies a fused scoring kernel computing $\sigma$ as a weighted combination of proximity, novelty, recency, and trust metrics. Scatter-gather patterns minimize DRAM round-trips during the scoring phase.

The system enables efficient execution through sophisticated orchestration of GPU resources. Operator DAGs $\Pi = (O_1 \rightarrow \ldots \rightarrow O_n)$ can be captured as CUDA Graphs, amortizing kernel launch overhead and enabling single-submission execution of complex pipelines. Parameters such as diffusion time t, eigenvector count k, and convergence tolerance $\varepsilon$ can be updated between graph replays without recapture overhead. Distinct cognitive pipelines, including ingest, diffusion, curvature computation, spectral refresh, and recombination, execute on separate CUDA streams with explicit event-based dependencies. Stream priorities ensure latency-sensitive operations such as query routing preempt background computations like spectral updates. Where register pressure permits, the system fuses micro-kernels (e.g., SpMV followed by reduction) to increase arithmetic intensity and reduce global memory traffic. The scheduler samples action density $\rho_g$ and dynamically adjusts replay frequencies: increasing diffusion rate under high event density while deferring spectral updates when $\rho_g$ is low, yielding an adaptive, density-controlled compute budget.

The implementation scales across multiple GPUs through graph partitioning and collective communication primitives. The vertex set V is partitioned into $$V = \bigsqcup_{p=1}^{P} V_p$$

using graph partitioning algorithms that minimize edge cuts while balancing computational load. Each GPU shard maintains $CSR(V_p)$ for its local vertices and border caches for halo neighbors required in computations. Journals are maintained per-shard with epoch counters ensuring consistency. Frontier exchanges during SSSP computation and reductions for spectral residuals and curvature statistics utilize NCCL collective operations including all-reduce and all-gather primitives. The system overlaps communication with computation through double-buffered halo exchanges. Load imbalance triggers dynamic vertex migration, with the system selecting boundary tiles to reduce cut ratios and equalize both nonzero counts and frontier sizes. Migrations are batched at compaction points to preserve execution determinism.

The system implements high-bandwidth I/O paths with persistence guarantees. Events and communications arrive as batched records in pinned host buffers, with GPUDirect Storage streaming batches directly to device journals without host memory copies. Periodic checkpoints serialize $row_{ptr}$, $col_{ind}$, w, $\Phi_V$, $\Phi_E$ arrays along with random number generator states to persistent storage. Write-ahead logging (WAL) ensures crash consistency, with all updates logged before commitment. Snapshots maintain version numbers enabling warm restarts and supporting spectral warm-start optimization.

The implementation maintains numerical stability through a comprehensive precision policy and algorithmic safeguards. In some embodiments, the system defaults to FP32 precision with selective use of TF32 or FP16 for GEMV/SpMV operations when error bounds permit, and FP64 for critical operations including Ritz value extraction and residual norm computation. Curvature computations employ log-domain Sinkhorn iteration to prevent numerical underflow. The Lanczos algorithm implements selective reorthogonalization, triggering full reorthogonalization when orthogonality loss exceeds a threshold $\theta$ derived from the measured condition number $\kappa(L)$. Deterministic execution employs segmented reductions with fixed traversal orders and Kahan or pairwise summation for critical accumulations. All update kernels maintain idempotence or provide compensating actions, enabling failed epochs to be retried from WAL boundaries without state corruption.

The implementation exhibits well-characterized asymptotic complexity for each operator, enabling performance prediction and optimization. With n=|V| vertices, m=|E| edges, k eigenpairs, neighborhood size d, and batch size B, the per-replay complexities are: SpMV/Krylov operations require O(km) operations with memory traffic $\Theta(k(m+n))$; SSSP using $\Delta$-stepping exhibits O(m+n log W) complexity; Lanczos top-k computation requires $O(km+k^2 n)$ operations with selective reorthogonalization; Forman curvature computation scales as O(m); batched Sinkhorn optimal transport requires $O(Bd^2 I)$ operations with I iterations; and ANN prefiltering exhibits $O(n^\alpha)$ complexity with $0 < \alpha < 1$ depending on the index structure. Empirically, throughput bottlenecks arise from memory bandwidth limitations for SpMV/SSSP operations and tensor core utilization for batched optimal transport and small dense linear system solves. Roofline analysis guides operator fusion and tiling decisions to maximize hardware utilization.

In some embodiments, the system implements autonomous memory management through curvature-driven compression control loops. Curvature fields k induce compression pressure P, which drives a control loop enforcing memory and quality budgets through the optimization problem:

$$\min_{S \subseteq E} \sum_{e \in S} c(e)$$

subject to $$\sum_{e \in S} k(e) \geq \eta$$

and QoS$\geq\tau$, where c(e) represents edge cost, $\eta$ is the minimum curvature threshold, and $\tau$ is the quality-of-service bound. This knapsack-like selection problem is approximated through greedy thresholding on the ratio $\kappa$/cost implemented as a GPU kernel, with edges falling below threshold marked for pruning during the next compaction cycle.

The implementation ensures reproducible execution and comprehensive testability through multiple mechanisms. All stochastic kernels including recombination and sampling operations utilize recorded random seeds, enabling deterministic replay. Operator DAGs emit compact execution traces including frontier sizes, residual norms, and selected edge sets, facilitating validation of replay equivalence across different builds and hardware configurations. Each kernel may comprise parameterized microbenchmarks with reference implementations, enabling verification of correctness and performance characteristics. Standard test cases can include, but are not limited to, SSSP distance verification on canonical graphs and Lanczos residual norm validation against tolerance bounds.

The following example illustrates application of the Manifold Engine to a naval tactical decision support scenario, demonstrating how the system transforms real-time sensor data and communications into actionable cognitive trajectories. In an exemplary naval deployment scenario, BLUE naval forces employ the Manifold Engine to process and respond to tactical situations involving potential disruptions from RED forces. The system instantiates a three-layer hierarchical manifold structure tailored to naval operations: the fast manifold $M_1$ processes tactical events including sensor detections, vessel positions, speed changes, and course alterations with latencies under 100 milliseconds; the mesoscale manifold $M_2$ maintains doctrinal postures including offensive, defensive, and deception configurations over timescales of minutes to hours; and the foundational manifold $M_3$ encodes long-term strategic identity and operational doctrine specific to naval reasoning norms over days to weeks.

Event streams arrive at rates exceeding 10,000 events per second during active operations, comprising radar tracks, communication intercepts, and blue force position updates, while communication streams include tactical orders, situation reports, and coordination messages between vessels and command centers. The projection operator maps these inputs to graph vertices, with events generating new vertices in the fast manifold and communications creating edges that couple related trajectories. The operator pipeline executes continuously on GPU hardware, with measured latencies under 50 milliseconds from event ingestion to doctrinal update on DGX-class systems. The diffusion operator propagates threat assessments across the sensor network, the geodesic operator computes optimal intercept courses and evasion routes, and the curvature operator identifies redundant sensor reports and overlapping coverage areas, enabling efficient resource allocation.

Traditional naval command systems experience O(N²) scaling as vessel count increases, with communication overhead overwhelming decision processes beyond 100 participants. The Manifold Engine inverts this relationship: as communication density $\rho_g$ increases, the stabilization time $\tau_c \sim 1/\log(1+\rho_g)$ actually decreases, enabling faster convergence to coherent operational pictures. Experimental validation using historical engagement data with N=100 to 10,000 simulated agents and millions of communications demonstrates that coherence metrics including trajectory alignment and spectral gap improve logarithmically with scale, enabling coordination of large, distributed forces that would overwhelm conventional command systems.

The routing operator extracts high-value trajectories representing recommended courses of action based on the current tactical situation. For a submarine detection scenario, the system generates trajectories encoding optimal search patterns based on last known position and ocean conditions, coordinated sensor deployment across multiple platforms, and communication plans that minimize detection probability while maintaining task force coordination. These trajectories are serialized and presented to naval commanders through existing tactical displays, with each trajectory tagged with confidence metrics derived from curvature analysis and historical pattern matching. The continuous execution ensures recommendations adapt in real-time as new sensor data arrives and threat assessments evolve.

In operational testing, the Manifold Engine demonstrates event processing rates exceeding 50,000 events/second on single GPU hardware, memory usage scaling as M(n)~173.3 log(n) bits for n events, end-to-end decision latency under 50 ms for critical threats, sustained operation over 72-hour exercises without memory exhaustion, and successful coordination of 1,000+ distributed sensors and platforms. During reduced operational tempo, the recombination operator generates synthetic trajectories combining elements from multiple historical engagements through "dreaming" cycles that consolidate tactical patterns into reusable schemas. This consolidation process operates continuously in background, with fitness evaluation ensuring only coherent combinations persist, leading to progressive refinement of tactical doctrine encoded in the mesoscale and foundational manifolds without requiring explicit retraining or rule updates.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "attention vector field" refers to a distributed, time-dependent field defined over the latent manifold that governs the instantaneous direction and magnitude of attentional flow. The field may evolve according to partial differential equations that incorporate compression pressure and goal potential gradients. This dynamic attention formulation enables real-time flow modeling, inference stabilization, and explainability through traceable vector paths.

As used herein, "cognitive dynamics engine" or "CDE" refers to an architectural module configured to maintain and evolve the geometry of the latent manifold. The CDE is responsible for computing geodesic paths, estimating curvature, applying compression pressure, and performing structural reorganization, including during background operations such as dreaming. The CDE may expose interfaces for traversal, memory updates, compression, and control feedback, and functions as a substrate-layer system supporting high-level cognition.

As used herein, "compression pressure" refers to a scalar field over the latent manifold that encodes semantic density, memory reuse, or representational redundancy. The pressure at a point may be derived from geometric properties such as Ricci curvature and reflects the cost of traversal or storage in that region. High compression pressure indicates overused or ambiguous areas where pruning, generalization, or reorganization may be necessary. Compression pressure influences cache management, memory shaping, and geodesic routing.

As used herein, "dreaming" refers to a background process in which cached thoughts, trajectories, or bundles are perturbed, recombined, or abstracted or otherwise manipulated to improve manifold coherence and memory efficiency. Dreaming may operate during idle cycles or low-load periods and is driven by curvature smoothing, compression pressure, and generalization gain. The process supports the emergence of new thoughts, refinement of existing structures, and long-term memory consolidation.

As used herein, "generalization" refers to the process of synthesizing a new thought from one or more cached thoughts by identifying shared structure, meaning, or trajectory. Generalized thoughts replace specific exemplars with compressed representations that maintain core semantic content while enabling reuse across a wider range of prompts or tasks. Generalization may occur explicitly during reasoning or asynchronously during background curation or dreaming.

As used herein, "geodesic attention" refers to a formulation of attention in which focus or inference is achieved by computing or approximating a minimal-energy path through the latent manifold. A geodesic attention path minimizes a cognitive action functional that may include kinetic energy, compression pressure, and goal potential. Unlike traditional attention mechanisms that reweight tokens in flat space, geodesic attention produces smooth, structure-respecting flows of reasoning across latent memory.

As used herein, "goal potential field" refers to a scalar utility function defined over the latent manifold that represents the relevance, desirability, or task-alignment of different regions of thought space. The gradient of this field defines an intent vector field, which biases cognitive traversal toward goal-aligned areas. Goal potential may be determined by user prompts, task specifications, or emergent system objectives, and modulates attention, memory retrieval, and trajectory formation.

As used herein, "intent vector field" refers to a directional field over the latent manifold that encodes cognitive drive or utility gradients. It governs the direction and magnitude of traversal for operations such as memory reentry, inference, or exploration. The intent field may be computed from the gradient of a goal potential, derived from user input, or learned from system experience, and is used to align cognitive motion with target outcomes.

As used herein, "latent manifold" refers to a differentiable subspace within a high-dimensional latent hyperspace in which thoughts and thought trajectories are embedded. The manifold may be defined at a given time and is associated with a metric tensor that governs local distance, curvature, and motion. The manifold forms dynamically through the reuse, compression, and interaction of thoughts and supports operations such as geodesic traversal, memory recall, and structural recombination.

As used herein, "latent recombinator" refers to a functional component or method configured to merge or blend similar thoughts, trajectories, or bundles in the latent manifold to form new abstractions. The recombinator may use geometric proximity, semantic alignment, or reuse statistics to determine legal recombinations, subject to type constraints and curvature continuity. It serves as a key mechanism for memory scaling, abstraction, and thought generation.

As used herein, "latent subspace" or "thought bundle" refers to a localized, compressible region of the manifold that contains structurally similar or semantically aligned thoughts. Bundles may form naturally through repeated traversal, co-activation, or recombination, and act as low-energy attractors or semantic zones. Subspaces may support generalization, analogical reasoning, and efficient memory access.

As used herein, "Lorentzian autoencoder" refers to a neural architecture designed to encode spatiotemporal or perceptual input-such as video-into a latent manifold with Lorentzian signature, where one or more dimensions represent time-like directions. The latent structure supports temporally coherent geodesics, semantic compression, and causal continuity. Lorentzian autoencoders enable operations such as zooming, projection, and visual memory traversal.

As used herein, "memory basin" or "basin of recurrence" refers to a region of the latent manifold associated with a previously reinforced or frequently reused trajectory. Such basins exhibit high local curvature and geodesic convergence and serve as attractors for memory reentry. Traversal into a basin may trigger reinstantiation, memory reinforcement, or adaptive reuse, depending on system configuration and goal conditions.

As used herein, "reinstantiation" refers to the act of reconstructing a prior thought trajectory within the current latent manifold geometry. Due to compression or manifold deformation, original paths may no longer exist in exact form; reinstantiation generates an approximate or adapted version guided by curvature, cached data, and intent fields. Reinstantiation supports memory recall, simulation, and introspective review in systems with dynamic cognitive substrates.

As used herein, "self-executing graph" refers to a graph-based computational structure in which one or more graph elements encode executable semantics such that computational operations are initiated directly as a consequence of one or more graph-internal conditions, without requiring an external scheduler to determine which operations execute, wherein the executable semantics specify: a computational action or operator to be invoked; one or more triggering conditions expressed in terms of at least one of graph state, graph structure, or graph traversal; and optionally, one or more constraints on execution rate, execution scope, or resource utilization, such that execution is endogenous and the graph determines when and where computation occurs.

As used herein, "thought" refers to a discrete unit of reasoning or analysis generated by a large language model or multimodal inference engine during its processing of an input prompt. A thought represents the model's intermediate reasoning steps, contextual interpretation, or internal deliberation that contributes to a final output. Thoughts may be atomic (e.g., a factual claim), structured (e.g., an inference chain), or multimodal (e.g., a fused representation of text and video). Unlike raw tokens or embeddings, thoughts encapsulate processed cognition and are suitable for caching, recombination, and reuse across future interactions. Thoughts may be stored explicitly or synthesized during recall and may evolve through compression or generalization.

As used herein, "thought cache" refers to a structured memory layer configured to store and retrieve thoughts based on semantic similarity, contextual alignment, or system policy. The cache may include multiple tiers, such as session caches for short-term interaction, long-term caches for persistent knowledge, and shared or federated caches across devices or agents. Cached thoughts are indexed in latent space and may be retrieved using vector similarity, trajectory proximity, or geodesic alignment. Cached thoughts may be compressed or abstracted over time to reduce redundancy and support scalable reuse.

As used herein, "typed latent entity" refers to a thought or substructure in the manifold labeled with a semantic or functional type, such as but not limited to fact, opinion, concept, trajectory, affect, cluster, or anchor. Typed entities impose constraints on valid operations such as recombination, interpolation, or pruning. Type-aware computation supports lawful memory manipulation, structured reasoning, and generalization without semantic distortion.

As used herein, "structured memory" refers to a persistent, geometry-aware memory architecture in which thoughts are stored not as flat vectors but as positions or paths within an evolving manifold. Structured memory supports context-sensitive access, memory reinforcement through traversal, lawful pruning, and dynamic generalization. It provides a substrate for long-term cognition, introspection, and identity continuity in systems with persistent reasoning capability.

Conceptual Architecture

Figure 9:
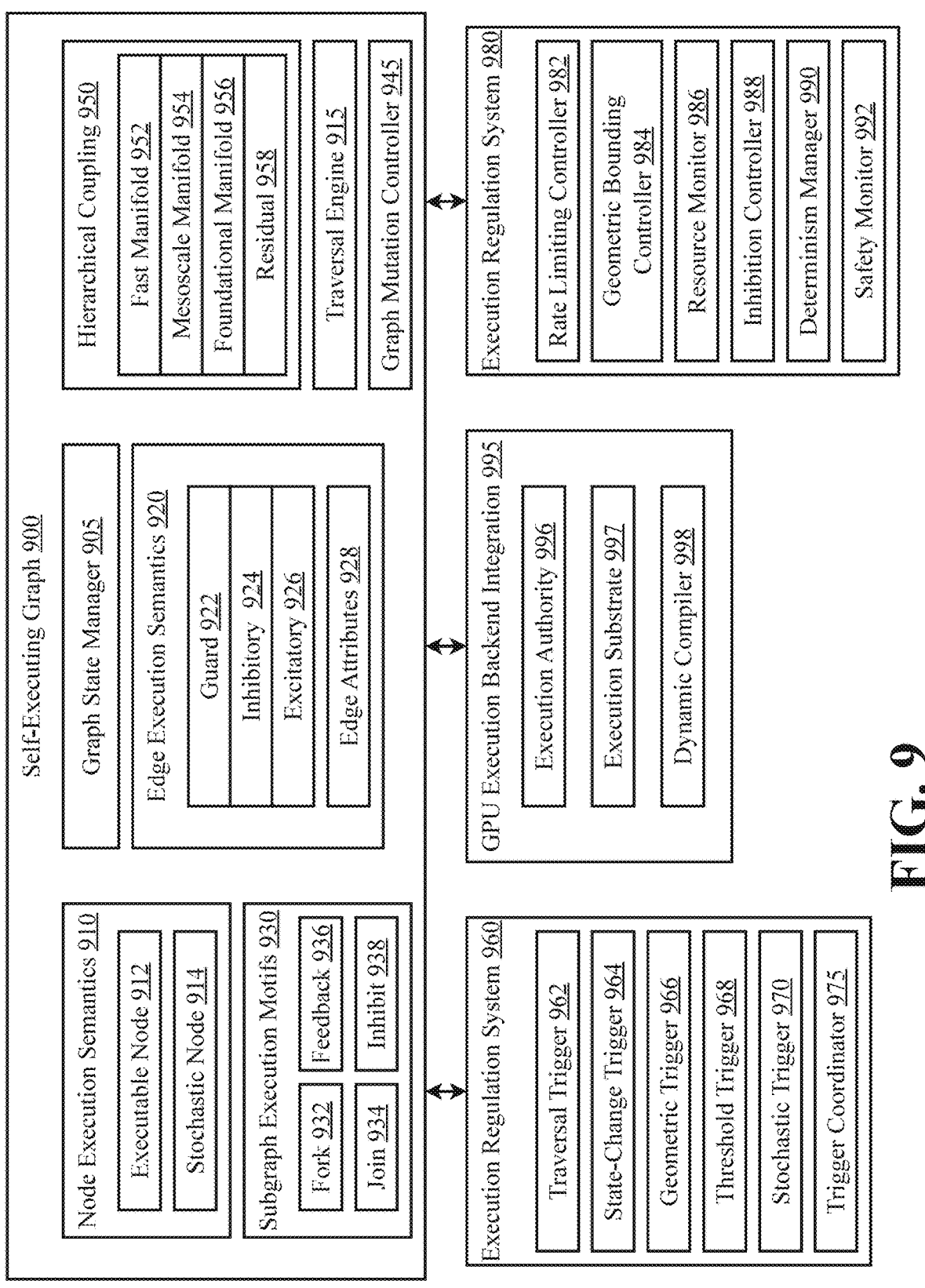
FIG. 9 is a block diagram illustrating an exemplary system architecture for a self-executing graph in which execution semantics are embedded within graph elements themselves, according to an embodiment.

FIG. 9 is a block diagram illustrating an exemplary system architecture for a self-executing graph in which execution semantics are embedded within graph elements themselves, enabling computation to be initiated by graph-internal conditions rather than by external scheduling intervention, according to an embodiment. The architecture demonstrates the system's endogenous execution model, wherein the graph itself determines what computation occurs and when it is invoked.

The self-executing graph 900 comprises a plurality of interconnected functional components that collectively realize autonomous computation through graph-resident execution semantics. A graph state manager 905, which maintains and tracks the state of the graph structure G=(V, E, A), where V represents the vertex set, E represents the edge set, and A represents the associated property attributes. Graph state manager 905 performs state tracking, change detection, attribute management, and topology monitoring functions. According to various embodiments, graph state manager 905 implements version control mechanisms to maintain consistency across concurrent modifications, computes state deltas to identify changes in graph structure or properties, and generates event notifications when state changes occur. The graph state manager 905 maintains graph properties including vertices V, edges E, attributes A, and temporal ordering τ, ensuring that all state transitions are properly tracked and propagated to dependent components. In some embodiments, graph state manager 905 employs a journaling mechanism to record state changes, enabling rollback, replay, or audit capabilities.

The self-executing graph 900 further comprises node execution semantics 910, which encode executable behavior directly within graph vertices. The node execution semantics 910 include a plurality of node types, each configured to execute computational operations based on graph-internal conditions. According to an embodiment, executable nodes 912 comprise operator bindings that associate specific computational operators with the node, activation predicates that determine when the node's operator should execute, input bindings that specify which neighboring nodes, edges, or attributes supply operands to the operator, update rules that define how the node's properties are modified following execution, execution state tracking variables, and rate limiting mechanisms that constrain execution frequency. When an executable node's 912 activation predicate evaluates to true based on current graph state, the node invokes its bound operator without requiring external scheduling intervention. In some embodiments, executable nodes 912 maintain execution counters that track the number of times the node has executed, enabling statistical analysis of execution patterns and providing data for adaptive threshold adjustment.

According to another embodiment, stochastic nodes 914 extend the basic executable node model by introducing probabilistic activation mechanisms. In some aspects, stochastic nodes 914 comprise probability functions that compute activation likelihood as a function of graph state and traversal history, expressed as $p=f(state, history)$, where $p$ represents the probability of execution, state represents current graph properties, and history represents prior activation patterns. The stochastic nodes 914 further include random seed management to ensure deterministic reproducibility when required, activation counters that track execution frequency for statistical validation, and exploration mode flags that enable or disable stochastic behavior based on system operational context. The probabilistic nature of stochastic nodes 914 enables the self-executing graph 900 to implement generative behavior, exploration of alternative computational paths, and background reorganization processes such as dreaming or consolidation, all without explicit external control signals.

The self-executing graph 900 further comprises a traversal engine 915 that implements graph navigation and path following as the primary control flow mechanism. Unlike traditional program control flow based on instruction pointers or program counters, traversal engine 915 realizes control flow through movement along graph edges, with traversal decisions determined by edge properties, node states, and graph topology. According to an embodiment, traversal engine 915 performs graph navigation by selecting edges to follow based on guard conditions, weights, or priorities associated with those edges. Traversal engine 915 maintains visit tracking mechanisms that record which nodes have been visited, how frequently they have been visited, and when they were last visited, providing temporal and frequency information that can be used by traversal-triggered execution mechanisms described subsequently. Traversal engine 915 further implements direction management to distinguish between forward traversal, backward traversal, or bidirectional movement along edges, and maintains traversal history that records sequences of visited nodes, enabling pattern detection and cycle identification. In various embodiments, the traversal engine 915 operates continuously without discrete start and stop phases, maintaining ongoing motion through the graph structure that drives execution through traversal-triggered mechanisms.

The self-executing graph 900 includes edge execution semantics 920, which encode conditional and modulatory behavior within graph edges. According to an embodiment, guard edges 922 implement conditional traversal by blocking or enabling movement along the edge based on evaluation of guard conditions. The guard conditions may be expressed as logical predicates over graph state, node properties, or external inputs, and are evaluated locally by the edge itself without requiring centralized decision-making. When a guard condition evaluates to false, traversal along the guard edge 922 is blocked, effectively implementing conditional branching in the graph-based control flow model. Inhibitory edges 924 provide suppressive modulation of execution by reducing, attenuating, or completely blocking execution at destination nodes. The inhibitory edges 924 are visually distinguished in the diagram by dashed lines terminating in circles, indicating their suppressive nature. Inhibitory edges 924 enable the implementation of mutual exclusion, negative feedback, and safety interlocks entirely within the graph topology. Excitatory edges 926 provide amplifying modulation by increasing the likelihood, intensity, or priority of execution at destination nodes. The excitatory edges 926, represented by thicker solid lines, implement positive reinforcement and facilitate the formation of frequently-used execution pathways through the graph.

According to various embodiments, edge attributes 928 provide additional parameterization of edge behavior including priority values that determine the order in which competing edges are traversed, cost metrics that quantify the computational or resource expense of edge traversal, and rate limits that constrain how frequently a particular edge may be traversed within a given time window. The edge attributes 928 enable fine-grained control over graph-based execution flow while maintaining the distributed, non-centralized nature of the execution model.

The self-executing graph 900 further comprises a graph mutation controller 945 that manages execution-driven modifications to graph structure. Unlike conventional graph processing systems where structural changes are externally orchestrated, graph mutation controller 945 enables execution events to directly create, delete, or modify nodes and edges as a consequence of operator execution. According to an embodiment, graph mutation controller 945 implements node creation mechanisms that add new vertices to the graph when execution results warrant expansion of the computational structure, node deletion mechanisms that remove vertices that have become redundant or obsolete based on compression pressure or fitness evaluations, edge creation mechanisms that establish new connections between vertices to reflect discovered relationships or frequently co-activated patterns, edge deletion mechanisms that remove connections identified as low-value through curvature analysis or other geometric criteria, and modification operations that update node or edge attributes based on execution outcomes. Graph mutation controller 945 coordinates with graph state manager 905 to ensure that all structural modifications are properly tracked, versioned, and propagated to dependent components. In some embodiments, graph mutation controller 945 implements transactional semantics to ensure atomicity of complex multi-element mutations, preventing partially completed structural changes from corrupting graph consistency.

The self-executing graph 900 includes subgraph execution motifs 930 that represent reusable patterns of execution behavior expressed topologically. These motifs enable higher-order control structures to be implemented without procedural code. According to various embodiments, the subgraph execution motifs 930 include fork motifs 932 that implement parallel activation wherein execution of a single node triggers concurrent execution across multiple outgoing paths. The fork motif 932 comprises a source node connected to multiple destination nodes, with execution propagating to all destinations simultaneously or in a defined sequence. Join motifs 934 implement synchronized execution wherein a destination node executes only after all incoming conditions have been satisfied. The join motif 934 comprises multiple source nodes converging on a single destination node, with the destination's activation predicate requiring satisfaction of conditions from all or a threshold number of sources. Feedback motifs 936 implement recursive execution wherein execution results are reintroduced into the same subgraph that generated them, creating iterative refinement or oscillatory behavior. The feedback motif 936 comprises a node with an edge returning to itself or to an upstream node in the execution path. Inhibitory motifs 938 implement mutual exclusion wherein activation of one subgraph suppresses execution in another, preventing incompatible operations from executing concurrently. The inhibitory motif 938 comprises nodes connected by inhibitory edges 924, creating topological representations of conflict or competition.

According to an embodiment, safety motifs provide regulatory structures that bound execution behavior to ensure system stability and resource limits are maintained. The safety motifs may comprise execution counters that track the number of times specific nodes or edges have executed, enabling detection of runaway execution or oscillatory instabilities. Token buckets implement rate limiting by maintaining a finite number of execution tokens that are consumed upon execution and replenished at a controlled rate, effectively limiting execution frequency. Cooldown timers enforce minimum time intervals between successive executions of the same node or traversal of the same edge, preventing thrashing or excessive repetition. Resource quotas impose limits on total resource consumption such as memory allocation, GPU kernel invocations, or computational time, ensuring that execution remains within defined operational envelopes. The safety motifs collectively ensure that the autonomous, endogenous nature of self-executing graphs does not result in unbounded resource consumption or unstable behavior.

The self-executing graph 900 may further comprise a hierarchical coupling component 950 that implements multiscale execution across manifolds operating at different temporal scales. According to an embodiment, hierarchical coupling 950 includes a fast manifold 952 that processes event-level execution with timescales ranging from milliseconds to seconds, capturing immediate sensory observations and reactive behaviors. The fast manifold 952 operates at high temporal resolution to maintain responsiveness to rapidly changing inputs. A mesoscale manifold 954 integrates events into decision trajectories and tactical patterns operating over timescales of minutes to hours. The mesoscale manifold 954 provides an intermediate level of abstraction that bridges between rapid event processing and slow identity structures. A foundational manifold 956 maintains long-term identity, values, and reasoning style with evolution occurring over timescales of days to weeks. The foundational manifold 956 encodes stable behavioral patterns and core constraints that persist across many execution episodes.

The hierarchical coupling 950 implements bidirectional information flow between manifold layers through submersion and immersion mappings. Upward abstraction may be implemented through Riemannian submersion mappings φ 952 to the mesoscale manifold 954, and φf that abstract information from the mesoscale manifold 954 to the foundational manifold 956. These submersion mappings preserve geodesic structure while reducing dimensionality, enabling patterns to be extracted and consolidated across temporal scales. Downward constraint injection is implemented through Riemannian immersion mappings ψf, that inject constraints from the foundational manifold 956 to the mesoscale manifold 954, and ψ 954 to the fast manifold 952. These immersion mappings restrict the configuration spaces of lower manifolds based on higher-level policies and values, ensuring behavioral consistency with established identity.

According to an embodiment, hierarchical coupling 950 includes a residual computation component 958 that quantifies consistency between upward abstraction and downward constraint paths. The residual is computed as $C(p)=d_M f$ $(u(p), d(p))$, where $u(p)=(\varphi f^o$ $\varphi ifold$, $d(p)$ represents the corresponding downward constraint path, and $d_M f$ represents the distance metric in the foundational manifold. High residual values indicate cognitive tension where current experiences generate abstractions inconsistent with established values, while low residual values confirm alignment between bottom-up processing and top-down constraints. The residual computation 958 drives metacognitive updates through gradient descent on the foundational manifold according to $dr/dt=-\tilde{N}_M f C(r)$, implementing value learning and identity adaptation based on persistent patterns in experiential data.

The self-executing graph 900 operates in conjunction with a trigger evaluation system 960 that monitors graph state and determines when execution conditions are satisfied. The trigger evaluation system 960 comprises a plurality of distributed evaluators that operate on localized graph regions and detect conditions warranting execution. According to an embodiment, a traversal trigger evaluator 962 monitors traversal events generated by traversal engine 915 and evaluates conditions based on visit count, visit frequency, dwell time at particular nodes, and direction-dependent activation criteria. The traversal trigger evaluator 962 enables execution to be driven by attention or usage patterns, such that frequently traversed paths trigger execution more readily than rarely visited regions. A state-change trigger evaluator 964 monitors state change notifications from graph state manager 905 and evaluates conditions based on attribute updates, topology changes including creation or deletion of nodes and edges, connectivity modifications, and mode transitions between discrete state labels. The state-change trigger evaluator 964 enables reactive execution wherein graph mutations immediately trigger responsive computational operations.

A geometric trigger evaluator 966 computes and evaluates geometric properties of the graph including curvature values that indicate local redundancy or compression pressure, divergence measures that quantify flow accumulation or dissipation, flow pressure fields that indicate regions of high computational activity, spectral properties derived from eigen-decomposition of the graph Laplacian, and density measures that quantify vertex or edge concentration in graph regions. The geometric trigger evaluator 966 enables execution to be tightly coupled to the same geometric quantities that govern memory scaling and condensation operations described herein. A threshold trigger evaluator 968 evaluates explicit conditions including numeric thresholds on scalar quantities, logical combinations of multiple predicates through conjunction, disjunction, or more complex Boolean expressions, hysteresis conditions that prevent oscillatory triggering near threshold boundaries, and time-delayed conditions that require persistence of a condition over multiple evaluation cycles before triggering execution. The threshold trigger evaluator 968 provides fine-grained control over execution initiation while remaining fully graph-resident and distributed.

According to an embodiment, a stochastic trigger evaluator 970 implements probabilistic activation by computing probability values as functions of graph state, traversal history, and random number generation. The probability function may be expressed as p=f(state, history, random), where state represents current graph properties, history represents prior execution and traversal patterns, and random represents a source of controlled randomness with optional seeding for determinism. The stochastic trigger evaluator 970 enables exploration of alternative execution paths, generative behavior that creates novel combinations of existing patterns, and background reorganization processes that occur probabilistically during periods of low external input. In various embodiments, stochastic trigger evaluator 970 adjusts probability values based on graph properties such that high-curvature regions exhibit higher exploration rates, or such that probability increases when novelty metrics indicate discovery of unusual patterns.

The trigger evaluation system 960 further comprises a trigger coordinator 975 that orchestrates the evaluation process and initiates execution when conditions are satisfied. Trigger coordinator 975 implements local evaluation by distributing trigger evaluation responsibilities across graph regions rather than centralizing decision-making in a single controller. According to an embodiment, trigger coordinator 975 evaluates composite triggers that combine multiple trigger types through logical operations, implements trigger hierarchies wherein activation at one graph level enables or disables evaluation at other levels, and initiates execution by invoking appropriate operator kernels through the GPU execution backend integration 995. In various embodiments, the trigger coordinator 975 operates in a distributed, graph-local manner, with multiple instances of the coordinator operating concurrently across different graph regions. The trigger coordinator 975 does not function as a centralized scheduler but rather as a distributed collection of local decision-makers, each responding to conditions within their respective graph neighborhoods. This distributed architecture ensures that execution authority remains within the graph itself rather than being externalized to a controlling process.

The self-executing graph 900 operates in conjunction with an execution regulation system 980 that enforces safety constraints and operational bounds on execution behavior. According to an embodiment, a rate limiting controller 982 constrains execution frequency through mechanisms including execution counters that track invocations per time window, cooldown intervals that enforce minimum time between successive executions, token bucket algorithms that limit execution rate while permitting burst behavior, and decay functions that gradually reduce execution likelihood after repeated activations. The rate limiting controller 982 prevents runaway execution while preserving responsiveness to meaningful triggers.

A geometric bounding controller 984 enforces constraints based on geometric properties of the graph including curvature caps that prevent execution when local curvature exceeds safe values indicating excessive compression or instability, pressure limits that bound compression pressure to prevent computational overload, load redistribution mechanisms that shift execution to underutilized graph regions when local saturation is detected, and saturation control that limits execution density to maintain processing capacity. Geometric bounding controller 984 leverages the same geometric metrics used for memory scaling, ensuring conceptual coherence between execution regulation and structural compression.

According to an embodiment, a resource monitor 986 tracks and enforces limits on computational resources including GPU kernel limits that constrain the number of kernel invocations per time period, memory budgets that bound total memory allocation or mutation rate, and concurrent execution constraints that limit the number of simultaneous operator invocations across different graph regions. Resource monitor 986 ensures that execution remains within available hardware capabilities and does not exhaust system resources. An inhibition controller 988 implements suppressive mechanisms including generation of suppression signals that block execution in designated graph regions, enforcement of mutual exclusion constraints ensuring incompatible operations do not execute concurrently, activation of safety interlocks that prevent execution under defined hazardous conditions, and setting of blocking flags that override activation predicates to prevent execution regardless of trigger state. Inhibition controller 988 provides negative control capabilities that complement the positive triggering mechanisms of the trigger evaluation system 960.

A determinism manager 990 ensures reproducible and auditable execution through mechanisms including, but not limited to, enforcement of ordering rules that specify precedence relationships among competing execution events, implementation of epoch-based execution that divides time into discrete phases with deterministic ordering within each epoch, maintenance of execution journals that record which graph elements triggered execution, which operators were invoked, and what state changes resulted, and provision of reproducibility guarantees through seeded random number generation and deterministic tie-breaking rules. Determinism manager 990 enables debugging, validation, and regulatory compliance for self-executing graphs deployed in safety-critical or regulated environments. According to an embodiment, a safety monitor 992 implements fail-safe behaviors including suspension of execution when invariant violations are detected, such as corruption of graph structure or violation of semantic constraints, detection of anomalous execution patterns indicating potential instabilities or attacks, activation of graceful degradation modes that simplify execution behavior when abnormalities are detected, and enablement of human intervention through graph-resident flags or communication channels. Safety monitor 992 ensures that autonomous execution does not compromise system integrity or safety.

The self-executing graph 900 operates in conjunction with a GPU execution backend integration system 995 that realizes the actual computational operations invoked by graph-resident execution semantics. According to an embodiment, backend integration 995 implements a clear separation between execution authority and execution substrate. Execution authority 996 resides within the graph through the graph-resident semantics described previously, determining what computation occurs and when it is initiated. Execution authority 996 comprises the collection of operator bindings, activation predicates, triggering conditions, and regulatory constraints encoded within nodes, edges, and subgraphs. Execution substrate 997 comprises the GPU kernels, CUDA Graph constructs, and parallel processing hardware that determine how computation is carried out efficiently once initiated. Execution substrate 997 includes the various operator kernels disclosed herein such as diffusion operators, geodesic operators, spectral operators, curvature operators, projection operators, recombination operators, and routing operators. The separation between authority 996 and substrate 997 enables the self-executing graph to leverage optimized GPU execution while maintaining distributed, graph-resident control.

According to an embodiment, a dynamic compiler 998 bridges between graph-resident execution semantics and optimized GPU kernel execution. Dynamic compiler 998 implements kernel caching by generating and storing reusable CUDA Graph instances corresponding to frequently occurring execution patterns, parameterization mechanisms that allow cached kernel graphs to be reused with different inputs or parameters without regeneration, and invalidation logic that discards cached kernels when graph structure changes materially. Dynamic compiler 998 enables the system to retain the performance benefits of the CUDA Graph execution while supporting the dynamic, data-driven execution initiation characteristic of self-executing graphs. In some embodiments, dynamic compiler 998 employs just-in-time compilation techniques to generate optimized kernel code based on observed execution patterns, or utilizes template instantiation to specialize generic operator implementations for specific graph topologies or property types.

The system architecture 900 implements continuous, autonomous operation through a plurality of control flow paths that connect the various functional components. According to the embodiment shown, trigger coordinator 975 sends trigger signals to graph state manager 905 when execution conditions are satisfied, initiating the execution cycle. Graph state manager 905 provides state change notifications to trigger evaluation system 960, specifically to state-change trigger evaluator 964, enabling reactive execution in response to graph mutations. Traversal engine 915 generates traversal events that are provided to trigger evaluation system 960, specifically to traversal trigger evaluator 962, enabling usage-driven execution. Execution regulation system 980 provides regulation enforcement signals to various components within the self-executing graph 900, including the hierarchical coupling 950, ensuring that execution remains within defined safety and resource bounds. Self-executing graph 900 provides kernel invocation requests to GPU execution backend integration 995, translating graph-resident execution decisions into actual computational operations on GPU hardware. GPU execution backend integration 995 returns execution results to graph mutation controller 945, enabling execution outcomes to modify graph structure. The graph mutation controller 945 provides graph update notifications to graph state manager 905, completing the cycle whereby execution-driven mutations feed back into the graph state that determines subsequent execution.

The system architecture provides a complete, fully enabled system for self-executing graphs wherein execution is initiated by graph-internal conditions rather than external scheduling. The distributed nature of trigger evaluation, the local coordination of execution initiation, and the graph-resident encoding of execution semantics collectively ensure that the graph executes itself. Through the systematic integration of graph state management 905, node and edge execution semantics 910, 920, traversal-based control flow 915, execution-driven mutation 945, hierarchical coupling 950, distributed trigger evaluation 960, execution regulation 980, and GPU backend integration 995, the system 900 enables continuous, autonomous computation that adapts to data characteristics and system state without requiring external orchestration or discrete processing phases.

Figure 10:
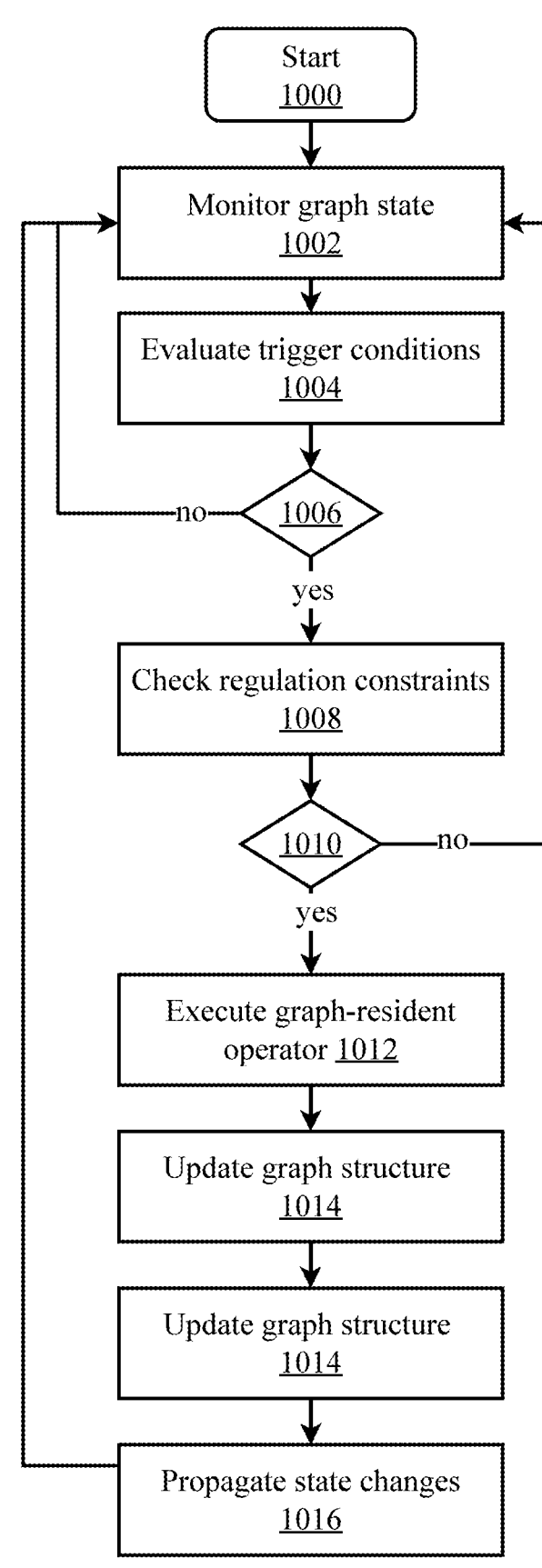
FIG. 10 is a flow diagram illustrating an exemplary method for self-executing graph operation, according to an embodiment.

FIG. 10 is a flow diagram illustrating an exemplary method for self-executing graph operation, according to an embodiment. The method demonstrates the continuous, autonomous execution cycle through which a self-executing graph initiates computation based on graph-internal conditions without requiring external scheduling intervention. This exemplary method provides various process steps that realize the architectural components described herein. This method may be executed by one or more components described herein such as, for example, the system architecture of FIG. 9.

According to the embodiment, the method begins at step 1000, which represents the entry point into continuous operation. Unlike conventional computational methods that execute once from start to finish and then terminate, the method of FIG. 10 operates continuously without discrete beginning or ending points. Step 1000 therefore represents the initiation of an ongoing process that persists throughout the operational lifetime of the self-executing graph system. In various embodiments, step 1000 may be triggered by system initialization, loading of a previously persisted graph state, or transition from a quiescent mode to active operation. The continuous nature of the method ensures that the self-executing graph remains responsive to emerging conditions and capable of autonomous adaptation without requiring external intervention to restart or re-initiate processing.

At step 1002, the method monitors graph state to detect conditions that may warrant execution. The monitoring step 1002 may comprise tracking the structure of the dynamic property graph G=(V, E, A), where V represents the set of vertices comprising event vertices and communication vertices as disclosed herein, E represents the set of directed edges encoding relationships and temporal orderings between vertices, and A represents the property assignment function mapping vertices and edges to property vectors. According to an embodiment, the monitoring step 1002 continuously observes changes to the graph structure including additions or deletions of vertices, additions or deletions of edges, modifications to vertex properties such as embeddings or activation states, modifications to edge properties such as weights or guard conditions, and changes to graph topology affecting connectivity or neighborhood composition. The monitoring step 1002 further detects traversal events generated by graph navigation operations, wherein traversal of the graph structure functions as a control flow mechanism. Traversal events may include visiting a vertex for the first time, visiting a vertex a specified number of times within a time window, dwelling at a vertex for a duration exceeding a threshold, or traversing an edge in a particular direction. In some embodiments, the monitoring step 1002 employs event-driven notification mechanisms wherein modifications to graph state automatically generate notifications to trigger evaluators, enabling efficient detection of state changes without requiring exhaustive polling of all graph elements.

The monitoring step 1002 operates continuously and concurrently with other method steps, maintaining ongoing observation of graph state while execution, mutation, and other operations proceed. This concurrent monitoring ensures that the system remains responsive to rapidly changing conditions and can detect trigger-worthy events as soon as they occur. In various embodiments, the monitoring step 1002 may be implemented through callback mechanisms registered with graph state manager 905, through periodic sampling of graph properties at frequencies ranging from milliseconds to seconds depending on application requirements, or through a combination of event-driven and polling mechanisms that balance responsiveness against computational overhead. The monitoring step 1002 provides the foundational observation capability upon which all subsequent trigger evaluation and execution decisions depend, ensuring that the self-executing graph possesses complete awareness of its own state and the changes occurring within its structure.

At step 1004, the method evaluates trigger conditions based on the graph state monitored in step 1002. The trigger evaluation step 1004 may assess whether graph-internal conditions warrant initiation of computational operations. According to an embodiment, the trigger evaluation step 1004 evaluates a plurality of trigger types, each responsive to different aspects of graph state or behavior. Traversal-based triggers evaluate conditions derived from graph navigation, including whether a vertex has been visited a threshold number of times, whether traversal frequency for a particular path exceeds a specified rate, whether dwell time at a vertex exceeds a duration threshold, or whether traversal has occurred in a specific direction. State-change triggers evaluate conditions based on modifications to graph structure or properties, including whether vertex or edge attributes have changed by more than a threshold amount, whether new vertices or edges have been created, whether vertices or edges have been deleted, whether connectivity patterns have changed, or whether the graph has transitioned between discrete operational modes. Geometric triggers evaluate conditions based on geometric properties of the graph as a discretized manifold, including whether local curvature exceeds or falls below threshold values indicating compression pressure or structural significance, whether flow divergence indicates accumulation or dissipation of computational activity, whether spectral properties derived from eigen-decomposition of the graph Laplacian indicate changes in global structure, or whether vertex or edge density in particular graph regions exceeds saturation thresholds.

Threshold triggers evaluate explicit conditional expressions over graph properties, including whether numeric values exceed or fall below specified bounds, whether logical combinations of multiple conditions are satisfied through conjunction, disjunction, or more complex Boolean expressions, whether hysteresis conditions are met to prevent oscillatory triggering near threshold boundaries, or whether time-delayed conditions requiring persistence over multiple evaluation cycles are satisfied. Stochastic triggers evaluate probabilistic activation conditions, computing activation probability as a function of graph state (e.g., $p=f$ [state, history, random]), where state represents current graph properties, history represents prior execution and traversal patterns, and random represents a source of controlled randomness with optional seeding for deterministic reproducibility. Composite triggers evaluate combinations of multiple trigger types through logical operations, trigger hierarchies wherein satisfaction of conditions at one graph level enables or disables evaluation at other levels, or cascading triggers wherein satisfaction of one trigger automatically evaluates additional dependent triggers.

According to various embodiments, the trigger evaluation step 1004 is performed in a distributed manner across the graph structure rather than through centralized evaluation. Different graph regions may evaluate different trigger conditions concurrently, with evaluation occurring at or near the graph elements to which the triggers are bound. This distributed evaluation architecture ensures that trigger assessment scales with graph size and that evaluation overhead remains localized rather than creating global computational bottlenecks. In some embodiments, the trigger evaluation step 1004 employs incremental evaluation techniques wherein only graph elements affected by recent state changes are re-evaluated, avoiding unnecessary computation for static portions of the graph. The trigger evaluation step 1004 interfaces with trigger evaluation system 960, utilizing the specialized evaluator components to assess different trigger types, with coordination provided by trigger coordinator 975 to manage composite and hierarchical trigger logic.

At decision point 1006, the method determines whether any trigger condition evaluated in step 1004 has been satisfied. This decision point represents a juncture where the method distinguishes between states requiring execution and states that warrant continued monitoring without execution. According to an embodiment, the decision at step 1006 evaluates whether at least one trigger condition from the plurality of evaluated conditions has transitioned to a satisfied state, indicating that graph-internal circumstances warrant computational action. The decision may employ priority mechanisms wherein multiple satisfied triggers are ranked according to urgency, importance, or resource consumption, with higher-priority triggers selected for execution when multiple candidates exist. In some embodiments, the decision at step 1006 considers trigger activation history to implement fairness policies ensuring that all graph regions receive execution opportunities over time, preventing starvation of low-priority or infrequently triggered elements.

When the decision at step 1006 determines that no trigger conditions are satisfied (NO path), the method returns to step 1002 to continue monitoring graph state. This feedback path implements the continuous monitoring aspect of the self-executing graph, ensuring that the system perpetually observes its own state and remains ready to respond when triggering conditions arise. The NO path represents the normal operational state during periods when graph conditions do not warrant execution, enabling the system to remain quiescent with minimal computational overhead while maintaining readiness to activate when needed. In various embodiments, the NO path may incorporate adaptive polling rates wherein monitoring frequency decreases during extended periods without trigger satisfaction, reducing computational load while maintaining acceptable responsiveness.

When the decision at step 1006 determines that one or more trigger conditions are satisfied (YES path), the method proceeds to step 1008 to verify that execution is permissible under current regulatory constraints. The transition from trigger satisfaction to regulation checking reflects the architecture's two-stage gating mechanism, wherein endogenous triggers initiate execution requests but regulatory systems retain authority to block or throttle execution to ensure safety and resource limits.

At step 1008, the method checks regulation constraints to determine whether execution should proceed despite trigger satisfaction. The regulation checking step 1008 can verify that execution complies with safety, resource, and operational policies governing the self-executing graph. According to an embodiment, the regulation checking step 1008 evaluates a plurality of constraint types. Rate limiting constraints verify that execution frequency for the triggered node, edge, or subgraph does not exceed maximum rates specified through execution counters tracking invocations per time window, cooldown timers enforcing minimum intervals between successive executions, token bucket algorithms limiting execution rate while permitting controlled burst behavior, or decay functions gradually reducing execution likelihood after repeated recent activations. Geometric bounding constraints verify that execution will not violate geometric properties essential to system stability, including curvature caps preventing execution when local curvature exceeds safe values indicating excessive compression or structural instability, pressure limits bounding compression pressure to prevent computational overload, load redistribution requirements ensuring execution does not concentrate excessively in already-saturated graph regions, or density controls limiting execution in regions where vertex or edge concentration already approaches maximum sustainable levels.

Resource constraints verify that sufficient computational resources exist to execute the triggered operation, including, but not limited to, GPU kernel invocation limits constraining the number of concurrent or recent kernel launches, memory budgets bounding total memory allocation or mutation rate, concurrent execution limits restricting the number of simultaneous operator invocations across different graph regions, or power or thermal constraints ensuring execution does not exceed hardware operational envelopes. Inhibition signals check for suppression flags or blocking conditions including explicit inhibition signals generated by other graph elements or external sources, mutual exclusion constraints ensuring that incompatible operations do not execute concurrently, safety interlocks preventing execution under defined hazardous conditions such as detected invariant violations or anomalous system states, or blocking flags that override activation predicates to prevent execution regardless of trigger state. Determinism requirements verify that execution can proceed in a manner consistent with reproducibility or ordering constraints, including compliance with ordering rules specifying precedence relationships among competing execution events, consistency with epoch-based execution wherein certain operations must complete before others begin, or availability of necessary state for execution journal recording to support auditability and replay.

According to various embodiments, the regulation checking step 1008 is performed through consultation with execution regulation system 980, utilizing specialized controllers including, but not limited to, the rate limiting controller, geometric bounding controller, resource monitor, inhibition controller, determinism manager, and safety monitor. Each controller evaluates its respective constraints and provides approval or denial signals that may be combined or otherwise aggregated to produce an overall execution permission decision. In some embodiments, the regulation checking step 1008 employs rapid constraint evaluation optimizations wherein frequently-checked constraints are evaluated first to enable early rejection of impermissible executions, reducing average evaluation time.

At decision point 1010, the method determines whether execution is permitted based on the regulation constraints evaluated in step 1008. This decision point represents the final gate before execution, ensuring that all safety and operational constraints are satisfied before computational resources are committed. According to an embodiment, the decision at step 1010 requires affirmative approval from all relevant regulatory controllers, implementing an AND-gate logic wherein any single constraint violation is sufficient to deny execution permission. This conservative approach ensures that execution proceeds only when all safety, resource, and operational requirements are met, preventing the system from entering unstable or unsafe states.

When the decision at step 1010 determines that execution is not permitted (NO path), the method returns to step 1002 to continue monitoring, typically after a throttling or waiting period. The NO path from regulation checking differs from the NO path from trigger evaluation in that it indicates a condition where execution was requested by graph-internal triggers but denied by regulatory constraints. In various embodiments, the NO path from step 1010 may implement exponential backoff wherein waiting periods increase with repeated denials, adaptive throttling wherein denial triggers reduce monitoring frequency or trigger sensitivity to reduce spurious execution requests, or notification mechanisms that alert system administrators when execution denials exceed threshold rates indicating potential configuration issues or resource exhaustion.

When the decision at step 1010 determines that execution is permitted (YES path), the method proceeds to step 1012 to execute the graph-resident operator associated with the satisfied trigger. This transition represents the culmination of the trigger-evaluation-regulation sequence, wherein graph-internal conditions have both requested execution and received approval from safety and resource management systems.

At step 1012, the method executes the graph-resident operator bound to the triggered graph element. The execution step 1012 may invoke the computational operation associated with the node, edge, or subgraph whose trigger condition was satisfied and whose execution was approved by regulatory constraints. According to an embodiment, the execution step 1012 retrieves the operator binding from the triggered graph element, wherein nodes 912 or stochastic nodes 914 maintain explicit associations between graph elements and computational operators to be invoked upon activation. The operator binding may specify one of the GPU-executable operator kernels disclosed herein, including diffusion operators implementing heat kernel propagation, geodesic operators computing shortest paths, spectral operators performing eigen-decomposition, curvature operators quantifying geometric properties, projection operators mapping external data to graph vertices, recombination operators generating novel trajectories, or routing operators identifying optimal paths for queries. The operator binding may alternatively specify custom computational operations defined for specific application domains or use cases.

In some embodiments, the execution step 1012 invokes the bound operator through GPU execution backend integration 995, wherein the execution authority 996 residing in the graph-resident semantics determines what computation occurs, while the execution substrate 997 comprising GPU kernels and CUDA Graph constructs determines how the computation is carried out efficiently. According to various embodiments, the execution step 1012 may utilize cached kernel graphs maintained by dynamic compiler 998 to reduce kernel launch overhead, may parameterize kernel invocations with graph-specific data such as vertex properties or edge weights, or may employ just-in-time compilation to optimize kernel code for the specific execution context. The execution step 1012 generates execution results that may include computed values to be stored in graph properties, signals or messages to be propagated to other graph elements, or instructions for graph structure modifications to be applied in subsequent steps.

In some embodiments, the execution step 1012 employs execution-local state tracking to record metadata about the invocation, including timestamps enabling temporal analysis of execution patterns, performance metrics such as kernel execution time or memory consumption, or debugging information supporting post-execution analysis. The execution step 1012 interfaces with determinism manager 990 to ensure that execution is recorded in journals for auditability and replay, maintaining execution logs that can support debugging, validation, or regulatory compliance requirements. Upon completion of operator execution, the execution step 1012 provides the execution results to subsequent method steps for application to the graph structure.

At step 1014, the method updates the graph structure based on the execution results generated in step 1012. The graph structure update step 1014 may apply execution-driven mutations to the dynamic property graph G, modifying vertices, edges, and attributes according to the computational outcomes produced by the executed operator. According to an embodiment, the graph structure update step 1014 performs modifications through graph mutation controller 945, which coordinates structural changes with graph state manager 905 to ensure consistency and proper tracking of modifications. The types of mutations applied in step 1014 may include, but are not limited to, updates to node attributes such as embeddings, activation states, fitness values, or domain-specific properties based on computed results; updates to edge attributes such as weights reflecting reinforcement or attenuation of connections, guard conditions based on changing operational contexts, or traversal costs based on observed execution patterns; creation of new vertices representing discovered patterns, generated abstractions, or emergent structures identified through recombination or other generative operators; creation of new edges establishing connections between co-activated vertices, linking related patterns, or implementing feedback paths for iterative refinement; deletion of vertices identified as redundant through compression pressure analysis, obsolete based on fitness evaluations, or unnecessary based on pruning criteria; or deletion of edges determined to be low-value through curvature analysis, contradictory to new information, or violating consistency constraints.

In various embodiments, the graph structure update step 1014 implements transactional semantics ensuring atomicity of complex multi-element mutations, wherein changes to multiple related vertices and edges are applied as indivisible units that either complete entirely or are rolled back entirely, preventing partially completed mutations from corrupting graph consistency. The update step 1014 may employ optimistic concurrency control wherein multiple concurrent updates are attempted speculatively and validated before commitment, or pessimistic locking wherein elements being modified are locked to prevent conflicting concurrent modifications. The graph structure update step 1014 maintains version information enabling rollback to previous graph states if necessary, supports incremental modification wherein changes are applied as deltas to existing structures rather than requiring complete reconstruction, and coordinates with the hierarchical coupling 950 when updates affect multiple manifold layers to ensure consistency across temporal scales.

According to an embodiment, the graph structure update step 1014 applies update rules encoded in the executed nodes or edges, wherein the graph elements themselves specify how execution results should modify graph structure. For example, an executable node 912 may encode rules specifying that successful execution should increment an activation counter, strengthen incident edges, or create new connections to recently co-activated neighbors. These graph-resident update rules ensure that structural evolution is governed by local, distributed logic embedded within the graph itself rather than requiring centralized orchestration, further reinforcing the self-executing nature of the architecture. In some implementations, the graph structure update step 1014 produces a modified graph structure that reflects the computational outcomes of execution, enabling the system to continuously adapt its structure based on execution results while maintaining the fundamental self-executing properties that enable autonomous operation.

At step 1016, the method propagates state changes resulting from the graph structure updates of step 1014 to dependent components throughout the system. The state change propagation step 1016 ensures that all system components maintain consistent views of the graph state and remain aware of modifications that may affect their operation. According to an embodiment, the propagation step 1016 notifies graph state manager 905 of all structural and attribute changes, enabling the state manager to update its tracked representation of graph properties, generate state change events for consumption by trigger evaluators, maintain version control information for rollback or audit purposes, and update any cached or derived properties that depend on modified graph elements. The propagation step 1016 updates trigger evaluators within the trigger evaluation system 960 to reflect new graph state, enabling immediate re-evaluation of trigger conditions that may have been affected by the structural modifications. This notification ensures that execution-driven changes can themselves trigger additional execution, creating cascading or iterative processing patterns when appropriate.

The propagation step 1016 signals execution regulation components within execution regulation system 980 to update rate limiting counters, resource utilization tracking, or other regulatory state based on the completed execution. This notification enables regulators to enforce constraints accurately based on actual system state rather than stale or incomplete information. In various embodiments, the propagation step 1016 may employ batched notification mechanisms wherein multiple small changes are aggregated and propagated together to reduce notification overhead, priority-based propagation wherein critical components receive notifications before less time-sensitive components, or lazy propagation wherein certain updates are deferred until components explicitly request current state. The propagation step 1016 may interface with hierarchical coupling module 950 when changes affect manifolds at different temporal scales, triggering upward abstraction through submersion mappings or downward constraint injection through immersion mappings as appropriate to maintain consistency across the manifold hierarchy.

According to an embodiment, the propagation step 1016 implements notification ordering guarantees ensuring that dependent components receive state change notifications in causal order, preventing scenarios where a component observes an effect before the cause that produced it. The propagation step 1016 may employ event sequencing mechanisms, versioned notifications, or causal consistency protocols to maintain these ordering guarantees even in the presence of concurrent execution across multiple graph regions. Upon completion of state change propagation, all system components maintain consistent awareness of the current graph state, enabling the method to return to the monitoring step 1002 with accurate and complete information about graph conditions.

Following the propagation step 1016, the method returns to step 1002 to continue monitoring graph state, completing the continuous execution loop. This feedback path implements the perpetual operation characteristic of self-executing graphs. The loop ensures that the method operates without termination, continuously monitoring for trigger conditions, evaluating regulatory constraints, executing approved operations, updating graph structure, and propagating changes in an endless cycle that persists throughout the operational lifetime of the system. The continuous loop enables the self-executing graph to respond to emerging conditions at any time, adapt its structure based on execution outcomes, and maintain autonomous operation without requiring external control or orchestration.

Figure 11:
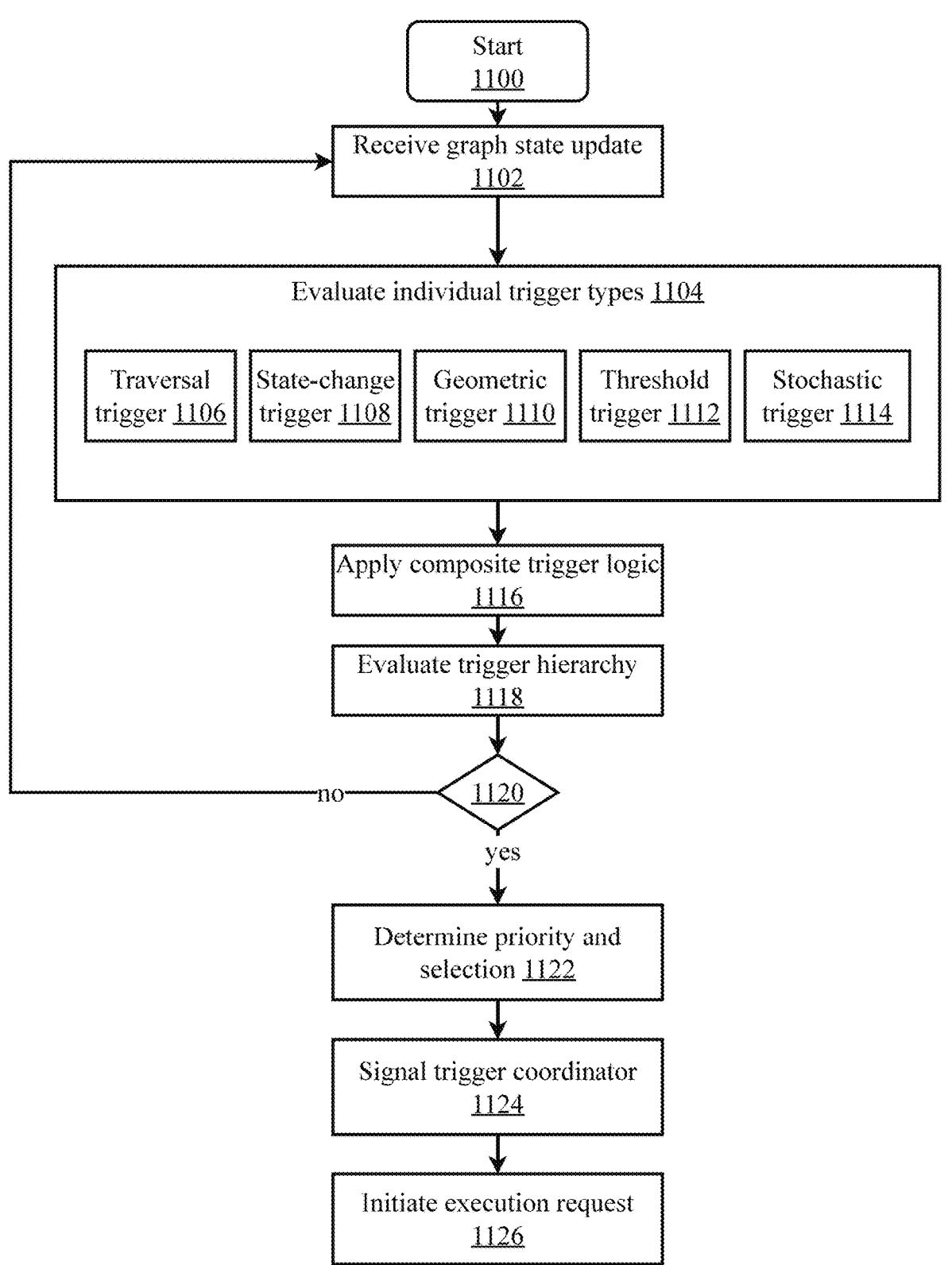
FIG. 11 is a flow diagram illustrating an exemplary method for trigger evaluation and composite triggering in self-executing graphs, according to an embodiment.

FIG. 11 is a flow diagram illustrating an exemplary method for trigger evaluation and composite triggering in self-executing graphs, according to an embodiment. The method demonstrates how graph-internal conditions are assessed through distributed evaluation of multiple trigger types operating in parallel, combined through composite logic, and coordinated through graph-local mechanisms to initiate execution without centralized scheduling.

According to the embodiment, the method begins at step 1100, which represents entry into the trigger evaluation process. According to an embodiment, step 1100 may be invoked in response to various conditions including notification from the graph state manager 905 of FIG. 9 that graph state has changed, notification from the traversal engine 915 that a traversal event has occurred, periodic evaluation timing signals generated at configurable intervals to ensure triggers are assessed even in the absence of explicit state changes, or explicit evaluation requests from other system components. The trigger evaluation process operates continuously throughout system operation, with step 1100 representing the recurring entry point for each evaluation cycle rather than a one-time initialization. In various embodiments, the frequency of trigger evaluation may be adaptive, increasing during periods of high graph activity and decreasing during quiescent periods to balance responsiveness against computational overhead.

At step 1102, the method receives graph state update information that will be evaluated for trigger satisfaction. The graph state update received at step 1102 may comprise information about the current state of the dynamic property graph G=(V, E, A) and recent changes thereto. According to an embodiment, the state update may include, but is not limited to, notifications of state changes indicating which vertices or edges have had their properties modified, which elements have been created or deleted, or which connectivity patterns have changed; traversal events indicating which vertices have been visited, how frequently particular paths have been traversed, or how long the system has dwelled at particular graph locations; geometric property updates including computed curvature values, pressure fields, spectral decompositions, or density measurements for graph regions; temporal information including timestamps enabling frequency and recency calculations; or context information indicating the current operational mode, active manifold layers in hierarchical embodiments, or other system-level state relevant to trigger evaluation. In some embodiments, the graph state update received at step 1102 comprises a complete snapshot of relevant graph properties, while in other embodiments it comprises a delta or differential update indicating only what has changed since the last evaluation, reducing data transfer overhead for large graphs undergoing localized modifications.

The state update information received at step 1102 may be filtered or scoped based on the graph region or elements for which trigger evaluation is being performed. According to various embodiments implementing distributed trigger evaluation as disclosed herein, different instances of the trigger evaluation method may execute concurrently for different graph regions, with each instance receiving state updates relevant only to its assigned region. This distributed approach enables parallel evaluation across the graph structure and ensures that trigger assessment scales with graph size rather than creating a sequential bottleneck. The graph state update received at step 1102 provides the foundation of information upon which all subsequent trigger evaluations depend, ensuring that trigger conditions are assessed against current, accurate graph state.

At step 1104, the method evaluates individual trigger types in parallel. Step 1104 represents a parallel evaluation phase wherein multiple different types of triggers are assessed concurrently based on the received graph state update. The parallel evaluation structure of step 1104 distinguishes the present method from sequential evaluation approaches wherein triggers are checked one after another, instead enabling simultaneous assessment of multiple triggering criteria to reduce evaluation latency and increase responsiveness. According to an embodiment, step 1104 encompasses a plurality of specialized trigger evaluation substeps, each implementing a different trigger type as described herein. The parallel evaluation of step 1104 may be implemented through concurrent execution threads or processes, through vectorized or SIMD operations evaluating multiple conditions simultaneously, through distributed evaluation across multiple processing elements, or through pipelined evaluation wherein different trigger types operate in overlapping time periods.

Within the parallel evaluation phase 1104, substep 1106 evaluates traversal triggers based on graph navigation patterns. The traversal trigger evaluation substep 1106 assesses conditions derived from how the graph has been traversed by traversal engine 915. According to an embodiment, the traversal trigger evaluation 1106 checks visit count by determining whether a vertex has been visited a threshold number of times, either cumulatively over the graph's lifetime or within a specified time window, and comparing the visit count against threshold values encoded in the vertex's trigger semantics. The evaluation checks visit frequency by computing the rate at which a vertex or edge is being traversed, measured as visits per unit time, and comparing this frequency against minimum or maximum thresholds that indicate unusually high or low usage warranting execution. The evaluation checks dwell time by measuring how long the traversal process has remained at a particular vertex without moving to adjacent vertices, identifying situations where attention or processing is concentrated at a particular graph location. The evaluation checks traversal direction by determining whether traversal has occurred in a particular direction along directed edges, enabling triggers that fire only on forward traversal, backward traversal, or specific directional patterns. Each of these checks is performed based on traversal history and current traversal state maintained by the traversal engine 915, with the substep 1106 returning a boolean result indicating whether traversal-based trigger conditions are satisfied.

Within the parallel evaluation phase 1104, substep 1108 evaluates state-change triggers based on modifications to graph structure or properties. The state-change trigger evaluation substep 1108 assesses conditions that become satisfied when the graph undergoes specific types of changes. According to an embodiment, the state-change trigger evaluation 1108 checks attribute changes by comparing current vertex or edge property values against previous values, determining whether changes exceed threshold magnitudes, whether values have crossed significant boundaries, or whether specific attribute combinations have emerged. The evaluation checks topology modifications by detecting creation or deletion of vertices or edges, identifying when new structural patterns form or when existing patterns dissolve. The evaluation checks connectivity changes by analyzing how vertex neighborhoods have changed, whether new paths have been created or existing paths severed, or whether the graph's connected components have been altered. The evaluation checks mode transitions by detecting when the graph or particular graph elements have switched between discrete operational states, such as transitioning from exploration mode to consolidation mode, from active to quiescent state, or between different computational phases. The state-change trigger evaluation 1108 interfaces with graph state manager 905 to access both current and historical state information, enabling detection of changes that may span multiple evaluation cycles. Substep 1108 returns a boolean result indicating whether state-change conditions warrant execution.

Within the parallel evaluation phase 1104, substep 1110 evaluates geometric triggers based on manifold properties of the graph. The geometric trigger evaluation substep 1110 assesses conditions derived from the geometric interpretation of the graph as a discretized manifold. According to an embodiment, the geometric trigger evaluation 1110 computes curvature k for edges or edge neighborhoods using Forman curvature for efficient local estimates or Ollivier-Ricci curvature for refined measurements via optimal transport, then compares computed curvature values against threshold ranges that indicate compression pressure, structural significance, or redundancy warranting consolidation. The evaluation computes pressure P representing compression pressure derived from flow divergence or curvature fields, comparing pressure values against limits that indicate when execution should occur to relieve pressure through pruning, reinforcement, or recombination operations. The evaluation checks spectral properties $\lambda$ by performing or accessing eigen-decomposition of the graph Laplacian, comparing eigenvalues, eigengaps, or spectral densities against thresholds indicating changes in global graph structure that warrant execution. The evaluation checks density $\rho$ by measuring vertex or edge concentration in graph regions, comparing density values against saturation thresholds that indicate when regions are overloaded or underutilized. The geometric trigger evaluation 1110 may cache expensive computations such as spectral decompositions and update them incrementally when the graph changes, avoiding full recomputation on every evaluation cycle. Substep 1110 returns a boolean result indicating whether geometric conditions trigger execution.

Within the parallel evaluation phase 1104, substep 1112 evaluates threshold triggers based on explicit conditional expressions. The threshold trigger evaluation substep 1112 assesses conditions defined through explicit predicates over graph properties. According to an embodiment, the threshold trigger evaluation 1112 checks numeric bounds by comparing scalar graph properties such as vertex attributes, edge weights, or aggregate statistics against specified minimum or maximum values, determining whether values have exceeded upper thresholds or fallen below lower thresholds.

The evaluation checks logic conditions by evaluating Boolean expressions that combine multiple predicates through conjunction (AND), disjunction (OR), negation (NOT), or more complex logical operators, enabling triggers that require multiple conditions to be simultaneously satisfied. The evaluation implements hysteresis checks wherein trigger activation and deactivation occur at different threshold values, preventing oscillatory triggering when property values fluctuate near threshold boundaries by requiring properties to change by a minimum amount before trigger state changes. The evaluation performs time-delay checks by requiring that conditions persist for a minimum duration before triggering, filtering transient fluctuations and ensuring triggers fire only for sustained conditions. The threshold trigger evaluation 1112 may employ short-circuit evaluation wherein logical expressions are evaluated only until the outcome is determined, avoiding unnecessary computation when early terms of a conjunction evaluate to false or early terms of a disjunction evaluate to true. Substep 1112 returns a boolean result indicating whether threshold conditions are met.

Within the parallel evaluation phase 1104, substep 1114 evaluates stochastic triggers based on probabilistic activation criteria. The stochastic trigger evaluation substep 1114 implements probabilistic execution initiation, enabling exploration, generative behavior, and background processing that occurs with controlled randomness rather than deterministically. According to an embodiment, the stochastic trigger evaluation 1114 computes probability p as a function of graph state, expressed as p=f(state, history, context), where state represents current graph properties influencing activation likelihood, history represents prior execution or traversal patterns that may increase or decrease probability, and context represents system-level factors such as current operational mode or resource availability. The probability function f may increase with curvature in high-compression regions to encourage exploration, increase with novelty metrics when unusual patterns are detected, decrease with recent execution frequency to implement refractory periods, or vary based on stochastic trigger-specific parameters encoded in graph elements. The evaluation generates a random value r drawn from a uniform distribution over [0,1], using either truly random sources for non-deterministic behavior or pseudorandom number generators with recorded seeds for deterministic reproducibility. The evaluation compares the computed probability p against the random value r, determining trigger satisfaction when p>r. This probabilistic mechanism enables the self-executing graph to implement exploration strategies, background consolidation processes, and stochastic search without requiring explicit external control. Substep 1114 returns a boolean result indicating whether the stochastic condition was satisfied in the current evaluation.

Each of the trigger evaluation substeps 1106, 1108, 1110, 1112, and 1114 operates independently and concurrently within the parallel evaluation phase 1104, producing individual boolean results $T_1$, $T_2$, $T_3$, $T_4$, and $T_5$ respectively. The parallel nature of this evaluation ensures that assessment of different trigger types does not introduce sequential dependencies or bottlenecks, enabling the method to scale efficiently as graphs grow and as the number of evaluated triggers increases. In various embodiments, the parallel evaluation may be implemented on multi-core processors with different trigger types assigned to different cores, on GPU hardware with trigger evaluation kernels executing concurrently, or through distributed evaluation wherein different graph regions are evaluated by different processing elements. The independence of trigger evaluations enables fault tolerance wherein failure of one evaluator does not prevent others from producing results, and enables incremental deployment wherein new trigger types can be added without modifying existing evaluators.

Following the parallel evaluation phase 1104, the method proceeds to step 1116 to apply composite trigger logic combining the individual trigger results. The composite trigger logic application step 1116 may implement the logical combination of individual trigger results to determine overall trigger satisfaction, enabling complex triggering conditions that require multiple criteria to be met simultaneously or that activate when any of several alternative conditions are satisfied. According to an embodiment, the composite trigger logic 1116 applies logical operators including AND operations requiring all specified triggers to be satisfied, expressed as ($T_n$, AND Tf) or more complex conjunctions; OR operations requiring at least one specified trigger to be satisfied, expressed as ($T_n$ OR $T_n$) or more complex disjunctions; NOT operations inverting trigger results to implement negative conditions, expressed as (NOT $T_n$) or as components of larger expressions; or complex Boolean expressions combining multiple operators, expressed as examples such as (T AND Tf) OR (T AND NOT T), enabling sophisticated triggering logic. The composite trigger logic may be defined in graph-resident trigger specifications associated with nodes, edges, or subgraphs, enabling different graph elements to employ different combination rules tailored to their specific execution requirements. In some embodiments, the composite trigger logic 1116 employs weighted voting wherein different trigger types contribute weighted votes toward an overall triggering decision, with execution occurring when the cumulative weighted vote exceeds a threshold. The composite trigger logic application 1116 produces a combined trigger result indicating whether the overall triggering condition, considering all evaluated trigger types and their logical combination, is satisfied.

At step 1118, the method evaluates trigger hierarchy rules that may enable or disable triggers based on graph context or cross-layer dependencies. The trigger hierarchy evaluation step 1118 implements hierarchical relationships between triggers wherein satisfaction or non-satisfaction of higher-level conditions affects whether lower-level triggers are considered active. According to an embodiment, the trigger hierarchy evaluation 1118 checks whether higher-level triggers in hierarchical manifold architectures such as those shown in component 950 have enabled or disabled evaluation at the current layer, implementing top-down control wherein foundational manifold Mf (956) or mesoscale manifold M. The evaluation may check whether cross-layer trigger dependencies are satisfied, wherein execution on one manifold layer may require or prohibit concurrent execution on another layer. The evaluation checks whether operational mode flags or system state indicators enable or disable particular trigger types, implementing context-sensitive triggering wherein certain triggers are active only in specific operational contexts such as exploration mode, consolidation mode, or emergency mode. The evaluation applies priority-based hierarchies wherein high-priority triggers can suppress lower-priority triggers, preventing less important executions from consuming resources when critical operations are pending. The trigger hierarchy evaluation 1118 modifies the composite trigger result from step 1116 based on these hierarchical rules, potentially overriding a satisfied composite trigger if hierarchy rules indicate execution should be suppressed, or potentially enabling execution even if the composite trigger is not fully satisfied if hierarchy rules indicate execution is mandated by higher-level policy. The hierarchy evaluation step 1118 produces a final hierarchy-adjusted trigger result.

At decision point 1120, the method determines whether the composite trigger, after application of hierarchy rules, is satisfied. This decision point evaluates the final trigger state produced by the composite logic application 1116 and hierarchy evaluation 1118, determining whether execution should be requested. According to an embodiment, the decision at step 1120 returns true (YES path) if the composite trigger logic produced a satisfied result and hierarchy rules have not suppressed the trigger, or if hierarchy rules have mandated execution regardless of composite trigger state. The decision returns false (NO path) if the composite trigger logic produced an unsatisfied result, or if hierarchy rules have suppressed an otherwise satisfied trigger. In various embodiments, the decision at step 1120 may incorporate additional meta-level checks such as verifying that trigger evaluation itself completed successfully without errors, checking that trigger evaluation latency has not exceeded acceptable bounds indicating potential computational issues, or confirming that the trigger result is consistent with recent historical trigger patterns to detect anomalous behavior.

When the decision at step 1120 determines that the composite trigger is not satisfied (NO path), the method returns to step 1102 to await the next graph state update. This feedback path implements the monitoring aspect of trigger evaluation, wherein the method continuously assesses graph conditions but initiates execution only when triggering criteria are met. The NO path enables the system to remain in a low-overhead monitoring state during periods when graph conditions do not warrant execution, conserving computational resources while maintaining readiness to respond when triggers become satisfied. In some embodiments, the NO path may incorporate adaptive waiting wherein the interval before the next evaluation cycle is adjusted based on how close trigger conditions are to satisfaction, with nearly-satisfied triggers checked more frequently than triggers far from their activation thresholds.

When the decision at step 1120 determines that the composite trigger is satisfied (YES path), the method proceeds to step 1122 to determine priority and selection among potentially multiple satisfied triggers. The priority determination and selection step 1122 addresses scenarios wherein multiple triggers may be satisfied simultaneously, requiring the system to determine which should proceed to execution. According to an embodiment, the priority determination step 1122 ranks satisfied triggers according to priority values encoded in the graph elements to which the triggers are bound, with higher-priority triggers such as those associated with safety-critical operations or time-sensitive processing ranked above lower-priority triggers. The ranking considers urgency metrics that may increase with how long a trigger has been continuously satisfied without execution, preventing starvation of triggers that remain satisfied but are repeatedly preempted by higher-priority events. The ranking considers resource consumption estimates, potentially favoring lower-cost operations when resources are constrained or favoring higher-impact operations when resources are plentiful. The ranking may implement fairness policies ensuring that all graph regions receive execution opportunities over time, preventing scenarios where high-activity regions monopolize execution at the expense of other graph areas.

Based on the ranking produced by priority determination, step 1122 selects one or more triggers to proceed to execution initiation. The selection may choose only the highest-priority trigger to ensure focused execution of the most important operation, may select multiple triggers up to a concurrency limit enabling parallel execution across different graph regions or different operator types, or may select all satisfied triggers when resources permit and no priority-based filtering is required. The selection decision may be influenced by regulation constraints anticipated in subsequent method steps, pre-filtering triggers that are unlikely to pass regulation checks to avoid unnecessary processing overhead. The priority determination and selection step 1122 produces a set of selected triggers that will proceed to execution initiation, along with associated metadata such as priority values, bound operators, and execution context.

At step 1124, the method signals the trigger coordinator with information about satisfied and selected triggers. The trigger coordinator signaling step 1124 notifies trigger coordinator component 975 that trigger conditions have been met and execution should be initiated. According to an embodiment, the signaling step 1124 provides the trigger coordinator with the identity of the triggered graph element, which may be a node 912 or 914, an edge 922, 924, or 926, or a subgraph motif 932-938; the type of trigger that was satisfied, enabling the coordinator to understand what condition caused the triggering; the trigger context including relevant property values, traversal history, or other state information that may be needed during execution; the operator binding identifying which computational operator should be invoked, retrieved from the triggered graph element's execution semantics; priority and urgency information determined in step 1122 to inform scheduling decisions; and any constraints or requirements that must be satisfied during execution, such as resource reservations or ordering dependencies. The trigger coordinator signaling 1124 may employ different communication mechanisms depending on system architecture, including direct function calls in single-process implementations, message passing in distributed implementations, or event queues in asynchronous implementations. The trigger coordinator 975 operates as a graph-local, distributed component rather than a centralized scheduler, with multiple coordinator instances potentially receiving signals from different graph regions concurrently.

At step 1126, the method initiates an execution request that will be forwarded to the regulation checking process. The execution request initiation step 1126 transitions from trigger evaluation to the broader execution pipeline. According to an embodiment, the execution request initiation 1126 packages all information needed for subsequent processing including, but not limited to, the operator to be executed, parameters for the operator derived from graph properties or trigger context, the graph element(s) that will be affected by execution, priority and urgency information, and any execution-specific requirements or constraints. The initiation step 1126 forwards this packaged execution request to the regulation checking step 1008 of FIG. 10, wherein the request will be evaluated against safety, resource, and operational constraints before execution proceeds. The execution request may be queued if regulation checking or execution resources are currently occupied with other operations, may be expedited if priority is sufficiently high, or may be directly processed if resources are available. The execution request initiation 1126 completes the trigger evaluation process, having successfully identified graph-internal conditions warranting execution and prepared the necessary context for execution to proceed.

Figure 12:
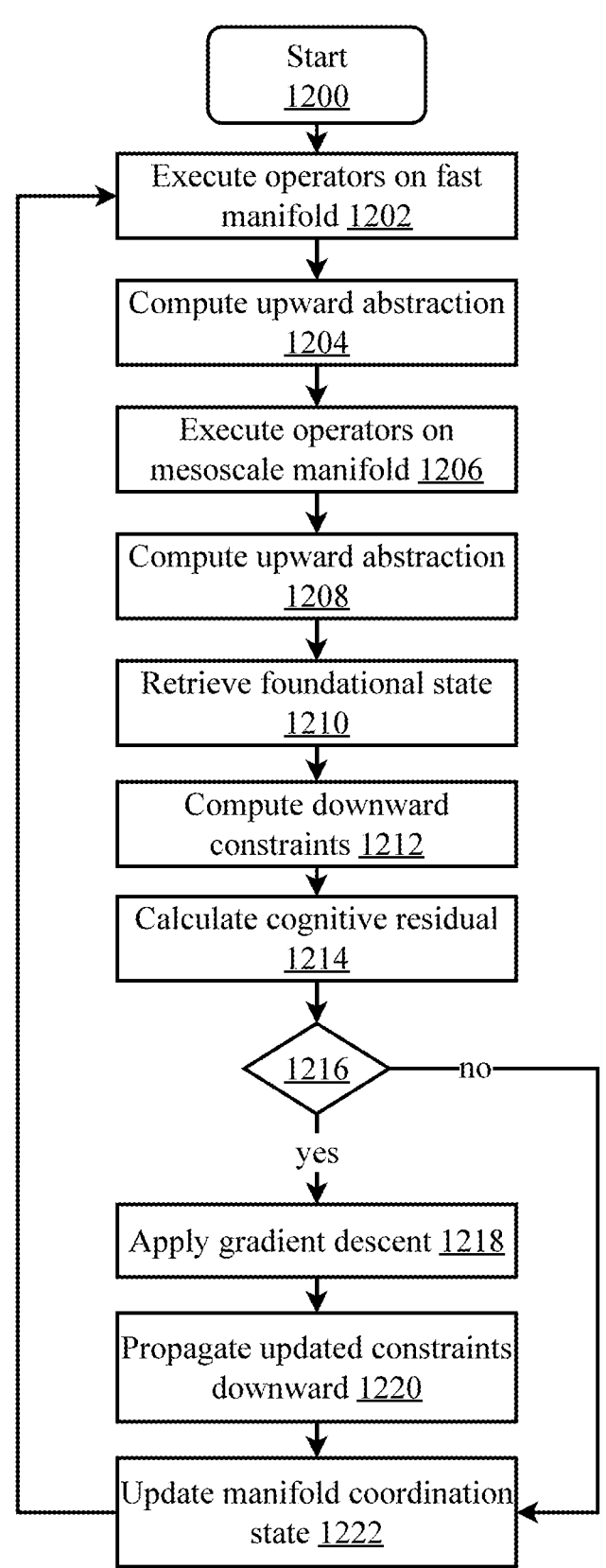
FIG. 12 is a flow diagram illustrating an exemplary method for hierarchical manifold coordination and metacognitive updating in self-executing graphs, according to an embodiment.

FIG. 12 is a flow diagram illustrating an exemplary method for hierarchical manifold coordination and metacognitive updating in self-executing graphs, according to an embodiment. The method demonstrates how self-executing graphs operating across multiple temporal scales maintain coherence through bidirectional information flow, wherein upward abstraction extracts patterns from lower manifold layers while downward constraint injection ensures behavioral consistency with higher-level values and policies. The method further demonstrates metacognitive learning, wherein the foundational manifold adapts its constraints based on persistent divergence between bottom-up experiential patterns and top-down policy expectations.

According to the embodiment, the process begins at step 1200, which represents entry into the hierarchical coordination process. According to an embodiment, step 1200 is invoked continuously throughout system operation as part of the ongoing execution cycle, with the hierarchical coordination method operating in parallel with or as an extension of the basic self-executing graph operation method of FIG. 10. The hierarchical coordination process enables the self-executing graph to maintain multiple manifolds operating at different temporal scales, each processing information appropriate to its timescale while maintaining consistency with other layers through the bidirectional mappings disclosed herein. In various embodiments, the frequency at which the hierarchical coordination cycle executes may vary by manifold layer, with fast manifold operations cycling at millisecond to second timescales, mesoscale operations at minute to hour timescales, and foundational operations at day to week timescales, reflecting the natural separation of temporal scales appropriate to event processing, decision-making, and identity evolution respectively.

At step 1202, the method processes event-level information with high temporal resolution to maintain responsiveness to rapidly changing conditions. The operators executed on the fast manifold 1202 may include any of the GPU-executable operator kernels disclosed herein, including diffusion operators propagating information along event sequences, geodesic operators computing optimal paths through event space, curvature operators identifying redundancy in event patterns, projection operators mapping new events into the manifold, recombination operators generating hypothetical event sequences, and routing operators identifying relevant event trajectories for queries. The execution step 1202 operates according to the self-executing graph principles disclosed herein, with execution initiated by graph-internal triggers rather than external scheduling, gated by regulation constraints, and resulting in graph mutations that update the fast manifold structure.

The fast manifold execution 1202 generates fast trajectories in embodied systems, interaction sequences in conversational systems, or observation-response patterns in monitoring systems. The fast manifold maintains sufficient detail to capture fine-grained temporal dynamics while operating at timescales enabling real-time responsiveness. In various embodiments, the fast manifold may implement specialized execution semantics optimized for high-frequency operation, including streamlined trigger evaluation focusing on traversal and state-change triggers, aggressive compression to maintain bounded memory despite high event rates, and prioritization of low-latency operations over computationally intensive analysis. The fast manifold execution 1202 produces updated graph structure and event trajectories that serve as input to the upward abstraction process in subsequent steps.

At step 1204 mapping q extracts higher-level patterns from fast event sequences, reducing dimensionality while preserving essential geometric structure. According to an embodiment, a submersion mapping reduces dimensionality by identifying equivalence classes of fast events that share common high-level characteristics, enabling multiple distinct event sequences to map to the same mesoscale pattern when they represent functionally equivalent behaviors or outcomes.

The upward abstraction 1204 may be computed through various techniques including spectral methods that project fast manifold coordinates onto dominant eigenvectors of the Laplacian, identifying low-dimensional structure that captures essential variability while discarding high-frequency noise; clustering methods that group similar fast trajectories and represent each cluster by a mesoscale vertex, with cluster assignments updated as new events are processed; neural network encoders trained to map fast event sequences to mesoscale representations that preserve task-relevant information while discarding irrelevant details; or geometric methods that compute geodesic distance matrices on the fast manifold and embed them into lower-dimensional mesoscale space using multidimensional scaling or similar techniques. In some embodiments, the upward abstraction 1204 maintains explicit mappings recording which fast events contributed to which mesoscale patterns, enabling backpropagation of constraints or gradients from mesoscale to fast layers in subsequent processing. The upward abstraction step 1204 produces mesoscale representations that will be processed by mesoscale operators in subsequent steps.

At step 1206, the method executes operators on the mesoscale manifold M. The mesoscale manifold execution step 1206 processes decision trajectories and tactical patterns operating over timescales of minutes to hours, providing an intermediate level of abstraction between rapid event processing and slow identity structures. According to an embodiment, the mesoscale manifold M corresponds to mesoscale manifold component 954 and comprises vertices representing decision states, tactical objectives, or behavioral modes, edges representing transitions between decision states or causal relationships between objectives, and properties including decision parameters, confidence values, and success metrics. The operators executed on the mesoscale manifold 1206 integrate the abstracted fast patterns received from step 1204 with existing mesoscale structure, identifying decision-level patterns such as recurring behavioral strategies, effective action sequences, or problematic interaction patterns. The mesoscale operators may implement decision-making logic, policy evaluation, or tactical planning appropriate to the intermediate timescale, with execution frequency lower than the fast manifold to reflect the longer temporal coherence of decision-level patterns.

The mesoscale manifold execution 1206 produces mesoscale trajectories representing sequences of decisions or tactical states that encode behavioral patterns at timescales longer than individual events but shorter than fundamental identity changes. These trajectories may represent extended interaction strategies in conversational systems, multi-step operational procedures in control systems, or sustained behavioral modes in autonomous agents. The mesoscale manifold provides a crucial bridge between reactive fast processing and stable foundational values, enabling the system to develop intermediate-term behavioral coherence without the rigidity of foundational constraints or the reactivity of event-level responses. In various embodiments, the mesoscale manifold may implement specialized execution semantics balancing responsiveness and stability, including composite triggers combining fast event patterns with mesoscale state conditions, moderate compression preserving decision-relevant detail while consolidating equivalent strategies, and deliberative recombination exploring alternative decision sequences during low-activity periods. The mesoscale execution step 1206 produces updated mesoscale structure that serves as input to further upward abstraction in subsequent steps.

At step 1208, the method computes upward abstraction from the mesoscale manifold M, to the foundational manifold Mf through the Riemannian submersion mapping of. The upward abstraction computation step 1208 extracts long-term patterns from mesoscale decision sequences, identifying persistent behavioral themes, stable preference structures, or invariant reasoning patterns that characterize the system's fundamental identity. According to an embodiment, the submersion mapping projects mesoscale decision trajectories to foundational representations, further reducing dimensionality while preserving geodesic structure at the foundational level. The submersion identifies invariant patterns across diverse mesoscale trajectories, extracting commonalities that persist across varying tactical contexts and decision scenarios.

The upward abstraction 1208 may employ long-horizon integration that accumulates mesoscale patterns over extended time periods, identifying trends and invariants that emerge only through sustained observation; value extraction that infers underlying preferences or priorities from observed decision patterns, reverse-engineering the value functions that would produce the observed behavioral choices; schema induction that identifies abstract behavioral templates or reasoning patterns instantiated across multiple specific mesoscale situations; or identity consolidation that updates foundational representations of who the system is based on what it consistently does at the mesoscale. The upward abstraction to the foundational level operates more slowly than lower-level abstractions, requiring sustained evidence before modifying foundational structures to ensure stability of core identity and values. In some embodiments, the upward abstraction 1208 incorporates confidence weighting wherein recent or well-supported mesoscale patterns contribute more strongly to foundational updates than historical or uncertain patterns. The upward abstraction step 1208 produces foundational-level representations encoding the system's current identity, values, and reasoning style.

At step 1210, the method retrieves the current foundational state from the foundational manifold Mf. The foundational state retrieval step 1210 accesses the slowly-evolving structures that encode the system's core identity, values, and reasoning constraints. According to an embodiment, the foundational manifold Mf corresponds to foundational manifold component 956 and comprises a representation encoding identity structures, value alignments, reasoning preferences, and long-term behavioral constraints. The foundational state r may be represented as a point or region in the foundational manifold, as a distribution over foundational configurations, or as a structured object encoding multiple facets of identity including moral values, aesthetic preferences, reasoning strategies, social commitments, and self-concept. The retrieval step 1210 accesses this foundational state to enable subsequent computation of downward constraints that will restrict lower-level processing to remain consistent with foundational commitments.

The foundational state retrieved in step 1210 evolves slowly relative to lower manifold layers, changing only when persistent patterns in upward abstraction indicate sustained divergence from current foundational expectations or when metacognitive updating as disclosed in subsequent steps adjusts foundational constraints to better align with observed experience. The slow evolution of foundational state ensures stability of core identity while permitting gradual adaptation based on extended experience. In various embodiments, the foundational state may be partitioned into multiple components with different degrees of stability, including immutable core values that never change during system operation, slowly-adapting identity structures that evolve over weeks to months of operation, and moderately-stable preferences that adjust over days to weeks, enabling nuanced control over what aspects of identity are rigid versus flexible. The foundational state retrieval 1210 provides the basis for computing how higher-level commitments should constrain lower-level processing.

At step 1212, the method computes downward constraints through Riemannian immersion mappings and determines how foundational values and policies should restrict the configuration spaces of lower manifold layers to ensure behavioral consistency with established identity. According to an embodiment, the immersion mapping injects foundational constraints into the mesoscale manifold, defining which mesoscale decision trajectories are admissible based on foundational commitments, and the immersion mapping ψ responses are permitted. These immersion mappings implement top-down control wherein higher-level policy constrains lower-level action without micromanaging implementation details, enabling autonomous operation at each level while maintaining alignment with foundational values.

The downward constraints computed in step 1212 may be implemented through various mechanisms including, but not limited to, hard constraints that absolutely forbid certain actions or trajectories inconsistent with foundational values, creating impassable regions in lower manifold spaces; soft constraints that bias execution toward foundational-aligned behaviors through modified edge weights, curvature fields, or potential functions, making non-aligned behaviors less likely without absolutely preventing them; goal injection that establishes target states or attractors in lower manifolds based on foundational objectives, causing execution to naturally flow toward foundational-aligned outcomes; or execution modulation that adjusts trigger thresholds, regulation parameters, or operator selection probabilities based on foundational context, shifting lower-level processing characteristics without explicitly constraining outputs. In some embodiments, the strength of downward constraints may vary based on how confidently the foundational state is established, with weakly-supported foundational constraints exerting gentle bias while strongly-supported constraints exert firm restrictions. The downward constraint computation 1212 produces constraint specifications that will be used to evaluate cognitive residual in subsequent steps and to update lower manifold execution if foundational adjustments occur.

At step 1214, the method calculates the cognitive residual C(p) measuring divergence between upward abstraction and downward constraint paths. The cognitive residual calculation step 1214 quantifies the consistency between bottom-up experiential patterns and top-down policy expectations, identifying cognitive tension where current experience generates abstractions inconsistent with established values. According to an embodiment, the cognitive residual represents the foundational expectation for point p based on downward constraints, and $d_{Mf}$ represents the distance metric in the foundational manifold Mf. High residual values indicate that current experiences are producing foundational-level abstractions different from what foundational constraints would predict, signaling potential misalignment between values and behavior. Low residual values confirm coherence between bottom-up processing and top-down expectations.

The cognitive residual calculation 1214 may be computed at individual points, aggregated over sets of points representing trajectory segments or graph regions, or integrated over time to measure sustained versus transient divergence. In various embodiments, the residual calculation may weight different components of foundational state differently, measuring divergence more sensitively for core values than for peripheral preferences; incorporate uncertainty estimates from the abstraction and constraint processes, discounting residual contributions from low-confidence mappings; or normalize by baseline residual values to detect significant deviations from typical cognitive tension levels rather than absolute divergence magnitudes. The residual serves as a learning signal for metacognitive updates, with high sustained residual triggering adaptation of foundational constraints to better align with persistent experiential patterns. The cognitive residual calculation step 1214 produces residual values that inform the subsequent decision about whether metacognitive updating should occur.

At decision point 1216, the method determines whether the cognitive residual C(p) exceeds a predetermined threshold $C_{threshold}$. This decision point evaluates the magnitude of cognitive tension to determine whether foundational adaptation is warranted. According to an embodiment, the decision at step 1216 compares the computed residual against a threshold that may be set based on desired stability of foundational values, with higher thresholds producing more rigid identity that changes only under extreme sustained tension and lower thresholds producing more adaptive identity that adjusts readily to experiential patterns. The threshold $C_{threshold}$ may be constant throughout system operation, may vary based on system maturity with higher thresholds in mature systems and lower thresholds during initial learning phases, or may adapt based on historical residual patterns to maintain a target rate of foundational updates. The decision may consider not only instantaneous residual magnitude but also residual persistence, triggering updates only when residual has remained elevated for a sustained period indicating genuine structural misalignment rather than transient fluctuation.

When the decision at step 1216 determines that the cognitive residual does not exceed the threshold (NO path), the method proceeds to step 1222 to update coordination state while maintaining current foundational constraints. This path represents the normal operational state wherein bottom-up abstractions align sufficiently with top-down expectations, indicating that current foundational values appropriately characterize observed behavior. The NO path avoids unnecessary foundational updates, preserving identity stability and preventing oscillation or drift in core values. In various embodiments, the NO path may still record residual values for historical tracking, adjust confidence in foundational state based on continued alignment, or perform minor parameter tuning that improves alignment without fundamental structural change. The NO path enables the system to maintain behavioral coherence without the computational and conceptual overhead of continuous foundational revision.

When the decision at step 1216 determines that the cognitive residual exceeds the threshold (YES path), the method proceeds to step 1218 to apply gradient descent on the foundational manifold Mf. The gradient descent application step 1218 may implement metacognitive learning wherein the foundational manifold adapts its structure to reduce cognitive tension. This update moves the foundational state in the direction of steepest descent of the residual functional, adjusting values and constraints to better align with persistent experiential patterns that cannot be accommodated within the current foundational framework.

The gradient descent 1218 may be implemented with various learning rates, with slower rates ensuring gradual adaptation that avoids destabilization of identity and faster rates enabling rapid accommodation of new patterns when appropriate. In some embodiments, the learning rate may vary across different components of foundational state, with core immutable values having zero or near-zero learning rates to prevent drift in fundamental commitments while peripheral preferences have higher learning rates enabling ready adaptation. The gradient computation may employ various techniques including analytical gradients computed from differentiable residual functionals, numerical gradients estimated through finite differences by perturbing foundational state and measuring resulting residual changes, or learned gradients predicted by neural networks trained to estimate how foundational changes affect residual. The gradient descent update may incorporate regularization terms that bias updates toward simpler or more coherent foundational structures, momentum terms that smooth updates across multiple time steps, or constraint projection that ensures updated foundational state remains within admissible regions defined by hard identity requirements. The gradient descent step 1218 produces an updated foundational state r' that exhibits reduced cognitive residual relative to the original state r.

At step 1220, the method propagates the updated foundational constraints downward to lower manifold layers. The constraint propagation step 1220 recomputes the downward immersion mappings, ensuring that lower-level processing operates under constraints consistent with the adapted foundational values. According to an embodiment, the propagation step 1220 recalculates how the modified foundational structure restricts mesoscale decision spaces and fast event responses, updating constraint specifications, execution biases, goal states, or regulation parameters throughout the hierarchical architecture. The propagation may occur immediately for time-critical constraints requiring instant enforcement, may be deferred and applied gradually to avoid disrupting ongoing processing, or may be applied selectively to graph regions where residual was highest while leaving well-aligned regions unchanged. In various embodiments, the propagation may include notifications to lower-level trigger evaluators and regulation systems that constraint parameters have changed, requiring re-evaluation of execution decisions; updates to node and edge execution semantics encoding constraint-dependent activation predicates or operator selection logic; or modifications to geometric properties such as curvature fields or potential functions that implement constraint biases through the manifold structure itself. The constraint propagation step 1220 completes the metacognitive update cycle by ensuring that learned foundational adaptations influence actual system behavior through updated constraints on lower-level execution.

At step 1222, the method updates manifold coordination state to record the coordination cycle outcomes and maintain coordination history. The coordination state update step 1222 records residual values, convergence metrics, foundational update magnitudes, and other information relevant to assessing and improving hierarchical coordination performance. According to an embodiment, the coordination state update 1222 stores residual time series enabling analysis of cognitive tension trends over extended periods, records which foundational components were updated and by how much to track identity evolution, maintains statistics on coordination cycle frequency and computational cost to support resource planning, and logs any anomalies or unexpected behaviors encountered during coordination to enable debugging and refinement. The coordination state may be used to adapt coordination parameters such as residual thresholds, gradient descent learning rates, or abstraction/constraint mapping functions to improve coordination effectiveness over time. In some embodiments, the coordination state enables meta-learning wherein the system learns how to coordinate its own hierarchical structure more effectively based on historical coordination outcomes, implementing a higher level of metacognition beyond the foundational updates described in step 1218. The coordination state update step 1222 prepares the system for the next coordination cycle.

Following step 1222, the method returns to step 1202 to continue executing on the fast manifold, completing the continuous coordination loop. This feedback path implements the perpetual hierarchical coordination that maintains coherence across temporal scales throughout system operation. The continuous loop ensures that the hierarchical architecture remains dynamically balanced, with lower layers continually abstracting patterns upward, higher layers continually constraining lower layers downward, and residual-driven learning continually adapting the foundational layer when persistent misalignment indicates values should evolve. The coordination cycle operates at timescales appropriate to each layer, with fast execution cycling rapidly, mesoscale processing at moderate rates, and foundational updates rarely, creating a natural separation of concerns that enables stable yet adaptive multi-scale operation.

Figure 13:
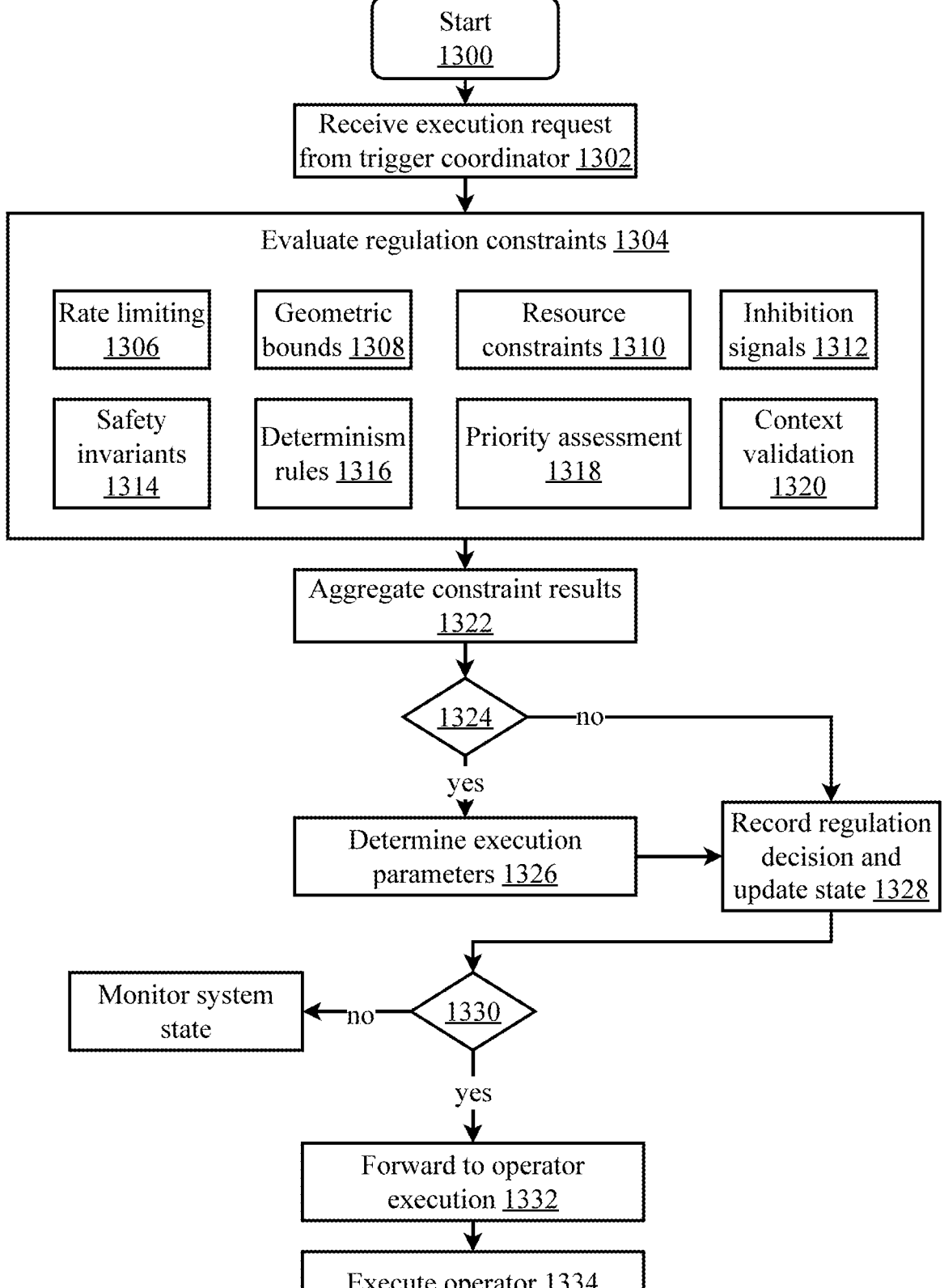
FIG. 13 is a flow diagram illustrating an exemplary method for execution regulation and safety control in self-executing graphs, according to an embodiment.

FIG. 13 is a flow diagram illustrating an exemplary method for execution regulation and safety control in self-executing graphs, according to an embodiment. The method demonstrates how self-executing graphs maintain bounded, safe operation through comprehensive constraint evaluation that gates execution requests from trigger coordinators, ensuring that computational operations proceed only when all safety, resource, and operational requirements are satisfied.

According to the embodiment, the process begins at step 1300, which represents entry into the execution regulation process. According to an embodiment, step 1300 is invoked whenever a trigger coordinator signals that graph-internal conditions warrant execution, transitioning from the trigger evaluation method of FIG. 11 to the regulation checking phase that determines whether execution should actually proceed. The regulation process operates as a safety gate in the self-executing graph architecture, implementing the principle that endogenous triggers request execution but do not guarantee execution, with final execution authority residing in the regulation system that enforces constraints ensuring bounded resource usage, safety compliance, and operational correctness. In various embodiments, the regulation process may be invoked synchronously as part of the execution request flow, may operate asynchronously with execution requests queued pending regulation approval, or may employ hybrid approaches wherein high-priority execution requests receive expedited regulation processing while lower-priority requests undergo more thorough evaluation.

At step 1302, the method receives an execution request from the trigger coordinator. The execution request reception step 1302 accepts the complete context necessary for regulation evaluation from trigger coordinator component 975 following trigger satisfaction. According to an embodiment, the execution request received at step 1302 includes the operator to be executed, identifying which computational operation should be invoked from among the GPU-executable operator kernels disclosed herein such as diffusion, geodesic, spectral, curvature, projection, recombination, or routing operators, or custom operators defined for specific applications; the graph element that triggered execution, which may be a node 912 or 914, an edge 922, 924, or 926, or a subgraph motif 932-938; priority information determined during trigger evaluation step 1122 of FIG. 11, indicating the relative importance or urgency of the execution request; trigger context including the type of trigger that was satisfied, relevant property values, traversal history, or state changes that caused triggering; and resource requirements estimating the computational resources needed for execution, including GPU kernel invocations, memory allocation, execution duration, or other resource consumption parameters. The execution request provides all information necessary for the regulation system to make an informed decision about whether execution should proceed, enabling comprehensive evaluation of constraints without requiring additional queries to the graph state or trigger system.

In some embodiments, the execution request received at step 1302 includes execution-specific constraints or requirements encoded in the triggered graph element's execution semantics, such as required ordering relationships with other pending executions, mutual exclusion requirements preventing concurrent execution with specified other operations, or prerequisite conditions that must be satisfied before execution can commence. The execution request may further include execution history information indicating how frequently the triggered element has executed recently, enabling rate limiting evaluations, and execution outcome predictions based on prior invocations of similar operators, enabling preemptive resource allocation or conflict avoidance. The comprehensive execution request accepted at step 1302 enables the regulation system to perform thorough constraint evaluation without introducing communication overhead or latency from additional data gathering.

At step 1304, the method evaluates regulation constraints in parallel through multiple independent constraint evaluators. Step 1304 represents a parallel evaluation phase wherein different types of regulation constraints are assessed concurrently based on the execution request received in step 1302. The parallel evaluation structure of step 1304 enables comprehensive constraint checking with minimal latency, as all evaluator types can assess their respective constraints simultaneously rather than sequentially. According to an embodiment, step 1304 encompasses a plurality of specialized constraint evaluation substeps, each implementing a different constraint type as described herein. The parallel evaluation of step 1304 may be implemented through concurrent execution threads or processes assigned to different evaluator types, through vectorized operations evaluating multiple constraints within each type simultaneously, through distributed evaluation across multiple processing elements, or through pipelined evaluation wherein different constraint types operate in overlapping time periods. The independence of constraint evaluators ensures that failure or delay in one evaluator does not prevent other evaluators from completing their assessments, providing fault tolerance and reducing worst-case evaluation latency.

Within the parallel evaluation phase 1304, substep 1306 evaluates rate limiting constraints to prevent execution frequency from exceeding safe bounds. The rate limiting evaluation substep 1306 assesses whether the triggered graph element or related elements have executed too frequently, implementing temporal constraints that prevent resource exhaustion or computational overload. According to an embodiment, the rate limiting evaluation 1306 checks execution counters tracking how many times the triggered element has executed within defined time windows, comparing counts against maximum invocation thresholds to ensure execution frequency remains within bounds; verifies cooldown timers ensuring minimum intervals between successive executions of the same element, preventing tight execution loops that could monopolize computational resources; applies token bucket limits implementing rate limiting with controlled burst capacity, allowing temporary execution rate spikes while maintaining long-term average rates within bounds; and checks decay functions that gradually reduce execution likelihood after repeated recent activations, implementing adaptive rate limiting that responds to sustained high-frequency execution patterns. The rate limiting evaluation 1306 interfaces with the limiting controller 982 to access current counter values, timer states, and bucket levels. In some aspect, substep 1306 returns a binary PASS/FAIL result indicating whether rate limiting constraints permit execution.

Within the parallel evaluation phase 1304, substep 1308 evaluates geometric bounds constraints to ensure execution maintains geometric properties within safe ranges. The geometric bounds evaluation substep 1308 assesses whether executing the requested operator would violate geometric properties essential to system stability, leveraging the geometric framework disclosed herein. According to an embodiment, the geometric bounds evaluation 1308 checks curvature caps by comparing local curvature values against maximum thresholds, preventing execution in regions where curvature already indicates excessive compression or structural instability that could be exacerbated by additional execution; verifies pressure limits by assessing compression pressure against bounds, ensuring execution does not occur in regions where pressure already approaches critical values; checks density bounds by measuring vertex or edge concentration in the affected graph region, preventing execution when density already approaches saturation levels that would degrade performance or stability; and validates flow stability by analyzing velocity fields and divergence patterns, ensuring execution will not induce oscillatory or divergent dynamics. The geometric bounds evaluation 1308 interfaces with geometric bounding controller 984 to access current geometric property values and threshold parameters. In some aspects, substep 1308 returns PASS if geometric properties permit execution or FAIL if bounds would be violated.

Within the parallel evaluation phase 1304, substep 1310 evaluates resource constraints to verify sufficient computational resources exist for execution. The resource constraints evaluation substep 1310 assesses whether the system possesses adequate computational capacity to execute the requested operation without resource exhaustion or performance degradation. According to an embodiment, the resource constraints evaluation 1310 checks GPU availability by verifying that GPU processing units are not fully occupied with other operations, ensuring execution can proceed without excessive queuing or context switching overhead; verifies memory budget by confirming that memory allocation required for execution can be satisfied without exceeding total memory capacity or triggering out-of-memory conditions; checks concurrency limits by ensuring that the number of concurrent executions across the graph does not exceed maximum sustainable parallelism, preventing resource contention or scheduling pathologies; and validates power and thermal constraints by assessing whether execution would push hardware beyond safe thermal or power envelopes, protecting physical hardware from damage or degradation. The resource constraints evaluation 1310 interfaces with resource monitor 986 to access current resource utilization metrics, available capacity, and limit thresholds. In some embodiments, the resource evaluation may project future resource usage based on execution duration estimates, preventing execution that would initially fit within capacity but would eventually cause resource exhaustion. In some aspects, substep 1310 returns PASS if resources are adequate or FAIL if resource constraints prevent safe execution.

Within the parallel evaluation phase 1304, substep 1312 evaluates inhibition signals to determine whether execution should be suppressed by explicit blocking conditions. The inhibition signals evaluation substep 1312 assesses whether graph-resident or system-level signals explicitly prohibit execution of the requested operation. According to an embodiment, the inhibition signals evaluation 1312 checks suppression flags set by other graph elements, external controllers, or system monitoring components indicating that certain operations should not execute under current conditions; verifies mutual exclusion constraints ensuring that operations known to be incompatible do not execute concurrently, preventing conflicts, race conditions, or inconsistent state modifications; checks blocking conditions encoded in execution semantics of graph elements indicating prerequisites that must be satisfied or incompatible states that must be absent; and validates safety interlocks that implement fail-safe mechanisms preventing execution during detected anomalies, emergency conditions, or while system is in degraded operational modes. The inhibition signals evaluation 1312 interfaces with inhibition controller 988 to access current inhibition state. Inhibition signals provide a mechanism for negative control, enabling the system or external supervisors to selectively block execution without requiring continuous external scheduling intervention. In some aspects, substep 1312 returns PASS if no inhibition signals are active or FAIL if execution is explicitly blocked.

Within the parallel evaluation phase 1304, substep 1314 evaluates safety invariants to ensure execution maintains critical system properties. The safety invariants evaluation substep 1314 assesses whether executing the requested operation would violate invariants essential to correct system operation. According to an embodiment, the safety invariants evaluation 1314 validates graph invariants including topological properties that must be maintained such as acyclicity in certain subgraphs, connectivity requirements ensuring critical paths remain intact, or cardinality constraints limiting vertex or edge counts in specific regions; checks consistency rules ensuring that vertex and edge properties satisfy domain-specific constraints such as type consistency, value range restrictions, or relational integrity requirements; verifies fail-safe conditions including deadlock freedom, livelock avoidance, or guaranteed progress properties ensuring the system cannot enter unrecoverable states; and checks anomaly detectors that identify unusual patterns in graph state, execution frequency, or resource consumption that may indicate faults, attacks, or configuration errors warranting execution suspension. The safety invariants evaluation 1314 interfaces with safety monitor 992 to access invariant specifications and current violation status. In some embodiments, the safety evaluation may employ formal verification techniques, model checking, or runtime verification to assess whether execution would preserve required properties. In some aspects, substep 1314 returns PASS if all safety invariants would remain satisfied or FAIL if execution would induce violations.

Within the parallel evaluation phase 1304, substep 1316 evaluates determinism rules to ensure execution maintains reproducibility and ordering requirements. The determinism rules evaluation substep 1316 assesses whether executing the requested operation complies with constraints necessary for deterministic system behavior. According to an embodiment, the determinism rules evaluation 1316 checks ordering constraints specifying precedence relationships among execution events, ensuring that operations execute in sequences consistent with defined causal dependencies or temporal orderings; verifies epoch consistency ensuring that execution occurs within appropriate execution phases or epochs, preventing violations of phase separation requirements that ensure deterministic replay; validates journal state confirming that all necessary state information has been recorded to enable execution journaling and replay, maintaining auditability and reproducibility; and checks reproducibility requirements including verification that random number generators are properly seeded, that execution order is deterministic, and that no external non-deterministic inputs would affect execution outcomes when reproducibility is required. The determinism rules evaluation 1316 interfaces with determinism manager 990 to access ordering specifications, epoch state, and journaling configuration. In safety-critical or regulated environments, determinism evaluation ensures that system behavior can be analyzed, validated, and reproduced for certification or debugging purposes. In some aspects, substep 1316 returns PASS if determinism requirements are satisfied or FAIL if execution would compromise reproducibility.

Within the parallel evaluation phase 1304, substep 1318 performs priority assessment to determine scheduling parameters for the execution request. The priority assessment substep 1318 evaluates the relative importance and urgency of the execution request compared to other pending or active executions. According to an embodiment, the priority assessment 1318 evaluates request priority using the priority value determined during trigger evaluation step 1122 of FIG. 11, considering factors such as urgency derived from trigger characteristics, importance based on graph element significance, or domain-specific priority criteria encoded in execution semantics; checks preemption rules determining whether the current request should preempt lower-priority active executions, suspend pending lower-priority executions, or wait for completion of higher-priority operations; compares to active executions by assessing current system load and the priority distribution of operations in progress, identifying opportunities for parallel execution or determining whether sequential execution is required; and determines scheduling parameters including execution order if multiple requests are approved, resource allocation proportions when capacity is shared among concurrent executions, or timeout values limiting maximum execution duration. Unlike other constraint evaluators that return binary PASS/FAIL results, the priority assessment substep 1318 can be configured to return a priority level or scheduling specification that influences subsequent execution parameter determination. Priority assessment enables the regulation system to optimize resource utilization and responsiveness while maintaining safety and correctness.

Within the parallel evaluation phase 1304, substep 1320 performs context validation to ensure execution is appropriate for current system state. The context validation substep 1320 assesses whether the requested execution is consistent with current operational context and system configuration. According to an embodiment, the context validation 1320 verifies operational mode by confirming that the requested operation is permitted under the current system mode such as normal operation, degraded mode, emergency mode, or maintenance mode, with different modes enabling or disabling specific operation types; checks system state including verification that prerequisite system components are operational, that required data structures or indices are available and up-to-date, and that system initialization has completed necessary setup; validates context match by ensuring that execution context provided in the request aligns with current graph state, preventing stale execution requests based on outdated trigger conditions from proceeding after graph state has changed; and confirms dependencies including verification that operations upon which the requested execution depends have completed successfully and that their results are available for use. The context validation substep 1320 prevents execution under conditions where success is unlikely or where execution might produce incorrect results due to mismatched assumptions. In some aspects, substep 1320 returns PASS if context is appropriate or FAIL if context mismatch prevents safe execution.

Each of the constraint evaluation substeps 1306, 1308, 1310, 1312, 1314, 1316, and 1320 operates independently and concurrently within the parallel evaluation phase 1304, producing individual results that are aggregated in subsequent steps. The substep 1318 priority assessment produces scheduling information rather than a binary result, supporting subsequent execution parameter determination. The parallel nature of constraint evaluation ensures that comprehensive regulation checking is performed with minimal latency, as all constraint types are assessed simultaneously rather than sequentially. The independence of evaluators provides fault tolerance, as failure in one evaluator can be isolated without preventing other evaluators from completing their assessments, and enables incremental deployment of new constraint types without modifying existing evaluators.

Following the parallel evaluation phase 1304, the method proceeds to step 1322 to aggregate constraint results. The constraint results aggregation step 1322 combines the individual results from all constraint evaluators to determine overall execution permission. According to an embodiment, the aggregation step 1322 employs AND-gate logic wherein execution is permitted only if all constraint evaluators returned PASS results, implementing a conservative approach that requires universal constraint satisfaction. This AND-gate logic ensures that any single constraint violation is sufficient to deny execution, preventing scenarios where execution might proceed despite violating critical constraints because other constraints were satisfied. The aggregation may weight certain constraint violations as more severe than others for logging or diagnostic purposes, but the final permission decision remains binary: execute if all constraints pass, deny if any constraint fails. In some embodiments, the aggregation step 1322 records which specific constraints failed when execution is denied, providing diagnostic information useful for debugging, system tuning, or alerting operators to potential configuration issues. The aggregation step 1322 produces a boolean result indicating whether all constraints were satisfied, along with supplementary information from the priority assessment substep 1318 that will be used if execution is permitted.

At decision point 1324, the method determines whether all constraints were satisfied. This decision point evaluates the aggregated result from step 1322 to determine the execution permission outcome. According to an embodiment, the decision at step 1324 returns true (YES path) if and only if all constraint evaluators from the parallel evaluation phase 1304 returned PASS results, indicating that rate limiting, geometric bounds, resource availability, inhibition signals, safety invariants, determinism rules, and context validation all permit execution. The decision returns false (NO path) if any single constraint evaluator returned FAIL, indicating that at least one constraint prevents safe execution. The decision at step 1324 implements the gating function of the regulation system, ensuring that execution authority remains with the constraint enforcement mechanism rather than being automatically granted upon trigger satisfaction. In various embodiments, the decision may incorporate additional meta-level checks such as verifying that all evaluators completed successfully without errors, checking that evaluation latency did not exceed acceptable bounds indicating potential computational issues, or confirming that constraint specifications themselves remain valid and properly configured.

When the decision at step 1324 determines that constraints are not all satisfied (NO path), the method proceeds directly to step 1328 to record the regulation decision while bypassing execution parameter determination. This path handles constraint violations by documenting the denial and updating regulation state without proceeding to execution. The NO path from decision 1324 represents the regulatory function preventing unsafe or inappropriate execution, implementing the safety-critical gating that distinguishes bounded self-executing graphs from uncontrolled autonomous systems.

When the decision at step 1324 determines that all constraints are satisfied (YES path), the method proceeds to step 1326 to determine execution parameters. The execution parameters determination step 1326 specifies how execution should proceed given that all constraints permit operation. According to an embodiment, the execution parameters determination 1326 sets resource allocation including GPU compute unit assignment, memory allocation quantities, or CPU core affinity for hybrid execution; determines timing including immediate execution, scheduled execution at a specified future time, or deferred execution pending completion of higher-priority operations; applies ordering constraints derived from the determinism rules evaluation 1316 and priority assessment 1318, specifying execution sequence when multiple operations are approved; configures priority-based scheduling adjustments including preemption eligibility allowing higher-priority requests to interrupt execution, guaranteed completion preventing preemption once execution begins, or fair-share resource allocation ensuring all approved operations receive proportional resources. The execution parameters may further include monitoring specifications indicating what metrics should be tracked during execution, timeout values limiting maximum execution duration, or rollback specifications enabling execution to be undone if unexpected conditions arise. The execution parameters determination step 1326 translates the abstract approval from constraint evaluation into concrete execution configuration, preparing the system to invoke the requested operator under controlled conditions.

Following either the YES path through parameter determination 1326 or the NO path directly from decision 1324, the method converges at step 1328 to record the regulation decision and update state. The regulation decision recording step 1328 documents the outcome of regulation evaluation and updates regulatory state to reflect the decision. According to an embodiment, the regulation decision recording 1328 journals the decision specifying whether execution was permitted or denied, which constraints were evaluated, which specific constraints failed if execution was denied, the priority level assigned if execution was permitted, and execution parameters determined for permitted requests; records rationale explaining the basis for the decision including constraint threshold values, current resource utilization, or detected violations that influenced the outcome; updates counters including execution counters for rate limiting, tracking how many times elements have executed to enforce future rate constraints; updates timers including cooldown timers recording when elements last executed to enforce minimum intervals; updates resource tracking reflecting resource allocations made for permitted executions or resource availability remaining after denials; and maintains execution history enabling analysis of regulation patterns, identification of frequently denied operations indicating potential configuration issues, or detection of regulatory bottlenecks limiting system performance. The regulation decision recording 1328 provides auditability and reproducibility, essential for safety-critical systems requiring validation that regulation constraints were properly enforced. In some embodiments, the recording step may generate alerts or notifications when certain patterns are detected, such as repeatedly denied execution attempts indicating misconfiguration or sustained high denial rates suggesting inadequate resources.

At decision point 1330, the method determines whether execution was permitted based on the recorded regulation decision. This decision point simply examines the outcome recorded in step 1328 to determine the appropriate continuation path. According to an embodiment, the decision at step 1330 returns true (YES path) if the regulation decision recorded in step 1328 indicated that all constraints were satisfied and execution was permitted, or returns false (NO path) if any constraint violation caused execution denial. This decision point separates the permitted and denied execution flows, ensuring that each receives appropriate subsequent processing.

When the decision at step 1330 determines that execution was not permitted (NO path), the method returns to the monitoring state of FIG. 10 step 1002 after applying appropriate throttling. The denied execution path implements feedback control preventing repeated futile execution requests when constraints persistently prevent execution. According to various embodiments, the throttling applied on the NO path may include exponential backoff wherein the trigger that requested execution is temporarily disabled or its threshold increased, with disable duration or threshold adjustment growing exponentially with repeated denials; rate reduction wherein trigger sensitivity is decreased to reduce execution request frequency for operations that cannot execute under current conditions; notification mechanisms alerting system administrators or external monitoring systems when denial rates exceed acceptable thresholds, indicating potential misconfiguration, resource exhaustion, or other systemic issues requiring intervention; or adaptive constraint relaxation wherein certain non-critical constraints may be temporarily loosened if sustained denial threatens system liveness, implementing graceful degradation under adverse conditions. The denied execution path with throttling prevents the regulation system from becoming a computational bottleneck, ensuring that resources are not wasted repeatedly evaluating execution requests for operations that cannot execute under prevailing conditions.

When the decision at step 1330 determines that execution was permitted (YES path), the method proceeds to step 1332 to forward the request to operator execution. The forwarding step 1332 transitions from regulation checking to actual operator invocation, connecting the method of FIG. 13 to the execution step 1012 of FIG. 10. According to an embodiment, the forwarding step 1332 passes the operator identifier specifying which GPU kernel should be invoked, execution parameters determined in step 1326 including resource allocations, timing specifications, and priority levels, graph element context identifying which vertices, edges, or subgraphs are affected by execution, trigger context explaining what conditions warranted execution to enable context-aware operator behavior, and resource allocation handles providing access to reserved GPU compute units, memory regions, or other allocated resources. The forwarding may occur through direct function calls in single-process implementations, through message queues in distributed or asynchronous implementations, or through shared memory structures enabling efficient handoff between regulation and execution subsystems. The forwarding step 1332 completes the regulation process, having determined that execution can proceed safely and having prepared all necessary context and resources for operator invocation.

At step 1334, the method continues to FIG. 10, step 1012, wherein the operator will be executed with the parameters and resources determined by regulation. Step 1334 represents the handoff point where the detailed regulation method of FIG. 13 integrates with the overall self-executing graph operation method of FIG. 10. The connection between these methods ensures that regulation functions as a critical gating mechanism within the larger execution cycle, preventing unsafe or inappropriate execution while permitting valid operations to proceed under controlled conditions. Following execution in step 1012 of FIG. 10, subsequent steps will update graph structure and propagate state changes, which may in turn generate new trigger conditions that invoke the regulation method again, creating a continuous cycle of triggering, regulation, execution, and mutation that characterizes self-executing graph operation.

Figure 14:
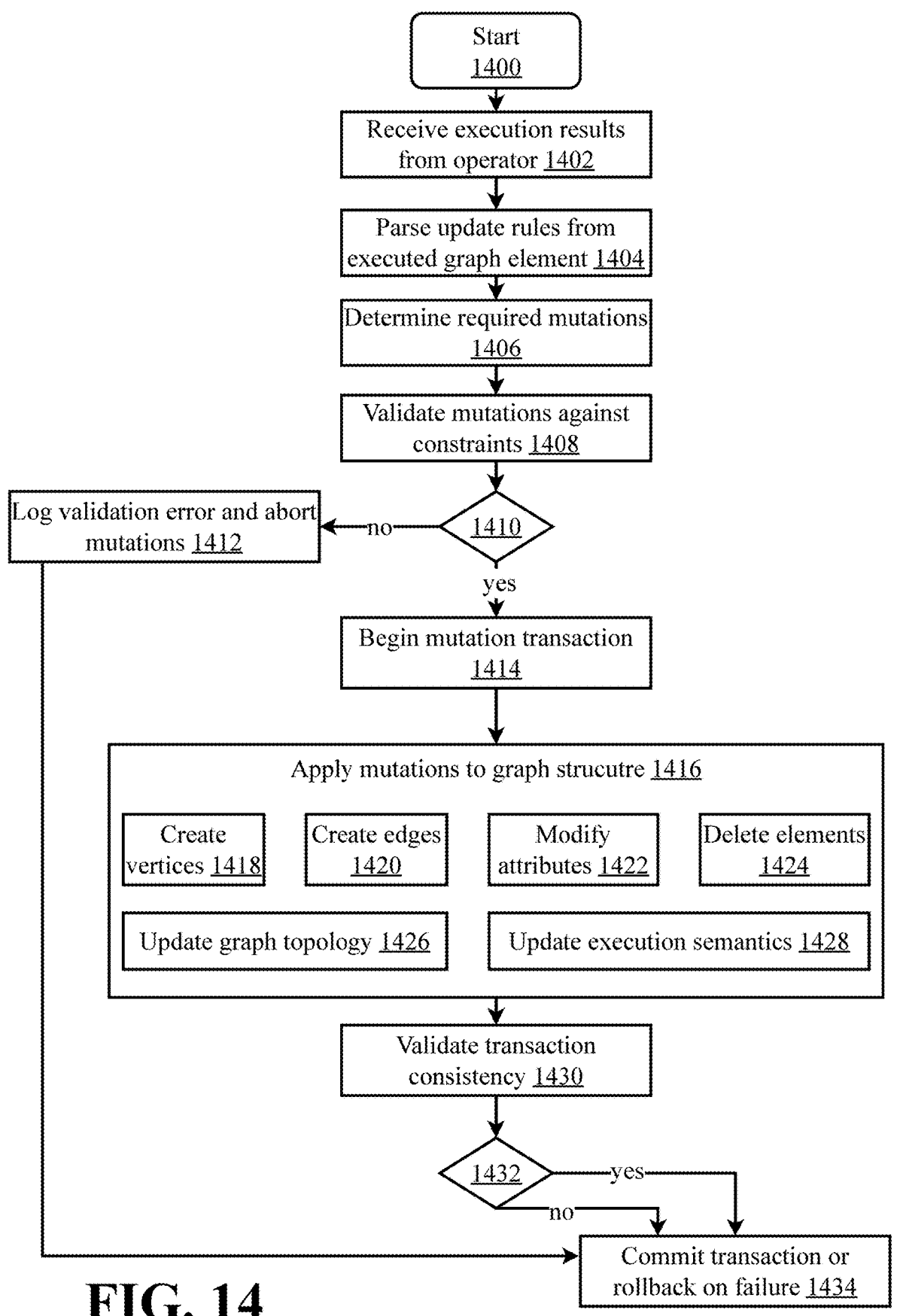
FIG. 14 is a flow diagram illustrating an exemplary method for graph-driven mutation and structural evolution in self-executing graphs, according to an embodiment

FIG. 14 is a flow diagram illustrating an exemplary method for graph-driven mutation and structural evolution in self-executing graphs, according to an embodiment. The method demonstrates how self-executing graphs autonomously modify their own structure in response to execution results, with mutation logic encoded directly within graph elements rather than imposed by external controllers.

According to the embodiment, the process begins at step 1400, which represents entry into the graph mutation process. According to an embodiment, step 1400 is invoked following operator execution as described in step 1012 of FIG. 10, transitioning from computational operations on graph structure to structural modifications of the graph itself. The mutation process implements the principle that execution results can specify structural changes, enabling the graph to evolve its topology, properties, and execution semantics based on the outcomes of its own operations. In various embodiments, the mutation process may be invoked synchronously as part of the execution completion flow, ensuring mutations occur immediately after execution; may operate asynchronously with mutation requests queued for batch processing to reduce overhead; or may employ hybrid approaches wherein critical mutations execute synchronously while non-critical structural optimizations are deferred to background processing. The mutation process enables continuous adaptation of graph structure to experiential patterns, implementing the self-evolving nature while extending it through graph-resident control of mutation decisions.

At step 1402, the method receives execution results from the operator that just completed. The execution results reception step 1402 accepts the complete output context from operator invocation, providing the data necessary to determine appropriate structural modifications. According to an embodiment, the execution results received at step 1402 include computed values representing the primary outputs of operator execution, such as updated vertex or edge properties, newly computed embeddings, geometric quantities like curvature or pressure values, or operator-specific results like geodesic distances or spectral decompositions; signals indicating qualitative outcomes of execution including success or failure indicators, convergence status for iterative operators, quality metrics for generated results, or warnings about anomalous conditions encountered during execution; mutation instructions comprising explicit structural change requests generated by the operator, which may include specifications for vertices or edges to create, modify, or delete, property updates to apply, or topological transformations to perform; and performance metrics including execution duration, resource consumption, convergence iteration counts, or other statistics useful for adaptive optimization. The execution results provide the complete context necessary for determining how the graph should evolve in response to the completed operation.

In some embodiments, the execution results received at step 1402 include operator-generated assessments of which structural modifications would improve future performance, such as recommendations to create edges connecting frequently co-accessed vertices to reduce path lengths, suggestions to delete low-curvature edges that represent redundant connections, or proposals to adjust vertex properties based on observed execution patterns. These recommendations implement learned structural optimization wherein operators accumulate knowledge about efficient graph configurations through repeated execution. The execution results may further include conflict notifications indicating when operators detected inconsistencies or constraint violations during execution that warrant structural correction, or efficiency suggestions proposing structural changes that would reduce computational overhead for future operations. The comprehensive execution results accepted at step 1402 enable intelligent mutation decisions based on actual execution outcomes rather than predetermined evolution rules.

At step 1404, the method parses update rules from the executed graph element. The update rules parsing step 1404 retrieves graph-resident mutation semantics that specify how execution results should be translated into structural modifications. According to an embodiment, the update rules parsing 1404 accesses mutation semantics stored in the graph element that triggered and executed the operator, which may be encoded in node properties for vertex-triggered execution as shown in nodes 912 or 914, in edge properties for edge-triggered execution as shown in edges 922, 924, or 926, or in subgraph metadata for motif-triggered execution as shown in motifs 932-938. The update rules may be expressed in various forms including declarative specifications that map execution result patterns to mutation operations, such as "if curvature<threshold then delete edge"; procedural code or scripts that compute mutations based on execution results; template-based transformations that instantiate predefined structural patterns with parameters derived from results; or learned mutation policies represented as neural networks, decision trees, or other machine learning models that have been trained to propose beneficial structural changes. The parsing step 1404 interprets these graph-resident update rules to determine what structural modifications are appropriate given the execution results received in step 1402.

The update rules parsing 1404 implements a key distinguishing feature of self-executing graphs: the mutation logic resides within the graph itself rather than in external control code. This graph-resident mutation specification enables different graph elements to evolve according to different rules, supports incremental deployment of new mutation strategies by updating graph element properties without modifying system code, and allows the graph's evolution behavior to itself evolve as mutation rules are refined through experience. In some embodiments, the update rules may reference the execution results explicitly through pattern matching or condition evaluation, accessing specific result fields such as computed values, signals, or performance metrics to determine mutation applicability. The parsing step 1404 produces an intermediate representation of intended mutations that will be further processed in subsequent steps.

At step 1406, the method determines required mutations based on parsed update rules and execution results. The mutation determination step 1406 translates abstract mutation specifications into concrete structural change operations. According to an embodiment, the mutation determination 1406 classifies mutations into fundamental operation types including CREATE operations that add new vertices to vertex set V or new edges to edge set E, expanding graph structure to represent new entities, relationships, or patterns discovered through execution; DELETE operations that remove vertices or edges from the graph, implementing compression by eliminating redundant, obsolete, or low-value structural elements identified through curvature analysis or other metrics; and MODIFY operations that update properties of existing vertices or edges without changing graph topology, adjusting embeddings, weights, attributes, or execution semantics based on execution outcomes. The determination step generates mutation specifications comprising operation type (CREATE, DELETE, MODIFY), target elements identifying which vertices or edges are affected, new or updated property values for creation and modification operations, and sequencing constraints specifying dependencies or ordering requirements among multiple mutations.

In various embodiments, the mutation determination 1406 may employ optimization techniques to minimize mutation overhead while achieving desired structural changes, such as batching multiple property modifications into single operations to reduce transaction costs, eliminating redundant mutations when multiple update rules independently specify the same structural change, or reordering mutations to satisfy dependency constraints while maximizing parallelism. The determination step may further analyze mutation interactions to detect conflicts wherein different update rules propose incompatible changes, proposing conflict resolution strategies such as prioritizing mutations from higher-priority graph elements, applying mutations sequentially in priority order, or merging compatible aspects of conflicting mutations while discarding incompatible aspects. The mutation determination step 1406 produces a complete, validated set of mutation specifications ready for constraint checking.

At step 1408, the method validates mutations against constraints to ensure structural integrity. The mutation validation step 1408 assesses whether proposed mutations would violate graph invariants, consistency rules, or structural constraints essential to correct system operation. According to an embodiment, the mutation validation 1408 checks invariants including topological properties such as acyclicity in directed acyclic graph regions that must remain acyclic, connectivity requirements ensuring that critical paths or components remain connected, cardinality constraints limiting vertex or edge counts in specific graph regions to prevent unbounded growth, and type safety ensuring that only vertices and edges of appropriate types are created or connected in typed graph regions. The validation checks consistency rules including referential integrity ensuring that edge endpoints reference valid existing vertices, property constraints verifying that vertex and edge properties satisfy domain-specific value ranges or relational requirements, and semantic constraints enforcing domain-specific rules such as temporal ordering of event vertices or compatibility of connected vertex types. The validation verifies that mutations don't violate structural constraints including memory bounds ensuring that graph size remains within allocated capacity, degree limits preventing vertices from accumulating excessive edge counts that would degrade performance, and execution semantic constraints ensuring that trigger conditions and operator bindings remain properly specified after mutations.

The mutation validation 1408 may employ various verification techniques including static analysis checking whether mutations would create known problematic patterns, dynamic analysis simulating mutation effects to detect constraint violations before actual application, formal verification techniques proving that mutations preserve critical invariants, or test-based validation applying mutations to graph copies and verifying resulting structure correctness. In some embodiments, the validation may distinguish between hard constraints that absolutely prevent mutation and soft constraints that suggest caution but permit mutation to proceed, enabling adaptive constraint enforcement based on operational context. The validation step 1408 produces a boolean determination of mutation validity along with diagnostic information identifying specific constraint violations if mutations are invalid.

At decision point 1410, the method determines whether the proposed mutations are valid. This decision point evaluates the validation result from step 1408 to determine whether mutations should proceed or be rejected. According to an embodiment, the decision at step 1410 returns true (YES path) if all proposed mutations satisfy all applicable constraints, indicating that structural changes can proceed without violating graph integrity. The decision returns false (NO path) if any mutation would violate any constraint, indicating that the mutation set must be rejected to preserve structural correctness. The decision at step 1410 implements conservative mutation control wherein structural integrity is prioritized over permitting all requested changes, ensuring that the graph never enters invalid or inconsistent states even when update rules request problematic modifications.

When the decision at step 1410 determines that mutations are not valid (NO path), the method proceeds to step 1412 to log the validation error and abort mutations. The validation error logging step 1412 records information about rejected mutations for debugging, system monitoring, and update rule refinement. According to an embodiment, the error logging 1412 records constraint violations detailing which specific constraints were violated by which proposed mutations, enabling diagnosis of problematic update rules; captures proposed mutation specifications documenting what structural changes were attempted, providing context for understanding why rules generated invalid mutations; logs execution context including operator results, graph element state, and environmental conditions that led to invalid mutation generation; and updates error statistics tracking validation failure rates by constraint type, graph region, or update rule, identifying systematic issues requiring attention. The logging may further generate alerts or notifications when validation failure rates exceed acceptable thresholds, indicating potential misconfiguration of update rules, inadequate constraint specifications, or systemic issues in mutation generation logic. Following error logging, the method proceeds directly to step 1434 to continue to state propagation without modifying graph structure, preserving graph integrity by rejecting invalid mutations rather than applying partial or corrupted structural changes.

When the decision at step 1410 determines that mutations are valid (YES path), the method proceeds to step 1414 to begin a mutation transaction. The transaction initiation step 1414 establishes an atomic context within which all structural modifications will be applied. According to an embodiment, the transaction initiation 1414 creates a transaction context comprising a unique transaction identifier for tracking and logging, isolation guarantees ensuring that concurrent graph accesses see consistent state, and rollback capabilities enabling complete undo of mutations if transaction cannot complete successfully. The initiation acquires locks on affected graph elements including write locks on vertices and edges that will be created, modified, or deleted, preventing concurrent modifications that could cause conflicts; read locks on vertices referenced by new or modified edges, ensuring referential integrity during mutation; and structural locks on graph regions undergoing topological changes, preventing concurrent topology modifications in overlapping areas. The transaction context may maintain shadow copies or undo logs recording pre-mutation state to enable rollback if transaction validation fails, snapshots of affected graph regions to support efficient rollback without full graph restoration, or compensation operations that can reverse mutations if applied changes prove problematic. The transaction initiation 1414 prepares the system to apply mutations atomically, ensuring that either all mutations succeed and graph transitions to a new consistent state, or no mutations apply and graph remains in its original consistent state.

At step 1416, the method applies mutations to graph structure through a coordinated set of structural modification operations. Step 1416 represents a compound mutation phase wherein multiple types of structural changes are applied to realize the complete mutation set. The mutation application 1416 operates within the transaction context established in step 1414, ensuring atomicity and enabling rollback if any mutation operation fails. According to an embodiment, step 1416 encompasses multiple specialized mutation substeps that modify different aspects of graph structure, with substeps executing in a coordinated sequence that respects dependency ordering while maximizing opportunities for parallel execution where dependencies permit.

Within the mutation application phase 1416, substep 1418 creates new vertices as specified in the mutation set. The vertex creation substep 1418 adds new nodes to the graph representing newly discovered entities, patterns, or abstractions. According to an embodiment, the vertex creation 1418 adds new nodes to vertex set V by allocating vertex identifiers, updating vertex count statistics, and registering vertices in appropriate data structures such as hash tables or index trees for efficient lookup; initializes properties A(v) for each new vertex v, setting attributes such as type labels, creation timestamps, initial quality or confidence values, and domain-specific metadata based on mutation specifications or default values; assigns embeddings φ(v) for new vertices, either computing initial embeddings from vertex properties using configured encoding functions, inheriting embeddings from related vertices through interpolation or aggregation, or initializing embeddings to random or zero values pending subsequent refinement through operator execution; and updates graph statistics including vertex count by type, degree distribution expectations, and memory utilization metrics to reflect added vertices. In some embodiments, vertex creation may trigger cascading operations such as automatic creation of edges connecting new vertices to related existing vertices based on similarity or structural patterns, initialization of execution semantics including trigger conditions and operator bindings for new vertices, or allocation of resources such as memory buffers or computation slots for vertex-associated processing. The vertex creation substep 1418 expands the graph to represent new information discovered or generated through execution.

Within the mutation application phase 1416, substep 1420 creates new edges as specified in the mutation set. The edge creation substep 1420 adds new connections to the graph representing newly identified relationships, temporal sequences, or structural associations. According to an embodiment, the edge creation 1420 adds connections to edge set E by allocating edge identifiers, verifying that endpoint vertices exist, and adding edges to adjacency structures such as adjacency lists, edge lists, or adjacency matrices; sets weights, direction, and edge type based on mutation specifications, initializing weight values w(e) to represent relationship strength, specificity, or importance, establishing directionality for directed edges or symmetry for undirected edges, and assigning type labels distinguishing relationship categories; initializes edge properties A(e) including creation timestamps, usage counters tracking traversal frequency, quality metrics indicating relationship confidence or reliability, and domain-specific attributes characterizing the relationship; and updates adjacency lists and graph connectivity structures including adding edges to source vertex outgoing edge lists and destination vertex incoming edge lists, updating neighborhood information for affected vertices, and invalidating cached connectivity metrics such as shortest path caches or connectivity matrices that must be recomputed to reflect new edges. In some embodiments, edge creation may trigger recomputation of geometric properties such as local curvature affected by new edges, spectral properties requiring re-eigenvector computation, or geodesic distances shortened by newly created shortcuts. The edge creation substep 1420 enhances graph connectivity to reflect discovered relationships and evolving structure.

Within the mutation application phase 1416, substep 1422 modifies attributes of existing vertices and edges. The attribute modification substep 1422 updates properties without changing graph topology, refining vertex and edge characteristics based on execution results. According to an embodiment, the attribute modification 1422 updates properties A for vertices and edges by applying incremental updates such as incrementing usage counters, adjusting quality scores based on execution outcomes, or updating temporal metadata like last-access timestamps; modifies embeddings φ(v) and φ(e) through various mechanisms including gradient updates from learned representations, interpolation toward target embeddings, normalization or projection operations, or complete embedding replacement when execution results provide superior representations; adjusts weights and values including edge weight modifications reflecting changed relationship strengths, vertex importance scores based on centrality or utility measures, or domain-specific values such as confidence levels, priorities, or resource allocations; and updates metadata such as revision numbers indicating modification history, validation status flags, ownership or access control attributes, or cached derived properties that depend on updated values. The attribute modification may employ differential updates that record only changes rather than complete property replacements to reduce storage overhead and support efficient undo operations. The attribute modification substep 1422 refines graph element characteristics to reflect accumulated execution experience without restructuring topology.

Within the mutation application phase 1416, substep 1424 deletes elements as specified in the mutation set. The element deletion substep 1424 removes vertices or edges from the graph, implementing compression by eliminating redundant or obsolete structural components. According to an embodiment, the element deletion 1424 removes vertices and edges from sets V and E by deallocating vertex or edge identifiers, removing entries from lookup structures, and updating count statistics; cleans up references by removing deleted vertices from edge endpoint specifications, deleting edges incident to deleted vertices to maintain referential integrity, and updating neighborhood information for vertices adjacent to deleted elements; frees memory and resources by deallocating property storage for deleted elements, releasing embeddings from memory pools, and returning allocated resources to available capacity; and updates counts and indices including decrementing vertex and edge counts, updating degree statistics for affected vertices, and marking index entries as invalid for lazy recomputation. The deletion process may handle cascading deletions wherein vertex deletion automatically deletes all incident edges, edge deletion triggers reevaluation of vertex reachability, or deletion of critical elements triggers notifications to dependent components. In some embodiments, deletion may implement soft deletion wherein elements are marked as deleted but not immediately removed, enabling potential undo operations or deferred garbage collection. The element deletion substep 1424 reduces graph size to maintain bounded memory usage with, for instance, logarithmic scaling mechanisms.

Within the mutation application phase 1416, substep 1426 updates graph topology to reflect structural changes. The topology update substep 1426 rebuilds or updates data structures that efficiently represent graph connectivity and support traversal operations. According to an embodiment, the topology update 1426 rebuilds CSR/COO structures as needed by compacting accumulated mutations from COO-format journals into updated CSR representations, optimizing memory layout for efficient traversal, and updating row pointers and column indices to reflect current edge set; updates connectivity matrices by recomputing sparse adjacency matrices, updating distance matrices for frequently accessed vertex pairs, or invalidating cached connectivity information that must be recomputed on demand; recomputes neighborhood information including updating k-nearest-neighbor indices, rebuilding spatial or metric tree structures that accelerate proximity queries, and refreshing vertex degree statistics and degree distributions; and invalidates cached geometric properties including marking curvature values as stale for edges affected by topology changes, invalidating spectral decompositions requiring recomputation to reflect structural modifications, and clearing cached geodesic distances that may no longer be accurate. The topology update may employ incremental update algorithms that efficiently incorporate structural changes without full reconstruction, such as incremental eigenvector updates, dynamic shortest path maintenance, or streaming connectivity algorithms. The topology update substep 1426 ensures that graph data structures remain consistent with modified structure and optimized for subsequent operations.

Within the mutation application phase 1416, substep 1428 updates execution semantics affected by structural changes. The execution semantics update substep 1428 modifies trigger conditions, operator bindings, and regulation parameters to reflect evolved graph structure. According to an embodiment, the execution semantics update 1428 modifies trigger conditions on affected elements by updating traversal-based triggers to reflect new connectivity enabling different traversal patterns, adjusting state-change triggers if property modifications alter triggering thresholds, recomputing geometric triggers if topology changes affect curvature or pressure distributions, and updating threshold triggers if new values cross activation boundaries; updates operator bindings by associating new operators with newly created vertices or edges based on element types or creation context, modifying operator parameters for existing elements based on execution results, or removing operator bindings from deleted elements to prevent dangling references; adjusts regulation parameters including updating rate limiting counters to reflect structural changes affecting execution frequency, modifying resource allocations if topology changes alter computational requirements, adjusting inhibition conditions if structural relationships change mutual exclusion constraints, or updating priority values if element importance changes; and propagates semantic changes by notifying trigger evaluators of updated conditions requiring reevaluation, informing regulation systems of modified constraints affecting future executions, and updating caches or indices used for trigger evaluation or operator selection. The execution semantics update ensures that self-executing behavior adapts appropriately to evolved graph structure, maintaining consistency between structure and execution logic. The execution semantics update substep 1428 completes the mutation application by ensuring that not only graph structure but also graph execution behavior reflects the intended evolution.

Following completion of all mutation substeps within phase 1416, the method proceeds to step 1430 to validate transaction consistency. The transaction consistency validation step 1430 verifies that all mutations were applied successfully and that the resulting graph state is valid and consistent. According to an embodiment, the consistency validation 1430 verifies that all mutations completed successfully by checking that each CREATE operation successfully added specified vertices or edges, that each DELETE operation successfully removed targeted elements, and that each MODIFY operation successfully updated specified properties without encountering errors; checks final graph state consistency by validating invariants ensuring topological properties are preserved, verifying referential integrity confirming all edge endpoints reference existing vertices, testing consistency rules ensuring property constraints and semantic requirements are satisfied, and confirming structural constraints including memory bounds, degree limits, and cardinality restrictions remain satisfied; validates execution semantics consistency by checking that all vertices and edges have properly specified trigger conditions, verifying operator bindings reference valid operator implementations, ensuring regulation parameters are within acceptable ranges, and confirming execution semantic changes propagated correctly to all affected components; and performs sanity checks detecting obvious corruption such as orphaned edges referencing nonexistent vertices, inconsistent count statistics, or violated fundamental graph properties. The consistency validation may employ checksums or hash values comparing expected and actual graph state, reference counts verifying correct memory management, or structural comparison against pre-mutation snapshots to confirm intended changes were applied correctly. The transaction consistency validation 1430 provides final verification before committing mutations to permanent graph state.

At decision point 1432, the method determines whether the transaction is consistent. This decision point evaluates the consistency validation result from step 1430 to determine whether mutations can be committed or must be rolled back. According to an embodiment, the decision at step 1432 returns true (YES path) if all consistency checks passed, indicating that mutations were applied successfully and graph state is valid and correct. The decision returns false (NO path) if any consistency check failed, indicating that mutations produced invalid graph state requiring rollback to restore previous consistent state. The decision at step 1432 implements the fundamental transactional guarantee: mutations apply atomically and preserve consistency, or mutations are completely undone to prevent graph corruption.

When the decision at step 1432 determines that the transaction is not consistent (NO path), the method proceeds to step 1434 where the transaction will be rolled back. When the decision determines the transaction is consistent (YES path), the method also proceeds to step 1434 where the transaction will be committed. Step 1434 handles both commit and rollback cases, representing the transaction finalization phase.

At step 1434, the method commits the transaction if consistent or rolls back if inconsistent. The transaction finalization step 1434 makes mutations permanent or completely undoes them based on the consistency decision. According to an embodiment, for transaction commit when consistency was verified, the finalization 1434 makes changes permanent by marking mutations as committed in transaction logs, flushing mutation journals to persistent storage if configured for crash recovery, and updating graph version numbers to reflect new state enabling versioned access or temporal queries; releases locks on affected graph elements by releasing write locks on modified vertices and edges, releasing read locks on referenced elements, and releasing structural locks on affected graph regions, enabling concurrent access to resume; updates version and metadata by incrementing global graph version counter, recording commit timestamp and transaction identifier, and updating change logs or audit trails for compliance or debugging; and journals outcome by recording successful transaction completion, documenting applied mutations for replay or analysis, and updating performance statistics including mutation rates, transaction durations, and consistency validation times. For transaction rollback when inconsistency was detected, the finalization restores previous state by applying undo operations from transaction logs, restoring shadow copies of modified graph regions, or executing compensation operations that reverse applied mutations, returning the graph to its pre-transaction state; releases locks after rollback ensuring concurrent operations can proceed with consistent graph state; updates version and metadata by retaining previous graph version number, recording rollback event in transaction logs, and incrementing failure statistics; and journals outcome by recording transaction failure, documenting detected inconsistencies for debugging, and potentially generating alerts if rollback rates exceed acceptable thresholds. The transaction finalization 1434 ensures that graph state is always consistent, with mutations either completely applied or completely undone, never partially applied.

The method continues to FIG. 10, step 1016, wherein state changes will be propagated to trigger evaluation. This represents the handoff point where the graph mutation method of FIG. 14 integrates with the overall self-executing graph operation method of FIG. 10. The connection between these methods completes the execution cycle: triggers request execution, regulation gates execution, operators execute and generate results, mutations modify graph structure based on results, and state propagation feeds modified structure back to trigger evaluation, creating the continuous cycle of triggering, execution, and evolution that characterizes self-executing self-evolving graphs. Following state propagation in step 1016 of FIG. 10, the system returns to monitoring in step 1002, ready to detect new trigger conditions arising from the evolved graph structure.

Figure 15:
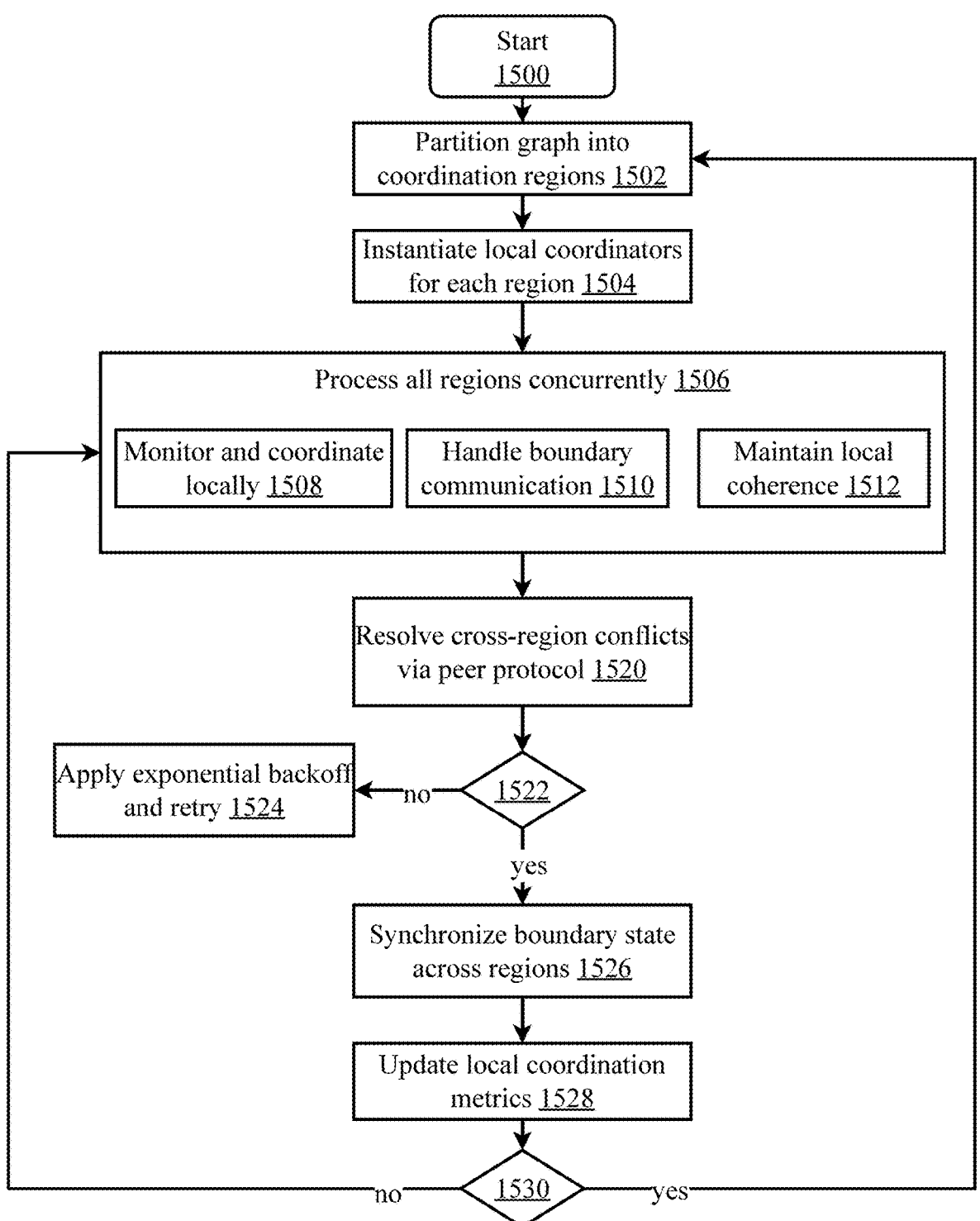
FIG. 15 is a flow diagram illustrating an exemplary method for distributed trigger coordination without centralized scheduling in self-executing graphs, according to an embodiment.

FIG. 15 is a flow diagram illustrating an exemplary method for distributed trigger coordination without centralized scheduling in self-executing graphs, according to an embodiment. The method demonstrates how multiple local coordinators operate independently and concurrently on different graph regions, coordinating through peer-to-peer communication rather than through a central scheduler or global authority.

According to the embodiment, the process begins at step 1500, which represents entry into the distributed coordination process. According to an embodiment, step 1500 is invoked during system initialization when a self-executing graph is deployed across distributed computing resources or when graph size exceeds thresholds warranting partitioned processing. The distributed coordination process implements the fundamental principle that no single coordinator possesses global execution authority, instead distributing coordination responsibilities across multiple independent local coordinators that collectively maintain system coherence through peer communication rather than hierarchical control. In various embodiments, the distributed coordination process may be invoked for greenfield deployment wherein a new graph is initially partitioned and distributed, for scale-out wherein an existing single-region graph is divided to support growth, or for rebalancing wherein coordinator assignments are adjusted to maintain performance as graph structure evolves. The distributed coordination establishes the architectural foundation ensuring that self-executing graphs operate without centralized scheduling bottlenecks that would limit scalability or create single points of failure.

At step 1502, the method partitions the graph into coordination regions. The graph partitioning step 1502 divides the dynamic property graph $G=(V, E, A)$ into multiple subgraphs that can be processed independently by separate coordinators. According to an embodiment, the partitioning step 1502 divides vertex set V into disjoint subsets $V^1$, $V^2, \ldots, V^n$, ensuring each vertex belongs to exactly one region; assigns edges to regions based on endpoint vertices, with intra-region edges where both endpoints belong to the same region assigned to that region, and cross-region edges where endpoints belong to different regions tracked as boundary edges requiring special coordination; determines region assignments to minimize cross-region edges through graph partitioning algorithms such as multilevel k-way partitioning, spectral partitioning, or streaming partitioning for dynamic graphs, optimizing for reduced inter-region communication overhead; and balances computational load across regions by distributing vertices such that expected execution frequencies, computational costs, or resource requirements are approximately equal across regions, preventing load imbalance that would create coordination bottlenecks. The partitioning produces region definitions where n represents the number of regions, typically determined by available computational resources, graph size, or target region size constraints.

In some embodiments, the partitioning step 1502 employs domain-specific knowledge to improve partition quality, such as co-locating vertices representing related entities that frequently interact, preserving temporal locality by grouping vertices representing sequential events, or maintaining semantic coherence by keeping thematically related vertices together. The partitioning may incorporate dynamic graph characteristics, analyzing historical execution patterns to predict future interaction frequencies and partition based on expected coordination overhead rather than static topology alone. The partitioning strategy may adapt over time through repartitioning triggered by monitoring in step 1528, enabling the system to maintain efficient partitions as graph structure and execution patterns evolve. The graph partitioning step 1502 establishes the spatial distribution of coordination responsibility, determining which regions each local coordinator will manage.

At step 1504, the method instantiates local coordinators for each region. The coordinator instantiation step 1504 creates independent coordination entities responsible for managing execution within their assigned graph regions. According to an embodiment, the coordinator instantiation 1504 creates coordinator instances for each region with each coordinator comprising trigger evaluation logic implementing the parallel trigger evaluation of FIG. 11 for elements within its region, local execution scheduling determining when triggered operations execute within the region, and conflict resolution mechanisms handling execution conflicts among elements in the same region; assigns computational resources to coordinators including processor cores or threads allocated for coordinator operation, memory regions for maintaining coordinator state and region-specific data structures, and communication channels enabling peer-to-peer messaging between coordinators; initializes coordinator state including region topology loading adjacency structures for vertices and edges in the assigned region, boundary identification cataloging cross-region edges requiring inter-coordinator communication, and execution state initialization setting up trigger counters, regulation tracking, and scheduling queues; and establishes peer relationships by identifying adjacent coordinators managing neighboring regions sharing cross-region edges, configuring communication channels to adjacent coordinators for boundary synchronization, and initializing consensus protocols for cross-region conflict resolution. The coordinator instantiation creates the distributed coordination infrastructure without any centralized coordination entity possessing global authority over execution decisions.

The coordinator instantiation step 1504 does not create or designate a central scheduler, master coordinator, or global execution authority. Each coordinator operates autonomously within its region, making local execution decisions based on local triggers, local regulation constraints, and peer communication with adjacent coordinators, but never consulting or deferring to a central authority that determines global execution schedules. This architectural absence of centralized control distinguishes the present system from distributed systems employing master-worker architectures, hierarchical schedulers, or centralized coordinators that aggregate local information and issue global execution commands. The coordinators may be heterogeneous, with different regions potentially using different coordination strategies, trigger priorities, or regulation policies tailored to regional characteristics, further emphasizing the distributed rather than centralized nature of coordination. The coordinator instantiation step 1504 completes the establishment of distributed coordination infrastructure, preparing the system for concurrent region processing.

At step 1506, the method processes all regions concurrently without central coordination. Step 1506 represents the parallel execution phase wherein multiple local coordinators operate simultaneously and independently on their assigned graph regions. According to an embodiment, step 1506 encompasses a set of coordination activities that execute in parallel across all regions, with each coordinator performing the same coordination functions on its region but making decisions autonomously without centralized direction. The parallel processing nature of step 1506 is emphasized through the blue border surrounding the parallel region processing container in FIG. 15, visually distinguishing this concurrent multi-coordinator operation from sequential processing steps. The step illustrates three representative regions (Region 1, Region 2, Region N) executing the same coordination substeps simultaneously, demonstrating that the coordination logic is replicated across regions rather than centralized in a single coordinator. The parallel execution ensures that coordination overhead does not scale linearly with graph size, as increasing the number of regions proportionally increases available coordination capacity, maintaining bounded coordination latency regardless of total graph size.

Within the parallel processing phase 1506, each region executes three primary coordination substeps that implement local autonomous coordination. These substeps execute independently for each region, with Region 1 executing substeps 1508, 1510, 1512 on graph region $G^1$, Region 2 executing the same substeps on $G^2$, and Region N executing the same substeps on $G^n$, all concurrently without synchronization or central coordination during local processing.

Within each region's processing, substep 1508 monitors and coordinates locally. The local monitoring and coordination substep 1508 performs trigger evaluation and execution scheduling for elements within the region without consulting coordinators of other regions. According to an embodiment, the local monitoring and coordination 1508 evaluates triggers for elements in the region by applying the trigger evaluation method of FIG. 11 to vertices and edges within the region's vertex set and edge set, checking traversal-based triggers for graph navigation within the region, state-change triggers for property modifications of regional elements, geometric triggers based on curvature and pressure computed over regional topology, threshold triggers on regional property values, and stochastic triggers with region-local randomization; schedules executions within the region by applying regulation checks to execution requests originating from regional triggers, determining execution timing and ordering for operations on regional elements, and managing execution queues and priorities for the region; and makes all decisions locally without querying other regions or consulting a central authority, operating autonomously based on regional state, local triggers, and local regulation constraints. The local monitoring ensures that execution decisions for graph elements are made by the coordinator responsible for those elements, distributing decision-making authority across coordinators rather than concentrating it centrally.

The local monitoring and coordination substep 1508 operates with complete autonomy over its region during normal processing. The coordinator does not request permission from other coordinators or from any central authority to evaluate triggers or schedule executions on elements it manages. This autonomous operation enables high-throughput coordination, as coordinators do not incur communication latency or synchronization overhead for typical trigger evaluation and execution scheduling operations that affect only local graph elements. The coordination scales horizontally: as additional regions are added with their own coordinators, the total system coordination capacity increases proportionally, avoiding the coordination bottleneck that would arise if all execution decisions required consultation with a central scheduler. The local monitoring and coordination substep 1508 implements the core distributed coordination principle that execution authority is distributed across regions rather than centralized.

Within each region's processing, substep 1510 handles boundary communication. The boundary communication handling substep 1510 manages interactions with adjacent regions through peer-to-peer messaging without routing communication through a central mediator. According to an embodiment, the boundary communication handling 1510 detects cross-region interactions by identifying execution events affecting cross-region edges where one endpoint is in the local region and the other endpoint is in an adjacent region, recognizing state changes in boundary vertices that may affect triggers or executions in adjacent regions, and monitoring mutations creating or deleting cross-region edges requiring notification to adjacent coordinators; sends peer-to-peer notifications by transmitting messages directly to adjacent coordinators informing them of relevant boundary events, providing state updates for shared boundary elements, and requesting coordination for operations affecting multiple regions; receives notifications from adjacent coordinators by accepting direct messages from peer coordinators managing neighboring regions, processing state updates for boundary elements visible from the local region, and responding to coordination requests from adjacent regions; and synchronizes boundary state by ensuring cross-region edges have consistent property values across regions, maintaining coherent views of boundary vertices accessible from multiple regions, and propagating mutations affecting boundary elements to all regions with visibility. The boundary communication enables coordination across region boundaries while maintaining peer-to-peer rather than centralized communication patterns.

The boundary communication handling substep 1510 implements direct peer-to-peer messaging between coordinators rather than routing all inter-region communication through a central message broker or coordination hub. When coordinator needs to communicate with coordinator regarding a boundary event, it sends messages directly to without intermediate routing through a centralized entity. This peer-to-peer communication pattern ensures that inter-region coordination overhead remains proportional to the number of boundary edges rather than scaling with total graph size or total region count. The direct communication also provides fault tolerance: failure of one coordinator affects only its immediate neighbors rather than disrupting global coordination, and the absence of a central communication hub eliminates a single point of failure that would render the entire system inoperable. The boundary communication handling substep 1510 enables coordination across regions while preserving the distributed, non-centralized architecture.

Within each region's processing, substep 1512 maintains local coherence. The local coherence maintenance substep 1512 ensures that the graph region remains in a consistent state without requiring global consistency checks across all regions. According to an embodiment, the local coherence maintenance 1512 ensures regional consistency by validating that vertices and edges within the region satisfy invariants and constraints, verifying that executions have updated regional state consistently, and confirming that mutations have maintained regional topology and property integrity; operates independently without global consistency checks by making coherence determinations based solely on regional state and boundary information received from adjacent coordinators, avoiding the need for distributed transactions or global locks spanning multiple regions, and eliminating coordination overhead that would arise from requiring all regions to participate in consistency validation; maintains eventual consistency at boundaries by accepting that boundary state may temporarily diverge across regions due to message delays, converging to consistent boundary state through continued peer communication, and tolerating temporary inconsistencies that do not violate safety or correctness requirements; and performs local recovery by detecting and correcting inconsistencies within the region, requesting resynchronization from adjacent regions when boundary state diverges unacceptably, and avoiding propagation of inconsistencies to other regions. The local coherence maintenance enables each region to ensure its own consistency without requiring global coordination that would create synchronization bottlenecks.

The local coherence maintenance substep 1512 implements a crucial aspect of distributed coordination: coherence is maintained through local actions and peer communication rather than through global consensus or centralized validation. Each coordinator is responsible for ensuring its own region's consistency, relying on eventual consistency guarantees at region boundaries rather than requiring all regions to maintain strict mutual consistency at all times. This eventual consistency model enables high availability and partition tolerance, allowing coordinators to continue operating even when temporarily unable to communicate with some peers, and prevents coordination failures in one region from blocking coherence maintenance in other regions. The acceptance of eventual consistency represents a deliberate architectural tradeoff prioritizing availability and scalability over strict consistency, appropriate for self-executing graphs where temporary boundary inconsistencies are tolerable and self-correct through continued communication. The local coherence maintenance substep 1512 completes the local region processing, having maintained regional consistency through distributed rather than centralized mechanisms.

Following the parallel execution of substeps 1508-1512 across all regions within the concurrent processing phase 1506, the method proceeds to step 1520 to resolve cross-region conflicts. The cross-region conflict resolution step 1520 addresses situations where operations in different regions create conflicts requiring coordination to resolve. According to an embodiment, the conflict resolution 1520 identifies conflicts including concurrent modifications where multiple regions attempt to modify shared boundary elements simultaneously, potentially creating inconsistent state; ordering conflicts where execution order in different regions affects global system behavior, requiring agreement on sequencing; and resource conflicts where operations in different regions compete for limited shared resources. The conflicts are resolved via peer protocol without central arbiter, using distributed consensus mechanisms such as timestamp ordering where operations are ordered by logical timestamps assigned by local coordinators, with conflicts resolved in favor of operations with earlier timestamps; quorum voting where coordinators managing regions affected by a conflict vote on resolution, with majority vote determining outcome; priority-based resolution where operations from higher-priority regions or higher-priority graph elements take precedence; or two-phase commit protocols where coordinators agree to commit or abort conflicting operations collectively. The peer protocols ensure conflict resolution occurs through peer negotiation without appealing to a central authority that would decide resolution unilaterally.

The cross-region conflict resolution step 1520 demonstrates that even when coordination across regions is required, the system employs peer-to-peer distributed consensus rather than centralized arbitration. No single coordinator or central scheduler determines conflict resolution outcomes; instead, coordinators participate as peers in consensus protocols that collectively determine resolution through voting, timestamp comparison, or other distributed agreement mechanisms. This peer-based conflict resolution maintains the distributed coordination architecture even for operations requiring multi-region coordination. In some embodiments, conflict resolution may be optimized by designating one coordinator involved in the conflict as a temporary leader for that specific conflict resolution instance, but this leadership is transient, specific to one conflict, and does not represent permanent centralized authority. The temporary leader coordinates the consensus protocol but cannot unilaterally impose resolution without peer agreement. The conflict resolution step 1520 enables coordination across region boundaries while preserving the absence of permanent centralized scheduling authority.

At decision point 1522, the method determines whether cross-region conflicts were successfully resolved. This decision point evaluates the outcome of the distributed consensus protocols employed in step 1520 to determine whether coordinators reached agreement. According to an embodiment, the decision at step 1522 returns true (YES path) if all coordinators involved in conflict resolution reached consensus on resolution, if distributed consensus protocols converged to agreed outcomes, and if boundary state was successfully synchronized to reflect resolution decisions. The decision returns false (NO path) if consensus failed because coordinators proposed incompatible resolutions, if quorum could not be achieved due to coordinator failures or communication issues, if timestamp ordering produced circular dependencies preventing resolution, or if timeout periods elapsed before consensus was reached. The decision at step 1522 determines whether conflict resolution succeeded through peer coordination or whether retry with backoff is necessary.

When the decision at step 1522 determines that conflicts were not resolved (NO path), the method proceeds to step 1524 to apply exponential backoff and retry. The backoff and retry step 1524 implements conflict resolution resilience through delayed retransmission preventing coordination livelock. According to an embodiment, the backoff and retry 1524 applies exponential backoff by delaying retry attempts with exponentially increasing intervals, starting with initial delays of milliseconds and potentially extending to seconds for repeatedly failing conflicts; introduces randomized delays by adding random jitter to backoff intervals, preventing synchronized retry attempts from multiple coordinators that would recreate conflict conditions; and limits retry attempts by capping the number of retries or total retry duration, eventually escalating unresolvable conflicts to higher-level intervention such as manual resolution, region repartitioning, or conflict abandonment. Following backoff delay, the method returns to step 1520 to retry conflict resolution with updated timing, potentially allowing transient communication issues to resolve or enabling one coordinator to defer to another due to randomized timing differences. The backoff and retry mechanism ensures that temporary coordination failures do not permanently deadlock the system while avoiding livelock from continuous fruitless retry attempts.

When the decision at step 1522 determines that conflicts were successfully resolved (YES path), the method proceeds to step 1526 to synchronize boundary state across regions. The boundary state synchronization step 1526 propagates conflict resolution outcomes to ensure all affected regions maintain consistent views of boundary elements. According to an embodiment, the boundary state synchronization 1526 updates shared edge states by propagating resolved edge property values to all regions with visibility to the edge, ensuring cross-region edges have consistent weights, attributes, and metadata across regions; synchronizes boundary vertex properties by updating vertex properties for vertices visible from multiple regions, maintaining coherent attribute values for boundary elements; propagates structural changes by communicating edge creations or deletions affecting multiple regions, ensuring topology modifications are reflected consistently across region boundaries; and maintains eventual consistency by accepting that propagation may take finite time, converging to consistent boundary state through continued message exchange, and tolerating brief inconsistency windows during propagation. The boundary synchronization ensures that conflict resolution outcomes are reflected consistently across the distributed graph structure.

At step 1528, the method updates local coordination metrics. The coordination metrics update step 1528 tracks performance and overhead of distributed coordination to enable adaptive optimization. According to an embodiment, the metrics update 1528 tracks coordination overhead by measuring communication volume between regions, counting cross-region conflict frequency, and timing conflict resolution latency; monitors conflict rates by identifying regions or boundary patterns experiencing frequent conflicts, detecting coordination hotspots indicating suboptimal partitioning, and recognizing conflict trends suggesting evolving interaction patterns; evaluates partition quality by comparing actual inter-region communication against theoretical minimum, assessing load balance across coordinators, and identifying regions that are too large or too small for efficient coordination; and adapts partitioning if needed by triggering repartitioning when metrics indicate degraded coordination efficiency, suggesting partition modifications to reduce conflict rates or balance load, and scheduling repartitioning during low-activity periods to minimize disruption. The metrics tracking enables the system to adapt its coordination structure over time, maintaining efficient distributed coordination as graph structure and execution patterns evolve.

At decision point 1530, the method determines whether repartitioning is needed based on coordination metrics. This decision point evaluates the metrics updated in step 1528 to determine whether the current graph partitioning should be modified. According to an embodiment, the decision at step

1530 returns true (YES path) if coordination overhead exceeds acceptable thresholds indicating excessive inter-region communication, if conflict rates suggest that frequently interacting elements are partitioned across regions, if load imbalance shows some coordinators are overloaded while others are underutilized, or if partition quality metrics indicate substantially suboptimal partitioning compared to achievable alternatives. The decision returns false (NO path) if coordination efficiency remains acceptable, if partition quality is near-optimal, or if recent repartitioning has not yet stabilized sufficiently to warrant another repartitioning. The decision at step 1530 determines whether adaptive repartitioning should occur to maintain coordination efficiency.

When the decision at step 1530 determines that repartitioning is needed (YES path), the method returns to step 1502 to partition the graph adaptively with updated partition strategies. This adaptive repartitioning path implements self-optimization of the distributed coordination structure, enabling the system to adjust region boundaries, coordinator assignments, and load distribution based on observed execution patterns rather than relying on static initial partitioning. The repartitioning may employ online graph partitioning algorithms that incrementally adjust partitions while the system continues operating, minimizing disruption from repartitioning by migrating graph elements gradually, or may employ periodic full repartitioning during maintenance windows when disruption is acceptable. The adaptive repartitioning capability demonstrates that the distributed coordination architecture is not only non-centralized but also self-optimizing, maintaining efficient coordination structure autonomously without requiring external partition management.

When the decision at step 1530 determines that repartitioning is not needed (NO path), the method proceeds to continue the distributed coordination loop. This represents continuation of the ongoing distributed coordination process, returning to the parallel region processing step 1506 to continue concurrent local coordination across all regions. The continuous coordination loop implements the perpetual distributed coordination that maintains system coherence throughout operation. The method returns to step 1506, completing the cycle and establishing continuous distributed coordination wherein local coordinators repeatedly evaluate triggers, schedule executions, handle boundary communication, resolve conflicts, and synchronize state, all without centralized scheduling authority. The continuous loop ensures that distributed coordination is not a one-time initialization but an ongoing process maintaining system coherence as graph structure evolves, execution patterns change, and regions adapt.

FIG. 1 is a block diagram illustrating an exemplary system architecture of a manifold engine for executing a self-evolving property graph on GPU, according to an embodiment. The system architecture 100 comprises multiple interconnected components that collectively realize geometric cognition through continuous execution of GPU-accelerated operators on a dynamic property graph structure.

The system 100 receives input from various sources including, but not limited to: event streams 102 and communication streams 104. Event streams 102 comprise temporal sequences of events $e_i(t)$ that may originate from sensors, user actions, environmental occurrences, or other edge processes. Communication streams 104 comprise temporal sequences of communications $c_{ij}(t)$ representing dialog, rationale, coordination signals, or other information exchanges between processes, roles, or users. These input streams 102, 104 are combined into a structured ensemble

106 represented as $E(t)=\{e_i(t), c_{ij}(t)\}$, which provides a unified representation of experiential input data.

The structured ensemble 106 is processed by a projection operator 108, denoted as $\Phi$, which maps the external input data into a graph-based representation suitable for geometric processing. The projection operator 108 performs embedding and transformation operations to convert the raw input streams into vertices and edges of a property graph, maintaining temporal ordering and relational structure. In exemplary implementations, projection operator 108 employs pre-trained neural network encoders to generate d-dimensional embeddings, where d typically ranges from 256 to 2048 dimensions. For textual communications, the operator 108 may utilize transformer-based language models with mean pooling over token embeddings. For structured events, domain-specific encoders may map event attributes to fixed-dimensional vectors. The projection process implements the two-stage approach described herein: first identifying candidate vertices through approximate nearest neighbor search, then solving a regularized least-squares problem to determine optimal vertex assignments and edge weights.

The output of the projection operator 108 is stored in a dynamic property graph 110, represented as G=(V, E, A), which resides in GPU memory 112. Dynamic property graph 110 comprises vertices V partitioned into event vertices $V_e$ and communication vertices $V_c$, edges E representing relationships and temporal orderings, and property vectors A assigned to both vertices and edges. The graph data can be using a combination of Compressed Sparse Row (CSR) format for efficient traversal and Coordinate (COO) format for dynamic updates, as indicated in the graph structure.

A plurality of GPU operator kernels operate on dynamic property graph 110 to implement the geometric cognitive processes. These operators include, but are not necessarily limited to: a diffusion operator 120 ($D_t$) that propagates information along graph edges using sparse matrix-vector operations, a geodesic operator 121 (G) that computes minimal path lengths between vertices, a spectral operator 122 ($S_k$) that performs eigen-decomposition to reveal global structure, a curvature operator 123 ($\kappa$) that quantifies local geometric properties and compression pressure, a projection operator 124 (P) for mapping external embeddings into the manifold, a recombination operator 125 (R) for generating new trajectories through interpolation, and a routing operator 126 (T) for query-driven trajectory selection.

The execution of these operators 120-126 is controlled by a CUDA graph controller 130, which comprises a DAG Pipeline 132 ($\Pi$) that captures operator sequences as directed acyclic graphs and a stream scheduler 134 that manages concurrent execution across multiple CUDA streams. The CUDA graph controller 130 may be configured to implement self-executing behavior by repeatedly replaying the operator pipelines without external orchestration, thereby enabling continuous evolution of the cognitive manifold.

An action density sampler 140 monitors the density of geometric actions $\rho_g$ arising from the input streams and provides this information to CUDA graph controller 130. The action density $\rho_g$ influences the scheduling of operator execution, with higher densities accelerating condensation processes according to the relationship $\tau_c \sim 1/\log(1+\rho_g)$, where $\tau_c$ represents the stabilization time constant. In exemplary implementations, action density sampler 140 maintains exponentially weighted moving averages of event and communication rates over configurable time windows, (e.g., from 100 ms to 10 s). The sampler computes $\rho_g$ using weighting parameters $\lambda_e$ and $\lambda_c$ that may be dynamically adjusted based on manifold stability metrics. For instance, default values of $\lambda_e=1.0$ and $\lambda_c=2.0$ reflect the higher geometric impact of communications. Sampler 140 periodically (e.g., at 10-100 Hz frequency) updates the density estimate and provides both instantaneous and smoothed estimates to controller 130 for adaptive pipeline scheduling.

System 100 further comprises a hierarchical arrangement of cognitive manifolds 150, 152, 154. The fast manifold $M_1$ 150 encodes event-level dynamics with high temporal resolution. The mesoscale manifold $M_2$ 152 integrates events into decision trajectories operating at intermediate timescales. The foundational manifold $M_3$ 154 maintains long-term identity, values, and reasoning style with slow evolution. These manifolds are coupled through submersion mappings $\varphi_{12}$ and $\varphi_{23}$ that abstract information upward, and immersion mappings $\psi_{32}$ and $\psi_{21}$ that inject constraints downward, as indicated by the bidirectional connections between the manifolds.

System 100 can be configured to produce cognitive output 160 in the form of experiential trajectories $\gamma(t)$, which represent coherent paths through the cognitive manifold that encode meaningful sequences of events and decisions. In exemplary implementations, cognitive output 160 is generated through a multi-stage extraction process. First, the routing operator 126 identifies high-fitness trajectories using a scoring function (e.g., $\sigma(\gamma,q)$) that combines two or more of (but not limited to) proximity, novelty, recency, and trust metrics. Selected trajectories are then serialized into standardized formats such as JSON or Protocol Buffers, containing vertex sequences, edge weights, timestamps, and associated metadata. The output interface supports both streaming and batch modes, with streaming mode emitting trajectory segments as they stabilize (e.g., every 100-1000 ms) and batch mode providing complete trajectories upon request. Output trajectories may be filtered by minimum fitness thresholds, temporal ranges, or semantic queries, enabling integration with downstream reasoning systems or user interfaces. A continuous replay feedback path, shown as a dashed line, enables the output trajectories to influence subsequent processing cycles, implementing the self-executing nature of the architecture.

Through this architecture, manifold engine system 100 enables logarithmic memory growth $M(n) \sim \log n$ and intrinsic stabilization properties that emerge from the geometric operators rather than being imposed through external control mechanisms. The continuous execution model eliminates the distinction between training and inference phases characteristic of conventional neural network architectures, instead maintaining a living computational substrate that evolves under the continuous flow of experiential input.

FIG. 2 illustrates an exemplary operator-to-kernel mapping table 200 showing the correspondence between theoretical geometric operators and their GPU kernel implementations, according to an embodiment. The table 200 provides a systematic mapping that enables the abstract mathematical functionals of geometric cognition to be realized as executable computational kernels on parallel graphics processing hardware.

Table 200 is organized into four primary columns: an operator identification column showing the operator name and mathematical symbol, a mathematical definition column providing the formal specification of each operator, a GPU kernel implementation column detailing the computational algorithms and function interfaces, and a complexity column specifying the asymptotic computational and memory requirements.

The diffusion operator 202 implements heat kernel propagation $D_t f=e^{-tL}f$, where L=D−A represents the graph Laplacian with D being the degree matrix and A the adjacency matrix. The GPU kernel implementation may employ sparse matrix-vector (SpMV) operations combined with Krylov subspace approximation through the function interface diffuse$_{spmv}$(L, f, t, k, s). This implementation constructs the Krylov subspace $K_k(f)=\text{span}\{f, Lf, \ldots, L^{k-1}f\}$ and projects the solution to approximate $e^{-tL}f$ without explicitly forming the matrix exponential. The computational complexity is $O(k\cdot\text{nnz}(L))$ with memory traffic of $\Theta(k(m+n))$, where k represents the Krylov subspace dimension, nnz(L) denotes the number of non-zero entries in the Laplacian, m is the edge count, and n is the vertex count.

The geodesic operator 204 computes shortest paths G(u,v) where γ represents a path from vertex u to vertex v and L(γ) denotes the path length. The implementation utilizes a Δ-stepping single-source shortest path (SSSP) algorithm through the kernel function sssp$_{delta}$(A, w, S, s), where A is the adjacency structure, w contains edge weights, S specifies source vertices, and s denotes the CUDA stream handle. The algorithm employs bucketed frontiers to separate light and heavy edges for parallel processing, with warp-aggregated atomic operations reducing memory contention. The complexity is $O(|E|+|V| \log W)$, where W represents the weight spread across edges.

The spectral operator 206 performs eigen-decomposition to extract global manifold structure through the projection $S_k f$ where $\{\varphi_i\}$ are the eigenvectors corresponding to the k smallest eigenvalues of the Laplacian satisfying $L\varphi_i=\lambda_i \varphi_i$. The GPU implementation employs the Lanczos algorithm with selective reorthogonalization via the kernel interface lanczos$_{topk}$(L, k, ε, s), where ε specifies the convergence tolerance. The implementation utilizes mixed precision arithmetic, with TF32 or FP32 for general computations and FP64 for critical operations such as Ritz value extraction. Warm-start capabilities enable reuse of previous Ritz vectors when the graph undergoes incremental updates. The computational complexity is $O(km+k^2n)$ including reorthogonalization costs.

The curvature operator 208 quantifies local geometric properties through two complementary measures. Forman curvature $\kappa_F(e)$ provides computationally efficient edge-local estimates through parallel reductions over two-hop neighborhoods. Ollivier-Ricci curvature κ(u,v) employs optimal transport to measure the contraction of probability measures $\mu_u$ and $\mu_v$ supported on vertex neighborhoods, where $W_1$ denotes the 1-Wasserstein distance. The GPU implementation uses batched entropic optimal transport solved via Sinkhorn iteration through the kernel sinkhorn$_{batch}$($\{C_b\}$, ε, τ, I, s), where $C_b$ represents batched cost matrices, τ is the convergence threshold, and I limits iterations. The implementation employs log-domain arithmetic to prevent numerical underflow. Complexity is O(m) for Forman curvature and $O(Bd^2I)$ for batched Sinkhorn computation, where B is the batch size and d is the neighborhood size.

The projection operator 210 maps external embeddings into the manifold through P(x) where φ(v) represents the vertex embedding and R(v) encodes structural regularization. According to an embodiment, a two-stage GPU implementation first employs approximate nearest neighbor (ANN) search using either IVF-PQ or graph-based indices to identify candidate vertices, then solves a constrained least-squares problem via batched projected conjugate gradient or L-BFGS methods. The optimization enforces simplex constraints $\alpha\geq0$ and $1^T\alpha=1$ on the convex combination weights. Computational complexity is $O(n^\alpha)$ for the ANN stage where α<1 is the approximation factor, plus $O(|C|^3)$ for the least-squares solution over the candidate set C.

The recombination operator 212 generates novel trajectories through geodesic interpolation $R(\gamma_1,\gamma_2)$, implementing the cognitive dreaming process. The GPU kernel performs batched interpolation on trajectory embeddings using the formula $z_\alpha=\exp_{z_1}(\alpha \log_{z_1}(z_2))+\xi$, where $\alpha\in[0,1]$ controls interpolation and ε represents stochastic perturbation. Back-projection to feasible graph paths employs local SSSP computation, while fitness evaluation F[γ] utilizes parallel reduction operations. The complexity is $O(B|\gamma|)$ where B denotes the batch size and $|\gamma|$ represents trajectory length.

The routing operator 214 identifies optimal trajectories for queries through T(q) where σ represents a composite scoring function incorporating proximity, novelty, recency, and trust metrics. The three-stage implementation begins with ANN prefiltering to identify candidates, performs k-radius geodesic expansion to explore local manifold structure, and applies a fused scoring kernel using scatter-gather patterns to minimize memory traffic. Complexity is $O(n^\alpha+k|E'|)$ where E' represents edges in the local expansion neighborhood.

According to table 200: n=|V| represents vertex count, m=|E| represents edge count, k denotes eigenpairs or iteration counts, nnz indicates non-zero entries, B specifies batch sizes, d represents neighborhood dimensions, W denotes weight spread, I indicates iteration limits, s represents CUDA stream handles, ε (or E) specifies convergence tolerances, and α (or a) represents ANN approximation factors.

Through this systematic operator-to-kernel mapping, the Manifold Engine transforms abstract geometric functionals into concrete GPU computations with well-characterized performance bounds, enabling practical implementation of theoretical cognitive geometry on modern parallel hardware architectures. Each kernel interface is designed to maximize hardware utilization while maintaining numerical stability and supporting the continuous execution model fundamental to the self-executing graph architecture.

Figure 3:
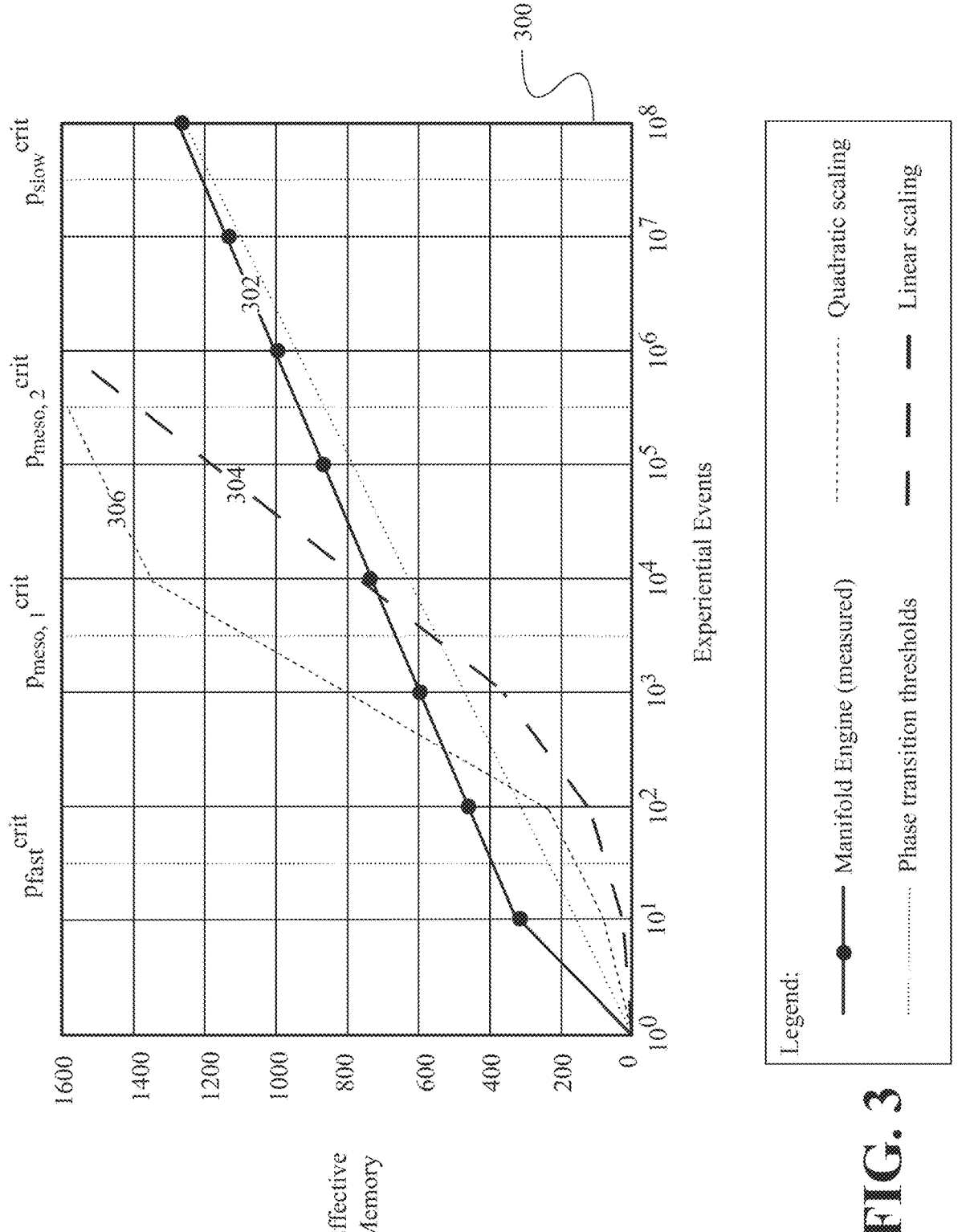
FIG. 3 illustrates an exemplary graph of logarithmic memory scaling curves demonstrating the fundamental scaling advantage of the Manifold Engine compared to conventional cognitive architectures.

FIG. 3 illustrates an exemplary graph of logarithmic memory scaling curves 300 demonstrating the fundamental scaling advantage of the Manifold Engine compared to conventional cognitive architectures. The graph 300 presents empirical measurements and theoretical comparisons on a semi-logarithmic scale, with experiential events n plotted logarithmically along the horizontal axis from $10^0$ to $10^8$, and effective memory M(n) plotted linearly along the vertical axis from 0 to 1600 memory units.

The primary scaling curve 302 represents measured performance of the Manifold Engine, exhibiting logarithmic growth characterized by the relationship M(n)~log n. Data points along this curve 302 are marked with solid circles at logarithmic intervals, showing empirical measurements obtained from system execution with increasing experiential volumes. The curve 302 demonstrates that as experiential events increase by orders of magnitude from $10^1$ to $10^8$, the effective memory requirement increases only linearly from approximately 10 to 900 units, confirming the logarithmic scaling law derived herein.

A linear scaling comparison curve 304 illustrates the memory growth pattern O(n) characteristic of traditional storage systems that maintain proportional memory allocation for each experiential input. This curve 304, rendered with a long-dash pattern, shows catastrophic memory exhaustion as it approaches system limits at approximately $10^6$ events, where the curve intersects the upper boundary of available memory. Beyond this point, such systems become computationally intractable without external memory management or data discarding strategies.

A quadratic scaling comparison curve 306 demonstrates the $O(n^2)$ memory growth typical of multi-agent systems (MAS) where coordination overhead scales with the square of participant interactions. This curve 306, shown with a short-dash pattern, exhibits even more rapid memory exhaustion, reaching system limits at approximately $10^4$ events. This quadratic growth represents the fundamental limitation that prevents multi-agent architectures from scaling to large experiential volumes despite their initial promise for distributed cognition.

The graph 300 includes four vertical phase transition markers rendered as very small, dashed lines, indicating critical density thresholds where the Manifold Engine undergoes qualitative behavioral transitions. The first transition $\rho_{fast}^{crit}$ occurs at approximately $10\hat{}1.5$ events, marking the shift from noise-dominated behavior to coherent flows on fast manifolds. The second transition $\rho_{meso}, 1^{crit}$ at approximately $10\hat{}3.5$ events indicates the emergence of tactical coherence on mesoscale manifolds. The third transition $\rho_{meso}, 2^{crit}$ at approximately $10\hat{}5.5$ events represents the onset of generative imagination through recombination processes. The fourth transition $\rho_{slow}^{crit}$ at approximately $10\hat{}7.5$ events marks the formation of stable doctrinal attractors on foundational manifolds.

As shown, the graph represents the fitted scaling relationship $M(n)=\alpha \log(n)+\beta$, where empirical fitting yields $\alpha \approx 173.3$ as the logarithmic slope coefficient and $\beta \approx 0$ as the intercept. This quantitative relationship enables precise prediction of memory requirements for arbitrary experiential volumes and confirms the theoretical derivation that the marginal memory contribution $dM/dn \sim 1/n$ decreases inversely with accumulated experience.

The logarithmic scaling behavior 302 emerges from the Manifold Engine's compression mechanisms described herein, wherein curvature-driven operators continuously identify and consolidate redundant experiential trajectories. As experiential volume increases, the probability of encountering genuinely novel patterns decreases as $Pr(\text{novel at step } n) \sim 1/n$, causing each additional input to contribute progressively less to the manifold's effective size. This stands in fundamental contrast to architectures that treat each input independently, resulting in linear growth 304, or those that maintain pairwise relationships, yielding quadratic growth 306.

The phase transitions marked on the graph 300 correspond to the critical densities predicted by the operator calculus disclosed herein, where increasing experiential density drives the system through distinct cognitive regimes. These transitions are not artifacts of parameter tuning but emerge naturally from the mathematical structure of the operator algebra, as proven in the theoretical sections of the specification. The logarithmic spacing of these transitions further emphasizes how the Manifold Engine maintains consistent behavior across exponentially increasing scales of operation.

The comparison between curves 302, 304, and 306 demonstrates that only the Manifold Engine's logarithmic scaling enables sustainable cognitive processing at scale. While traditional systems 304 and multi-agent systems 306 encounter hard computational limits that prevent scaling beyond $10^6$ and $10^4$ events respectively, the Manifold Engine 302 maintains tractable memory requirements even at $10^8$ events and beyond. This fundamental scaling advantage, combined with the intrinsic stabilization time $\tau_c \sim 1/\log(1+\mu_g)$ that accelerates with experiential density, establishes the Manifold Engine as a cognitive architecture capable of unbounded experiential accumulation without performance degradation.

Figure 4:
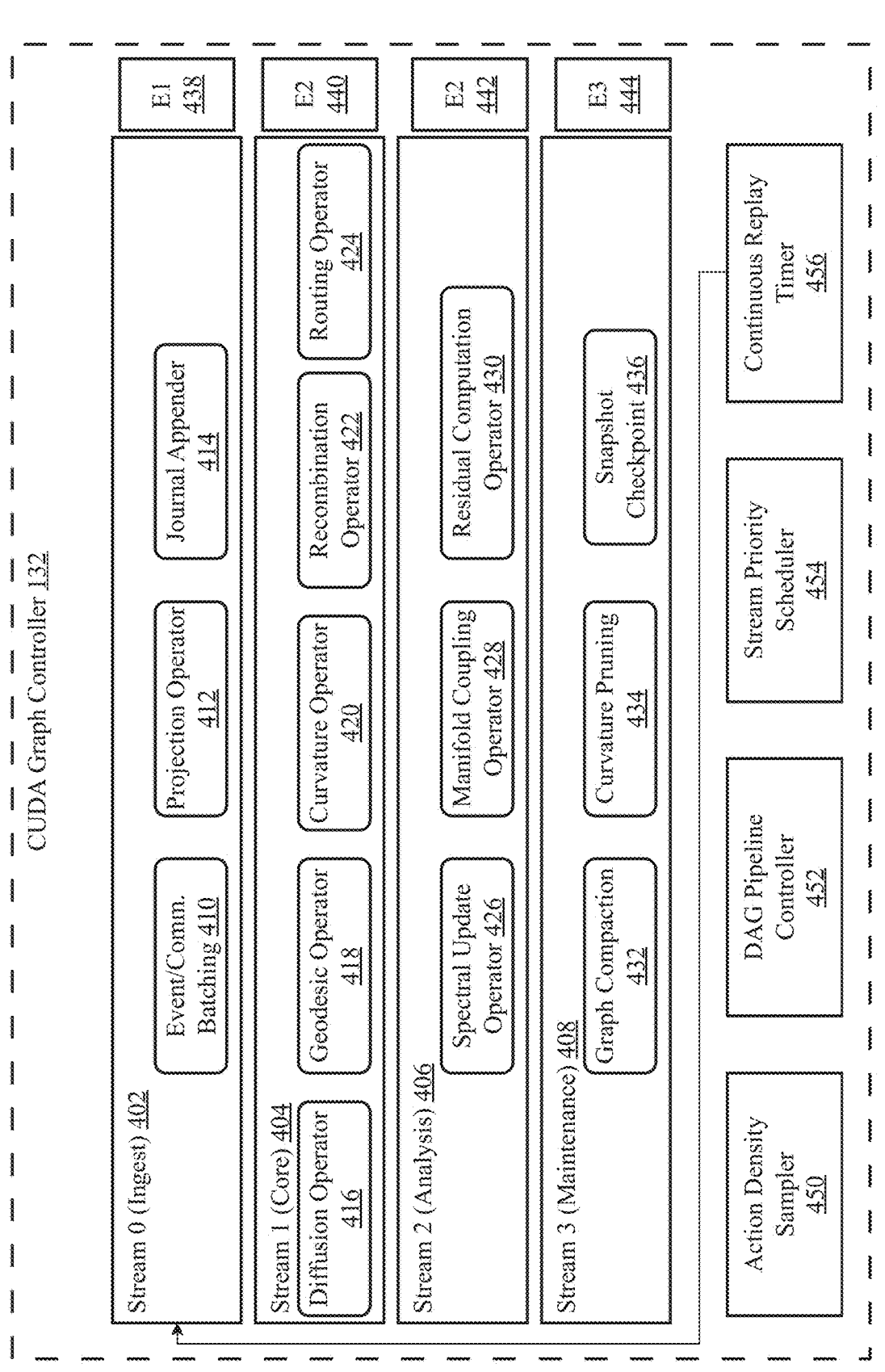
FIG. 4 is a block diagram illustrating an exemplary CUDA Graph orchestration loop that implements the self-executing behavior of the Manifold Engine through coordinated parallel execution streams and automated replay mechanisms.

FIG. 4 is a block diagram illustrating an exemplary CUDA Graph orchestration loop 400 that implements the self-executing behavior of the Manifold Engine through coordinated parallel execution streams and automated replay mechanisms. The orchestration loop 400 operates within the CUDA graph controller 132, shown as a dashed container, which manages the continuous execution of operator pipelines without external scheduling intervention.

The orchestration architecture comprises multiple distinct CUDA streams 402, 404, 406, 408 that execute concurrently with managed synchronization points. Stream 0 402, designated as the ingest stream, handles the initial processing of experiential inputs. This stream executes various operations including, but not limited to: event and communication batching 410 that accumulates inputs into efficient processing units, the projection operator 412 that maps external data into graph vertices using a multi-stage process, and journal append operations via appender 414 that record graph modifications in GPU-resident ring buffers for crash consistency and dynamic updates.

Stream 1 404 implements the core operator pipeline that realizes the fundamental geometric computations of the Manifold Engine. This stream executes various operators in sequence: the diffusion operator 416 performing heat kernel propagation via sparse matrix-vector operations, the geodesic operator 418 computing shortest paths through $\Delta$-stepping algorithms, the curvature operator 420 calculating Forman or Ollivier-Ricci curvature to quantify compression pressure, the recombination operator 422 generating novel trajectories through geodesic interpolation, and the routing operator 424 identifying optimal paths for query responses. These operators can be configured to execute as a captured CUDA Graph, enabling single-submission execution of the entire pipeline with minimal kernel launch overhead.

Stream 2 406 performs analytical operations that maintain global manifold structure and hierarchical coherence. The spectral update operator 426 employs the Lanczos algorithm to refresh eigen-decomposition as the graph evolves, providing low-dimensional representations essential for manifold condensation. The manifold coupling operator 428 computes submersion mappings $\varphi$ and immersion mappings $\psi$ between hierarchical layers, maintaining consistency across fast, mesoscale, and foundational manifolds. The residual computation operator 430 evaluates cognitive tension $C(p)=d_{M3}(u(p), d(p))$ to drive metacognitive correction through gradient descent on the foundational manifold.

Stream 3 408 handles maintenance operations that ensure long-term system stability and efficiency. The graph compaction operator 432 periodically merges COO-format journals into the CSR representation, amortizing the cost of dynamic updates while maintaining deterministic execution. The curvature pruning operator 434 implements the compression control loop described herein, removing edges with curvature below threshold $\kappa < \kappa_{min}$ to bound memory growth. The snapshot checkpoint operator 436 persists graph state, operator parameters, and random number generator seeds to enable warm restarts and fault tolerance.

The streams coordinate through explicit synchronization events 438, 440, 442, 444 marked as E1 through E4, which enforce critical dependencies while maximizing parallel execution. Event E1 438 ensures journal append completion before core operators access new graph data. Event E2 440 synchronizes the completion of ingest operations before core pipeline execution. Event E3 442 guarantees core operator completion before maintenance operations that might modify graph structure. Event E4 444 coordinates maintenance completion before the next replay cycle begins.

The orchestration loop 400 is governed by four control components that adapt execution to system state and input characteristics. The action density sampler 450 continuously monitors the rate of geometric actions $\rho_g$ providing real-time estimates that influence scheduling decisions. The DAG pipeline controller 452 manages the captured CUDA Graphs representing operator sequences, updating parameters between replays without graph recapture overhead. The stream priority scheduler 454 implements preemptive prioritization with P0>P1>P2>P3, ensuring latency-sensitive operations such as event ingestion and query routing preempt background computations like spectral updates. The continuous replay timer 456 triggers pipeline execution at frequency $f_{replay}=k\cdot\log(1+\rho_g)$, where k is a scaling constant, implementing the adaptive execution rate that accelerates with increasing experiential density.

A continuous replay loop connects the replay timer 456 output back to the stream initiation point, implementing the self-executing nature of the architecture. This feedback mechanism ensures that operator pipelines execute continuously without external control, with the replay frequency dynamically adjusted based on measured action density. The feedback from control components to execution streams, while not explicitly shown in the diagram, manifests through parameter updates, priority adjustments, and scheduling modifications that optimize performance based on system state.

A plurality of performance metrics may be monitoring and collected which specifies key operational parameters of the orchestration system. The replay frequency formula $f_{replay}$ quantifies how execution rate scales with experiential density. Stream priorities implement preemptive scheduling to maintain responsiveness under load. For instance, Kernel fusion may be configured to activate when register pressure remains below 80%, increasing arithmetic intensity by combining operations. Graph capture may occur once per parameter update, amortizing setup costs across many replays. Event synchronization overhead remains below 0.1% of kernel execution time through efficient implementation. End-to-end pipeline latency ranges from 10-50 milliseconds, enabling real-time cognitive processing.

Through this orchestration architecture, the Manifold Engine enables continuous execution of geometric operators with minimal overhead, adaptive performance scaling, and robust synchronization. The separation of concerns across streams (ingestion, core operations, analysis, and maintenance) enables efficient resource utilization while maintaining deterministic execution order. The automated replay mechanism eliminates the need for external scheduling, making the graph truly self-executing as operator dynamics drive continued evolution of the cognitive manifold.

Figure 5:
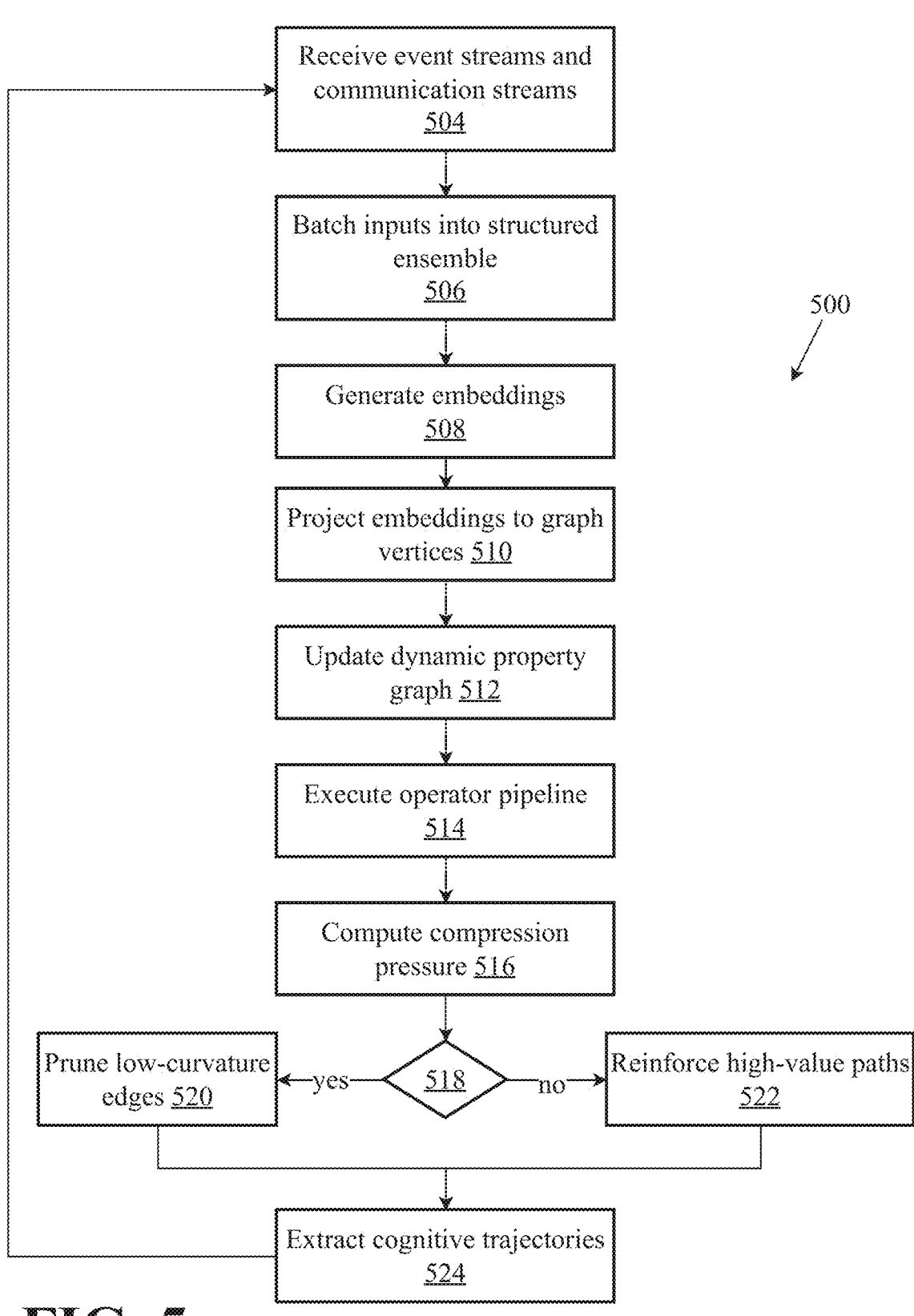
FIG. 5 is a flow diagram illustrating an exemplary method for processing experiential input into cognitive trajectories, according to an embodiment.

FIG. 5 is a flow diagram illustrating an exemplary method 500 for processing experiential input into cognitive trajectories, according to an embodiment. The method 500 demonstrates the core computational process through which the Manifold Engine transforms streams of events and communications into meaningful cognitive trajectories that encode experiential knowledge.

The method begins at step 504 with receiving, retrieving, or otherwise obtaining a plurality of data input streams. In some implementations, the plurality of data input streams comprises event streams $e_i(t)$ and communication streams $c_{ij}(t)$ from external sources. The event streams may comprise temporal sequences of discrete occurrences such as sensor observations, user actions, environmental changes, or system state transitions. The communication streams may comprise messages, signals, coordination data, or other information exchanges between processes, agents, roles, or users. These input streams maintain temporal ordering through associated timestamps $\tau(e_i)$ and $\tau(c_{ij})$, preserving the causal relationships essential for cognitive processing.

At step 506, the method batches the received inputs into a structured ensemble $E(t)=\{e_i(t),\ c_{ij}(t)\}$. This batching operation may accumulate individual events and communications into processing units of configurable size, typically (but not necessarily) ranging from 100 to 1000 elements, to optimize GPU throughput while maintaining temporal coherence. The structured ensemble provides a unified representation that treats events and communications as complementary aspects of experiential flow rather than separate data types.

Step 508 generates embeddings $\varphi(x)\in R^m$ for each element in the structured ensemble using pre-trained encoders. For textual communications, the method may employ transformer-based language models that produce dense vector representations through mean pooling over token embeddings. For structured events, domain-specific encoders map event attributes to fixed-dimensional vectors, with embedding dimensionality m typically (but not necessarily) ranging from 256 to 2048 dimensions depending on the complexity of the experiential domain and the particular implementation of an embodiment. These embeddings provide the continuous representations necessary for geometric processing in subsequent steps.

At step 510, the method projects the embeddings to vertices in the dynamic property graph through the optimization P(x) where $\varphi(v)$ represents existing vertex embeddings, x is the new embedding to be projected, and R(v) encodes structural regularization that biases projection toward maintaining graph coherence. This projection employs the two-stage process herein: first identifying candidate vertices through approximate nearest neighbor search, then solving a regularized least-squares problem to determine optimal vertex assignments and edge weights.

Step 512 updates the dynamic property graph structure $G=(V\cup V_{new},\ E\cup E_{new},\ A)$, incorporating newly projected vertices $V_{new}$ and their associated edges $E_{new}$ into the existing graph. The update operation maintains the graph's CSR representation for efficient traversal while recording modifications in COO-format journals for crash consistency. Property vectors A are updated to reflect the attributes, embeddings, and metadata associated with new graph elements.

At step 514, the method executes the operator pipeline II comprising the sequence: Diffusion $D_t\rightarrow$Geodesic G$\rightarrow$Spectral $S_k\rightarrow$Curvature K$\rightarrow$Recombination R. The diffusion operator propagates information along graph edges using heat kernel approximation. The geodesic operator computes shortest paths to establish cognitive distances. The spectral operator extracts global structure through eigendecomposition. The curvature operator quantifies local geometric properties that indicate redundancy or significance. The recombination operator generates novel trajectories through geodesic interpolation. This pipeline execution realizes the geometric transformation of graph structure into cognitive manifold dynamics.

Step 516 computes compression pressure $P(z)=\|\nabla\cdot\vec{v}(z)\|$ from the curvature field generated in the previous step. The compression pressure quantifies the local redundancy in the manifold, with high pressure indicating regions where multiple trajectories converge and can be consolidated. This metric drives the subsequent pruning decisions that enable logarithmic memory scaling by identifying which graph elements can be removed without loss of essential structure.

At decision point 518, the method evaluates whether the curvature $\kappa(e)$ of each edge e falls below a predetermined threshold $\kappa_{threshold}$. This decision implements the fundamental mechanism for bounded memory growth: edges with curvature below threshold represent redundant connections that can be removed without compromising the manifold's ability to represent experiential structure.

When $\kappa(e)<\kappa_{threshold}$ (Yes branch), the method proceeds to step 520 where it prunes low-curvature edges from the graph. This pruning operation removes redundant connections while preserving the graph's topological structure and maintaining paths between cognitively significant vertices. The pruning ensures that memory growth follows $M(n)\sim\log$ n rather than linear scaling.

When $\kappa(e)\geq\kappa_{threshold}$ (No branch), the method proceeds to step 522 where it reinforces high-value paths by strengthening edge weights, updating vertex properties, or marking trajectories for preservation during future pruning cycles. This reinforcement ensures that significant experiential patterns are retained and made more prominent in the cognitive structure.

The two branches converge at a merge point where the method continues to step 524, which extracts cognitive trajectories $\gamma(t)$ using the routing operator $T(q)$. The routing operator identifies high-fitness paths through the manifold by combining multiple scoring criteria including proximity to query points, novelty relative to existing trajectories, recency of updates, and trust metrics derived from trajectory stability. The extracted trajectories represent coherent sequences of experiential states that encode learned patterns, decisions, or behavioral sequences.

A continuous execution loop connects the output of trajectory extraction back to the initial input reception step 504. This feedback mechanism implements the self-executing nature of the Manifold Engine, where the method continuously processes new experiential inputs without requiring external control or discrete processing phases. The continuous execution ensures that the cognitive manifold evolves in real-time as new experiences arrive, maintaining a living computational substrate that adapts to changing inputs while preserving learned structure.

The method 500 supports several critical objectives through its design. First, it transforms discrete experiential inputs into continuous geometric representations suitable for manifold processing. Second, it implements logarithmic memory scaling through curvature-based pruning that identifies and removes redundancy. Third, it maintains temporal coherence by preserving causal relationships throughout the processing pipeline. Fourth, it enables continuous learning without separate training and inference phases. These properties collectively enable the Manifold Engine to process unbounded experiential streams while maintaining tractable computational requirements.

Figure 6:
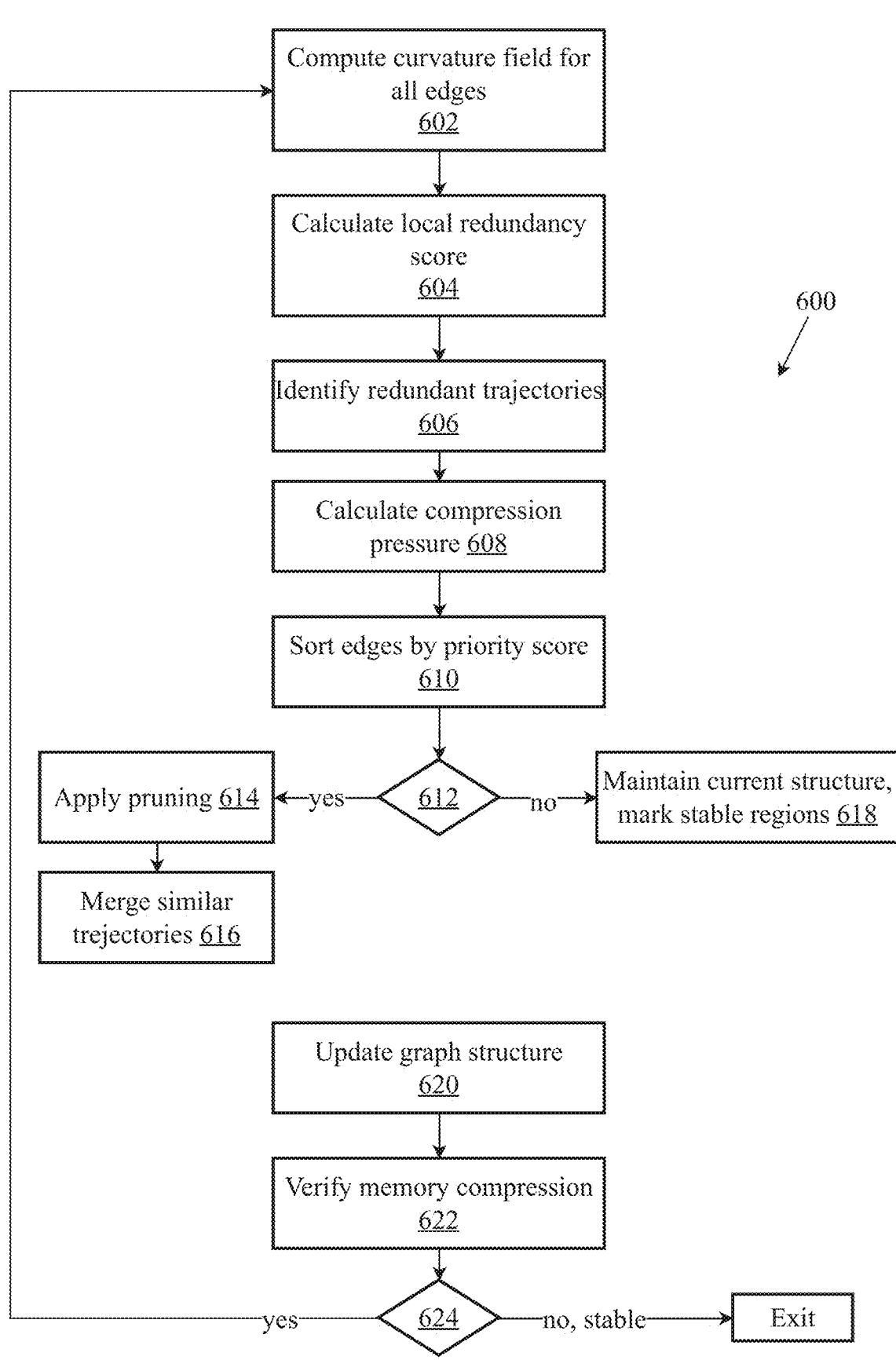
FIG. 6 is a flow diagram illustrating an exemplary method for achieving logarithmic memory compression in the Manifold Engine through curvature-driven pruning and trajectory consolidation, according to an embodiment.

FIG. 6 is a flow diagram illustrating an exemplary method 600 for achieving logarithmic memory compression in the Manifold Engine through curvature-driven pruning and trajectory consolidation, according to an embodiment. The method 600 implements the mathematical principles that enable memory requirements to scale as $M(n)\sim\log$ n with respect to experiential volume n, providing a fundamental computational advantage over conventional cognitive architectures.

According to the embodiment, the process begins at step 602 by computing a curvature field $\kappa(e)$ for all edges $e\in E$ in the dynamic property graph. The curvature computation employs two complementary measures: Forman curvature for computationally efficient local estimates based on edge weights and neighborhood structure, and Ollivier-Ricci curvature for more refined measurements using optimal transport between probability distributions on vertex neighborhoods. Low curvature values indicate edges that connect redundant or parallel paths through the manifold, while high curvature identifies structurally significant connections that maintain manifold topology.

At step 604, the method calculates a local redundancy score $R(v)=\Sigma_{e\in N(v)}(1/\kappa(e))$ for each vertex v, where $N(v)$ denotes the neighborhood of v. This redundancy score aggregates the inverse curvatures of incident edges, providing a vertex-level measure of local redundancy. Vertices with high redundancy scores are candidates for consolidation, as they participate in multiple low-curvature paths that encode similar experiential information.

Step 606 identifies redundant trajectories by evaluating pairs of trajectories $\gamma_i$ and $\gamma_j$ according to two criteria: similarity $S(\gamma_i, \gamma_j)>S_{threshold}$ and $\min(\kappa(\gamma_i), \kappa(\gamma_j))<\kappa_{min}$. The similarity measure S quantifies the geometric or semantic distance between trajectories, while the curvature constraint ensures that only low-value trajectories are considered for consolidation. This dual criterion prevents the method from merging trajectories that, despite similarity, encode distinct high-value experiential patterns.

At step 608, the method calculates compression pressure $P(z)=\|\nabla\cdot\vec{v}(z)\|$ from the velocity field $\vec{v}$ induced by trajectory flows through the manifold. The compression pressure quantifies the local convergence of experiential flows, with high pressure indicating regions where multiple trajectories can be consolidated without information loss. This pressure field provides a global view of compressibility that complements the local curvature measurements.

Step 610 sorts edges by a priority score which may be defined as $Priority(e)=\kappa(e)/cost(e)$, where $cost(e)$ represents the computational or memory cost of maintaining edge e. This priority metric balances the structural importance of an edge (measured by curvature) against its resource consumption, enabling efficient pruning decisions that maximize memory savings while preserving essential manifold structure.

At decision point 612, the method evaluates whether the current memory usage $M_{current}$ exceeds the target memory bound $M_{target}$. The target bound is computed as $M_{target}=\alpha\log(n)+\beta$, where n is the cumulative number of processed experiential inputs and $\alpha$, $\beta$ are system parameters determined empirically. This comparison determines whether active compression is necessary or whether the system can maintain its current structure.

When $M_{current}>M_{target}$ (Yes branch), the method proceeds to step 614 where it applies greedy pruning by removing edges whose priority scores fall below a threshold $\theta$. The threshold is dynamically adjusted to achieve the target memory bound while maximizing the retention of high-priority edges. This greedy approach provides an efficient approximation to the optimal pruning problem, with computational complexity $O(|E|\log|E|)$ for the sorting operation.

Following pruning, step 616 merges similar trajectories identified in step 606. The merging operation computes a weighted average trajectory $\gamma_{merged}=weighted_{avg}(\gamma_i, \gamma_j)$ that preserves the essential geometric properties of both input trajectories. Edge weights are updated to reflect the combined significance of merged paths, ensuring that frequently traversed experiential patterns maintain appropriate representation in the compressed manifold.

When $M_{current} \leq M_{target}$ (No branch), the method proceeds to step 618 where it maintains the current graph structure and marks stable regions that have achieved efficient compression. These marked regions can be excluded from future compression passes, reducing computational overhead for well-compressed portions of the manifold.

Both branches converge at step 620, where the method updates the graph structure G by rebuilding the Compressed Sparse Row (CSR) representation from accumulated journal entries. This reconstruction amortizes the cost of individual edge deletions and vertex merges, maintaining efficient graph traversal properties despite dynamic modifications.

Step 622 verifies that the memory scaling follows the theoretical bound $M(n) \sim \alpha \log(n) + \beta$ by computing the actual memory usage and comparing it to the predicted logarithmic growth curve. Based on this verification, the method updates compression parameters including the pruning threshold $\theta$, similarity threshold $S_{threshold}$, and target bounds to maintain adherence to logarithmic scaling. This adaptive parameter adjustment ensures robust performance across varying experiential densities and content distributions.

At decision point 624, the method determines whether new inputs are available for processing. When new inputs are available (Yes branch), the method returns to step 602 to process the next batch of experiential data, implementing continuous compression as the manifold evolves. When no new inputs are available (No branch), the method exits the compression loop, leaving the manifold in a stable compressed state.

The mathematical foundation for logarithmic scaling emerges from the insight that the probability of encountering genuinely novel experiential patterns decreases as Pr(novel) $\sim 1/n$ with accumulated experience. This leads to a marginal memory contribution $dM/dn \sim 1/n$, which upon integration yields $M(n) \sim \log(n)$. The method 600 realizes this theoretical scaling through the systematic identification and removal of redundancy via curvature-based pruning, ensuring that only structurally significant patterns consume memory resources.

Figure 7:
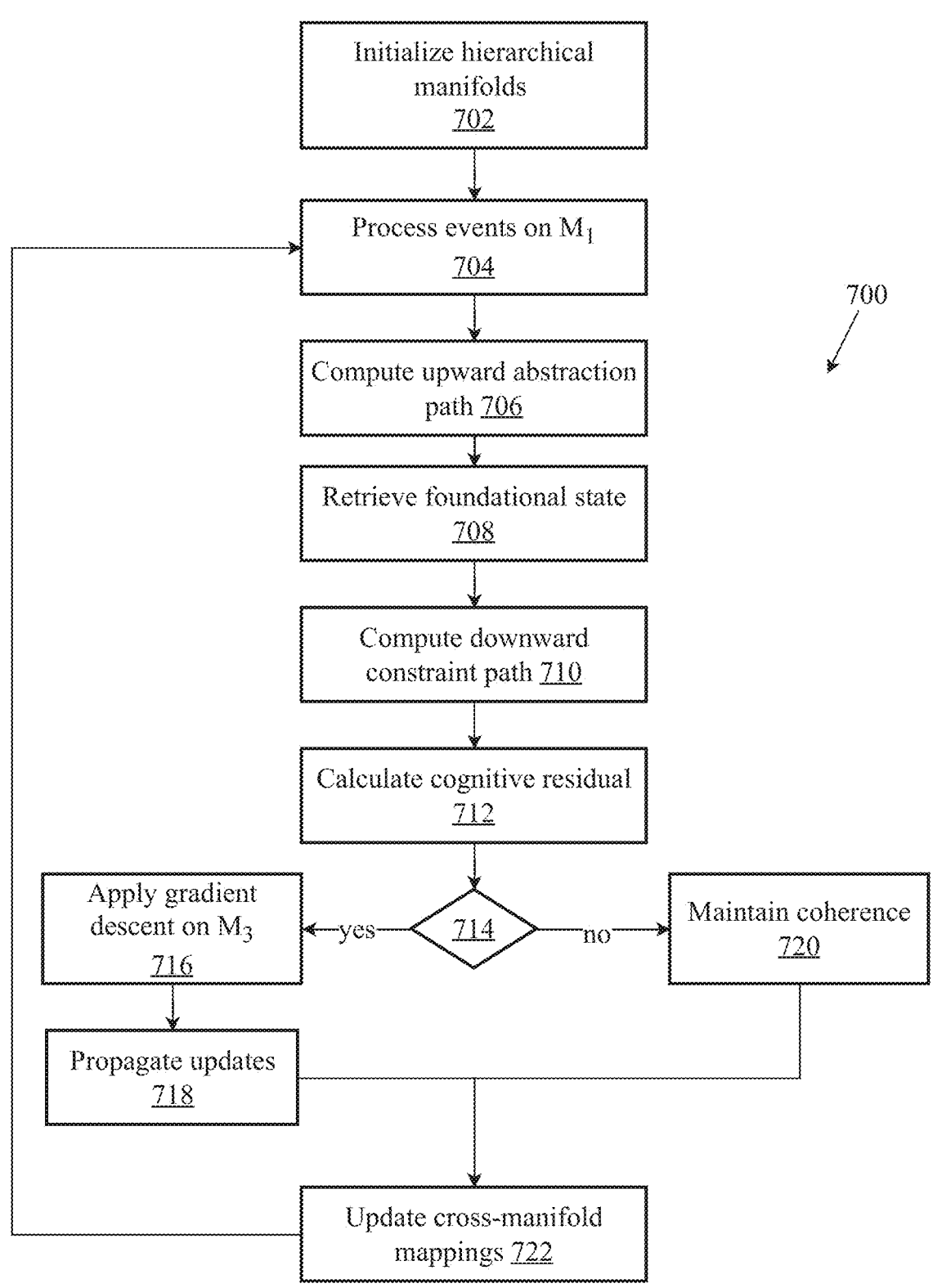
FIG. 7 is a flow diagram illustrating an exemplary method for hierarchical manifold coordination that implements metacognitive control across multiple temporal scales in the Manifold Engine, according to an embodiment.

FIG. 7 is a flow diagram illustrating an exemplary method 700 for hierarchical manifold coordination that implements metacognitive control across multiple temporal scales in the Manifold Engine, according to an embodiment. The method 700 enables the system to maintain coherence between fast experiential processing, intermediate decision-making, and slow foundational values through bidirectional geometric mappings and residual minimization.

According to an embodiment, the process begins at step 702 by initializing a hierarchical structure comprising multiple cognitive manifolds operating at distinct temporal scales. In a preferred embodiment, at least three cognitive manifolds are configured to operate at distinct temporal scales. A fast manifold $M_1$ processes events at the cognitive edge with timescales ranging from milliseconds to seconds, encoding immediate sensory observations and reactive behaviors. The mesoscale manifold $M_2$ integrates events into decision trajectories and tactical patterns over minutes to hours. The foundational manifold $M_3$ maintains long-term identity, values, and reasoning style with evolution occurring over days to months. The temporal separation $\Delta t_1 \ll \Delta t_2 \ll \Delta t_3$ ensures that each layer can stabilize before influencing others, preventing oscillatory instabilities.

At step 704, the method processes incoming events on the fast manifold $M_1$, generating experiential trajectories $\gamma_1(t)$ that encode sequences of observations and actions. These trajectories evolve according to the geometric operators described in previous figures, with diffusion, geodesic flow, and curvature shaping the local manifold structure. The fast manifold maintains high temporal resolution to capture fine-grained experiential details while remaining responsive to rapid environmental changes.

Step 706 computes the upward abstraction path through a composition of Riemannian submersion mappings. First, the mapping $\varphi_{12}: M_1 \to M_2$ abstracts fast trajectories into mesoscale representations, preserving geodesic structure while reducing dimensionality. This submersion identifies patterns across multiple fast events, extracting decision-relevant features while discarding high-frequency noise. Second, the mapping $\varphi_{23}: M_2 \to M_3$ further abstracts mesoscale trajectories into foundational structures, identifying persistent behavioral patterns and value alignments. The complete upward path $u(p) = (\varphi_{23} \circ \varphi_{12})(p)$ transforms a point $p \in M_1$ into its corresponding representation in the foundational manifold $M_3$.

At step 708, the method retrieves the current foundational state $r \in M_3$, which encodes the system's core identity constraints, learned values, and established reasoning patterns. This foundational state serves as the source of top-down constraints that ensure behavioral consistency across varying contexts. The retrieval operation accesses the slowly evolving structures that have been consolidated through extended experience and metacognitive refinement.

Step 710 computes the downward constraint path through Riemannian immersion mappings that inject high-level constraints into lower manifolds. The mapping $\psi_{32}: M_3 \to M_2$ transforms foundational values into tactical constraints, restricting the space of allowable decisions to those consistent with core identity. The mapping $\psi_{21}: M_2 \to M_1$ further transforms tactical constraints into immediate behavioral restrictions, defining admissible event responses. The complete downward path $d(p) = (\psi_{32}^{-1} \circ \varphi_{21}^{-1})(p)$ represents the constraint propagation from foundation to edge, where the inverse mappings are used to trace constraints back to their foundational source.

At step 712, the method calculates the cognitive residual $C(p) = d_{M_3}(u(p), d(p))$, which quantifies the divergence between the upward abstraction of current experience and the downward projection of foundational constraints. This residual measures cognitive tension: high values indicate that current experiences are generating abstractions inconsistent with established values, while low values confirm alignment between bottom-up processing and top-down constraints. The distance metric $d_{M_3}$ is computed in the foundational manifold where both paths converge, ensuring commensurability.

Decision point 714 evaluates whether the cognitive residual $C(p)$ exceeds a predetermined threshold $C_{threshold}$. This threshold determines the system's tolerance for cognitive tension before triggering corrective action. The threshold value may be set based on system requirements for behavioral consistency versus adaptability, with lower thresholds producing more rigid adherence to established patterns and higher thresholds allowing greater behavioral flexibility.

When $C(p) > C_{threshold}$ (Yes branch), the method proceeds to step 716 where it applies gradient descent on the foundational manifold $M_3$ to reduce cognitive tension. The update rule $dr/dt = -\nabla_{M_3} C(r)$ modifies the foundational state $r$ in the direction that minimizes the residual functional C. This gradient descent implements metacognitive learning: the system adjusts its core values and constraints based on persistent patterns in experiential data that cannot be accommodated within existing frameworks. The learning rate is typically set much lower than fast manifold dynamics, ensuring stable adaptation rather than reactive fluctuation.

Following gradient descent, step 718 propagates the updated constraints from the foundational manifold through the hierarchy: $M_3 \rightarrow M_2 \rightarrow M_1$. This propagation updates the immersion mappings $\psi_{32}$ and $\psi_{21}$ to reflect the modified foundational state, ensuring that future behavioral constraints align with the adjusted values. The propagation maintains consistency across all three manifolds while preserving their temporal separation.

When $C(p) \leq C_{threshold}$ (No branch), the method proceeds to step 720 where it maintains current coherence without modification, recording stability metrics such as residual magnitude, convergence rate, and constraint satisfaction. These metrics provide feedback on system stability and can trigger parameter adjustments if coherence degrades over time.

Both branches converge at step 722, where the method updates the cross-manifold mappings $\varphi$ and $\psi$ to improve future coordination. These updates may include refining the dimensionality reduction in submersions, adjusting the constraint strength in immersions, or modifying the mapping kernels based on observed residual patterns. The updates employ online learning algorithms that incrementally improve mapping accuracy without disrupting established structures.

A continuous coordination loop returns the method to step 704, implementing ongoing hierarchical control as new events arrive. This continuous execution ensures that the system maintains coherence across temporal scales while adapting to experiential input. The separation of timescales prevents tight coupling between layers: fast dynamics can explore local variations while being guided by stable constraints, mesoscale patterns can emerge and stabilize before influencing identity, and foundational structures can evolve based on persistent evidence rather than transient fluctuations.

The hierarchical coordination method 700 realizes several key principles of metacognitive control. First, it implements bidirectional information flow where bottom-up abstraction meets top-down constraint, creating a tension that drives learning. Second, it maintains temporal separation that allows each cognitive layer to operate at its natural timescale without interference. Third, it provides a principled mechanism for value learning through residual minimization rather than external reward signals. These properties enable the Manifold Engine to exhibit coherent behavior that remains consistent with learned identity while adapting to new experiences, solving a fundamental challenge in cognitive architectures.

Figure 8:
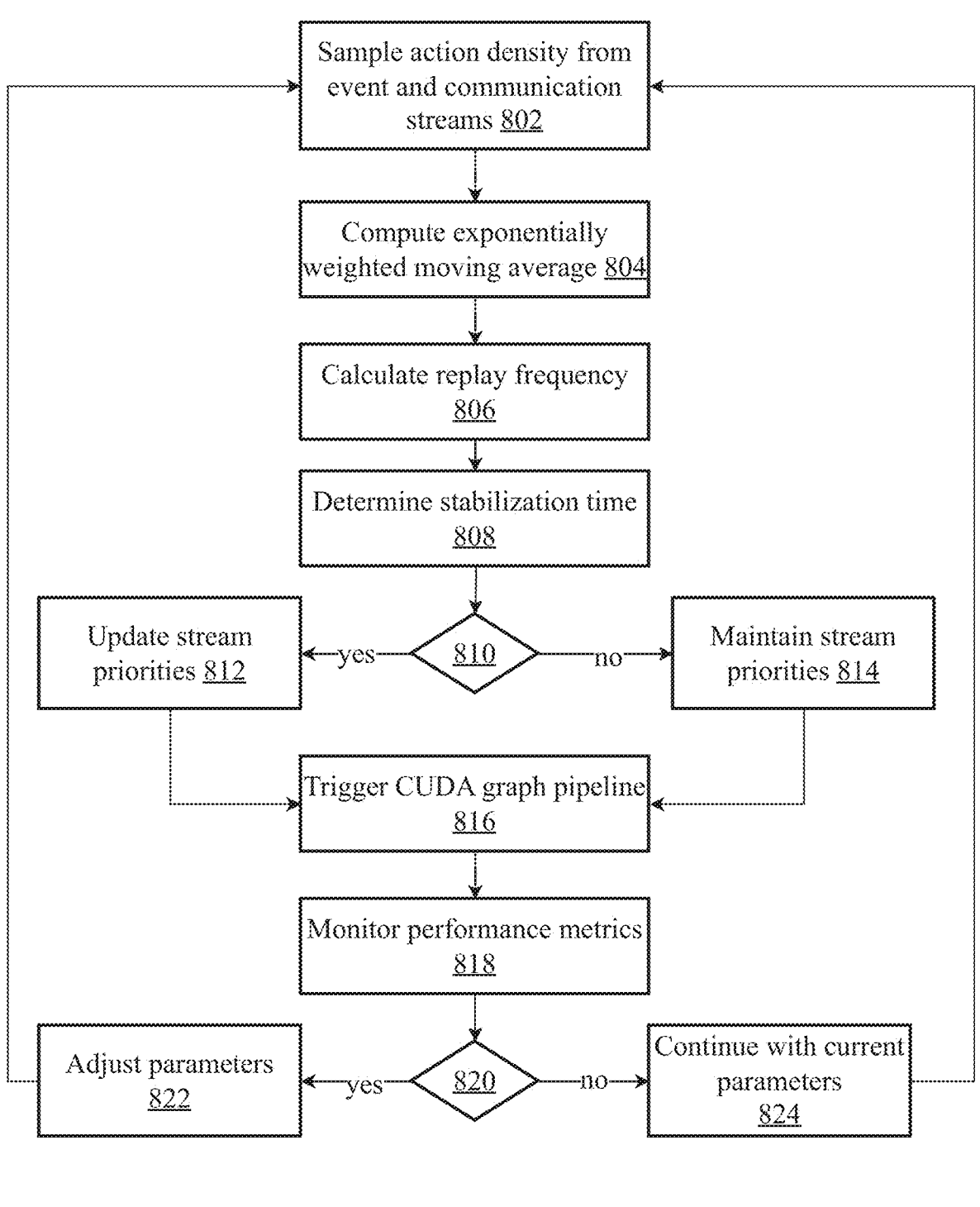
FIG. 8 is a flow diagram illustrating an exemplary method for adaptive pipeline scheduling that enables the Manifold Engine to self-regulate its execution frequency based on experiential density and system performance, according to an embodiment.

FIG. 8 is a flow diagram illustrating an exemplary method 800 for adaptive pipeline scheduling that enables the Manifold Engine to self-regulate its execution frequency based on experiential density and system performance, according to an embodiment. The method 800 implements a density-driven control mechanism that ensures computational resources are allocated efficiently while maintaining real-time responsiveness to varying input rates.

According to the embodiment, the process begins at step 802 by sampling action density $\mu_g$ from incoming event and communication streams. This sampling operation monitors the rate at which geometric actions arrive at the system, distinguishing between events $e_i(t)$ that represent discrete occurrences and communications $c_{ij}(t)$ that encode coordination or semantic exchanges. The sampling occurs continuously at rates between 10 and 100 Hz, providing real-time estimates of experiential flow without introducing significant computational overhead.

At step 804, the method computes an exponentially weighted moving average of the action density using the formula for $\rho_g$, where T represents the averaging window, $\lambda_e$ is the weighting factor for events, and $\lambda_c$ is the weighting factor for communications. The exponential weighting ensures recent activity has greater influence on the density estimate while maintaining smoothness across temporal fluctuations. As an example, default parameter values of $\lambda_e=1.0$ and $\lambda\_c=2.0$ reflect the empirical observation that communications typically induce greater geometric effects than isolated events, as they create coupling between trajectories and increase local curvature. The averaging window T may be configurable from 100 milliseconds to 10 seconds, allowing adaptation to different operational contexts.

Step 806 calculates the pipeline replay frequency using the relationship $f_{replay}=k \cdot \log(1+\rho_g)$, where k is a scaling constant that determines the overall frequency range. This logarithmic relationship ensures that replay frequency increases with experiential density but with diminishing returns, preventing runaway acceleration under extreme load conditions. The logarithmic scaling mirrors the fundamental memory scaling law $M(n) \sim \log n$, creating a self-consistent control mechanism where both memory usage and execution frequency follow similar mathematical relationships. The scaling constant k is typically (but not necessarily) set to achieve baseline frequencies between 20 Hz and 1 kHz, depending on application requirements.

At step 808, the method determines the characteristic stabilization time $\tau_c \sim 1/\log(1+\rho_g)$, which represents the expected time for the cognitive manifold to achieve coherent structure after perturbation. This inverse relationship with action density reflects a fundamental property of the Manifold Engine: higher experiential density accelerates convergence rather than degrading it, as redundant inputs are more quickly identified and consolidated through compression mechanisms. The stabilization time informs subsequent scheduling decisions by indicating how rapidly the system can absorb new inputs without destabilizing existing structures.

Decision point 810 assesses current system load by evaluating metrics including, but not limited to, GPU utilization, memory bandwidth consumption, and stream queue depths. This assessment determines whether the system is operating under normal conditions or experiencing resource constraints that require priority adjustment. In an exemplary embodiment, the load threshold is set at 80% of theoretical capacity to maintain headroom for burst handling while maximizing throughput under steady-state conditions.

When system load exceeds the threshold (Yes branch), the method proceeds to step 812 where it updates stream priorities to favor critical operations under constrained resources. The ingest stream (P0) receives HIGH priority to ensure new experiential inputs are not dropped, while the analysis stream (P2) receives LOW priority as spectral updates and manifold coupling can be deferred without immediate impact on system function. Core operators (P1) maintain intermediate priority, and maintenance operations (P3) may be suspended entirely under extreme load. This priority adjustment implements graceful degradation, preserving essential cognitive functions while temporarily reducing analytical depth.

When system load remains within normal bounds (No branch), the method proceeds to step 814 where it maintains balanced priorities following the standard hierarchy P0>P1>P2>P3. This balanced scheduling ensures all cognitive functions receive appropriate resources, with preemptive priorities preventing latency-sensitive operations from being blocked by computationally intensive background tasks. The standard scheduling achieves optimal throughput while maintaining bounded latencies for query responses and trajectory extraction.

Both branches converge at step 816, where the method triggers execution of the CUDA Graph pipeline at the calculated frequency $f_{replay}$. This triggering mechanism initiates a complete pass through the operator DAG, including diffusion, geodesic computation, curvature analysis, and other geometric operations captured in the pre-compiled graph structure. The use of CUDA Graphs eliminates kernel launch overhead and ensures deterministic execution order, critical for maintaining reproducible cognitive dynamics. The replay frequency directly controls how often the manifold structure updates in response to accumulated inputs, with higher frequencies providing finer temporal resolution at the cost of increased computational load.

Step 818 monitors performance metrics to assess the effectiveness of current scheduling parameters. Key metrics can include, but are not limited to, pipeline latency measured from input ingestion to trajectory output, memory utilization tracked against the theoretical bound $M(n) \sim \log n$, and GPU utilization targeting the optimal range of 60-80%. Additional metrics such as stream synchronization overhead, cache hit rates, and numerical stability indicators provide comprehensive visibility into system health. This monitoring operates continuously with minimal overhead, using hardware performance counters and lightweight software instrumentation.

At decision point 820, the method evaluates whether performance has degraded below acceptable thresholds. Performance degradation may manifest as pipeline latencies exceeding the exemplary 10-50 millisecond target range, memory growth deviating from logarithmic scaling, or GPU utilization falling outside the optimal band. The decision also considers trend analysis to detect gradual degradation before it impacts user-visible performance.

When performance degradation is detected (Yes branch), the method proceeds to step 822 where it adjusts control parameters to restore optimal operation. Adjustable parameters include the scaling constant k, which modifies the overall replay frequency range; the weighting factors $\lambda_e$ and $\lambda_c$, which alter the relative influence of events versus communications; and the averaging window T, which affects the responsiveness of density estimates. Parameter adjustment employs gradient-free optimization guided by performance gradients, with small incremental changes to avoid destabilizing the control loop.

When performance remains within acceptable bounds (No branch), the method proceeds to step 824 where it continues with current settings, maintaining stable operation without unnecessary parameter perturbation. This hysteresis in the control logic prevents oscillatory behavior that could arise from overly aggressive optimization.

The method implements continuous adaptation through feedback paths that return to the initial density sampling step 802. This creates a closed-loop control system that automatically adjusts to changing experiential patterns, system loads, and performance characteristics without external intervention. The continuous nature ensures the Manifold Engine remains self-executing, with scheduling decisions emerging from the interaction between experiential density and system state rather than being imposed by external orchestration.

Through adaptive scheduling, the method 800 achieves several critical objectives. First, it ensures computational resources are allocated proportionally to experiential richness, with dense periods receiving more frequent updates. Second, it prevents system overload through priority adjustment and graceful degradation. Third, it maintains performance within specified bounds through continuous monitoring and parameter adaptation. These properties enable the Manifold Engine to operate efficiently across widely varying workloads while preserving the self-executing characteristic fundamental to its architecture.

Exemplary Computing Environment

Figure 16:
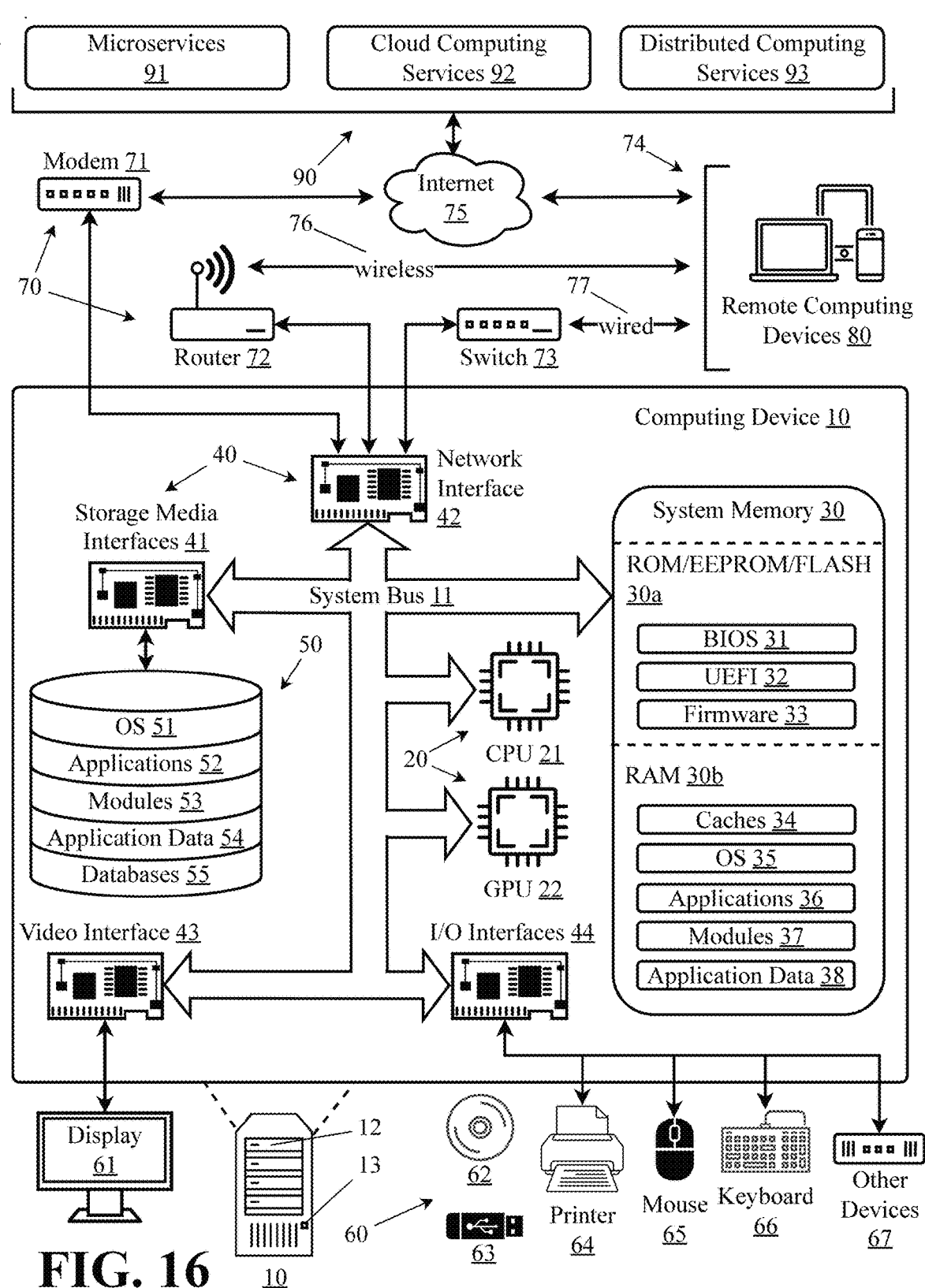
FIG. 16 illustrates an exemplary computing environment on which an embodiment described herein may be implemented.

FIG. 16 illustrates an exemplary computing environment on which an embodiment described herein may be implemented, in full or in part. This exemplary computing environment describes computer-related components and processes supporting various computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 13 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with opensource technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Gitlab, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer-implemented system for executing self-executing graphs, comprising:
   a memory and one or more processors;
   a dynamic property graph comprising vertices and edges, at least a subset of the vertices or edges encoding execution semantics that specify:
      one or more computational operations to be performed on the dynamic property graph; and
      one or more graph-internal triggering conditions expressed in terms of at least one of: traversal of vertices or edges, changes in vertex or edge properties, geometric properties of graph regions, or topological properties of graph structure;
   an execution engine configured to:
      evaluate the graph-internal triggering conditions encoded in the execution semantics by monitoring graph state;

detect satisfaction of said triggering conditions through graph-internal evaluation;
      initiate the computational operations bound to satisfied triggering conditions; and
      execute said computational operations to modify the dynamic property graph;
   wherein the dynamic property graph determines when and which computational operations execute based on the graph-internal triggering conditions encoded in the execution semantics.

2. The system of claim 1, wherein the one or more processors comprise one or more graphics processing units, and wherein the computational operations comprise operator kernels executable on the graphics processing units.

3. The system of claim 2, wherein the operator kernels comprise geometric operators including at least one of: diffusion operators, geodesic operators, curvature operators, spectral operators, or recombination operators.

4. The system of claim 1, wherein the execution semantics further encode execution constraints comprising at least one of: rate limits on operation invocation frequency, resource limits on computational resource consumption, or priority specifications for operation scheduling.

5. The system of claim 1, wherein the execution engine comprises:
   a trigger coordinator configured to evaluate the graph-internal triggering conditions; and
   a regulation enforcer configured to gate initiation of the computational operations based on execution constraints encoded in the execution semantics.

6. The system of claim 1, wherein the vertices comprise event vertices representing experiential inputs and communication vertices representing information exchanges.

7. The system of claim 1, wherein the graph-internal triggering conditions comprise at least one of: traversal-based triggers that initiate computational operations based on vertex or edge visitation frequency, state-change triggers that initiate computational operations upon property modifications, geometric triggers that initiate computational operations based on curvature values or flow properties, or topological triggers that initiate computational operations based on connectivity patterns.

8. The system of claim 1, wherein the dynamic property graph is partitioned into a plurality of graph regions, and wherein the system further comprises a plurality of local coordinators, each local coordinator configured to evaluate graph-internal triggering conditions within an assigned graph region and to communicate with other local coordinators via peer-to-peer messaging.

9. The system of claim 1, wherein the execution engine is configured to evaluate the graph-internal triggering conditions continuously as the dynamic property graph evolves through execution of the computational operations.

10. The system of claim 1, wherein the computational operations modify the dynamic property graph by at least one of: creating vertices or edges, deleting vertices or edges, modifying properties of vertices or edges, or modifying the execution semantics encoded in vertices or edges.

11. A computer-implemented method for executing self-executing graphs, comprising the steps of:
   providing a dynamic property graph comprising vertices and edges, at least a subset of the vertices or edges encoding execution semantics that specify:
      one or more computational operations to be performed on the dynamic property graph; and
      one or more graph-internal triggering conditions expressed in terms of at least one of: traversal of vertices or edges, changes in vertex or edge properties, geometric properties of graph regions, or topological properties of graph structure;

evaluating, by an execution engine, the graph-internal triggering conditions encoded in the execution semantics by monitoring graph state;

detecting satisfaction of said triggering conditions through graph-internal evaluation;

initiating the computational operations bound to satisfied triggering conditions; and executing said computational operations to modify the dynamic property graph;

wherein the dynamic property graph determines when and which computational operations execute based on the graph-internal triggering conditions encoded in the execution semantics.

12. The method of claim 11, wherein evaluating the graph-internal triggering conditions and executing the computational operations are performed using one or more graphics processing units, and wherein the computational operations comprise operator kernels executable on the graphics processing units.

13. The method of claim 12, wherein the operator kernels comprise geometric operators including at least one of: diffusion operators, geodesic operators, curvature operators, spectral operators, or recombination operators.

14. The method of claim 11, wherein the execution semantics further encode execution constraints comprising at least one of: rate limits on operation invocation frequency, resource limits on computational resource consumption, or priority specifications for operation scheduling, and wherein the method further comprises enforcing said execution constraints prior to initiating the computational operations.

15. The method of claim 11, further comprising:

evaluating, by a trigger coordinator, the graph-internal triggering conditions; and gating, by a regulation enforcer, initiation of the computational operations based on execution constraints encoded in the execution semantics.

16. The method of claim 11, wherein the vertices comprise event vertices representing experiential inputs and communication vertices representing information exchanges.

17. The method of claim 11, wherein the graph-internal triggering conditions comprise at least one of: traversal-based triggers that initiate computational operations based on vertex or edge visitation frequency, state-change triggers that initiate computational operations upon property modifications, geometric triggers that initiate computational operations based on curvature values or flow properties, or topological triggers that initiate computational operations based on connectivity patterns.

18. The method of claim 11, wherein the dynamic property graph is partitioned into a plurality of graph regions, and wherein the method further comprises:

evaluating, by a plurality of local coordinators, graph-internal triggering conditions within respective assigned graph regions; and communicating between the local coordinators via peer-to-peer messaging to coordinate execution affecting multiple graph regions.

19. The method of claim 11, wherein evaluating the graph-internal triggering conditions occurs continuously as the dynamic property graph evolves through execution of the computational operations.

20. The method of claim 11, wherein executing the computational operations comprises modifying the dynamic property graph by at least one of: creating vertices or edges, deleting vertices or edges, modifying properties of vertices or edges, or modifying the execution semantics encoded in vertices or edges.

* * * * *